United States Patent
Seale et al.

(10) Patent No.: US 10,421,538 B2
(45) Date of Patent: Sep. 24, 2019

(54) ROTARY WING VTOL WITH FIXED WING FORWARD FLIGHT MODE

(71) Applicants: Joseph B. Seale, Gorham, ME (US); Walker M. Sloan, Berlin, MA (US)

(72) Inventors: Joseph B. Seale, Gorham, ME (US); Walker M. Sloan, Berlin, MA (US)

(*) Notice: Subject to any disclaimer, the term of this patent is extended or adjusted under 35 U.S.C. 154(b) by 254 days.

(21) Appl. No.: 15/540,890

(22) PCT Filed: Dec. 28, 2015

(86) PCT No.: PCT/US2015/067630
§ 371 (c)(1),
(2) Date: Jun. 29, 2017

(87) PCT Pub. No.: WO2016/109408
PCT Pub. Date: Jul. 7, 2016

(65) Prior Publication Data
US 2018/0370624 A1 Dec. 27, 2018

Related U.S. Application Data

(60) Provisional application No. 62/099,477, filed on Jan. 3, 2015.

(51) Int. Cl.
*B64C 27/24* (2006.01)
*B64C 27/16* (2006.01)
(Continued)

(52) U.S. Cl.
CPC .............. *B64C 27/24* (2013.01); *B64C 27/16* (2013.01); *B64C 27/18* (2013.01); *B64C 29/0033* (2013.01)

(58) Field of Classification Search
CPC ......... B64C 27/24; B64C 27/16; B64C 27/22; B64C 27/18; B64C 29/0033
(Continued)

(56) References Cited

U.S. PATENT DOCUMENTS

| | | | | |
|---|---|---|---|---|
| 1,592,740 A | * | 7/1926 | MacNeil | B64C 27/16 244/17.25 |
| 1,754,910 A | * | 4/1930 | Serna | B64C 27/16 244/7 A |

(Continued)

FOREIGN PATENT DOCUMENTS

| | | | | |
|---|---|---|---|---|
| CN | 1335248 | | 2/2002 | |
| EP | 2060487 A2 | * | 5/2009 | B64C 27/10 |

(Continued)

OTHER PUBLICATIONS

International Preliminary Report on Patentability in corresponding PCT application serial No. PCT/US2015/067630, dated Aug. 4, 2017, 39 pp.

(Continued)

*Primary Examiner* — Christopher P Ellis
(74) *Attorney, Agent, or Firm* — Caseiro Burke LLC; Chris A. Caseiro

(57) ABSTRACT

An aircraft's two wings and joined thruster propellers or turbines serve as rotary wings in helicopter mode and as fixed wings in airplane mode. The thrusters along the wingspans or at the wing tips drive both rotary wing rotation and airplane flight. Large-angle controlled feathering about the pitch change axes of the left and right wings and thrusters allows them to rotate, relative to each other, between facing and thrusting forward in the same direction for airplane flight or facing and thrusting oppositely for helicopter flight. Optional controls include: helicopter cyclic and collective pitch; airplane roll by differential wing pitch; yaw by differential prop thrust; fuselage pitch by wing pitch change and prop thrust change interacting with an underslung craft e.g.; and fuselage yaw control independent of rotor rotation via a powered rotary mast coupling or a tail (Continued)

responsive to rotor downwash. A teetering rotor hub is a further option.

24 Claims, 21 Drawing Sheets

(51) Int. Cl.
*B64C 27/18* (2006.01)
*B64C 29/00* (2006.01)

(58) Field of Classification Search
USPC .............................................................. 244/8
See application file for complete search history.

(56) References Cited

U.S. PATENT DOCUMENTS

| | | | | |
|---|---|---|---|---|
| 2,479,125 | A | 8/1949 | Leonard | |
| 3,035,789 | A * | 5/1962 | Young | B64C 29/0033 244/48 |
| 3,116,040 | A * | 12/1963 | Petrides | B64C 27/18 244/17.13 |
| 3,141,633 | A * | 7/1964 | MacKay | B64C 29/0033 244/7 C |
| 3,246,861 | A | 4/1966 | Curci | |
| 3,900,176 | A * | 8/1975 | Everett | B64C 27/22 244/39 |
| 5,297,759 | A * | 3/1994 | Tibor | B64C 27/16 244/17.11 |
| 5,516,060 | A | 5/1996 | McDonnell | |
| 6,471,158 | B1 * | 10/2002 | Davis | B64C 27/02 244/8 |
| 7,093,788 | B2 * | 8/2006 | Small | B64C 39/00 244/12.2 |
| 8,991,751 | B2 * | 3/2015 | Page | B64C 29/02 244/78.1 |
| 9,567,075 | B2 * | 2/2017 | Tighe | B64C 29/02 |
| 9,764,828 | B2 * | 9/2017 | Ulrich | B64C 27/16 |
| 2007/0187547 | A1 * | 8/2007 | Kelly | B64B 1/20 244/7 R |
| 2009/0032638 | A1 | 2/2009 | Zhao et al. | |
| 2009/0045294 | A1 | 2/2009 | Richardson et al. | |
| 2009/0206208 | A1 | 8/2009 | Kennedy et al. | |
| 2010/0230547 | A1 | 9/2010 | Tayman | |
| 2011/0315809 | A1 | 12/2011 | Oliver | |
| 2012/0248259 | A1 | 10/2012 | Page et al. | |
| 2014/0008498 | A1 * | 1/2014 | Reiter | B64C 29/02 244/7 A |
| 2015/0158581 | A1 * | 6/2015 | Fengler | B64C 27/08 244/17.23 |
| 2017/0283052 | A1 * | 10/2017 | Moshe | B64C 3/38 |
| 2018/0334241 | A1 * | 11/2018 | Long | B64C 11/18 |

FOREIGN PATENT DOCUMENTS

| | | | | |
|---|---|---|---|---|
| WO | WO-9910235 A1 * | 3/1999 | | A63H 27/12 |
| WO | 2011096850 | 8/2011 | | |
| WO | 2015089679 | 6/2015 | | |
| WO | WO-2015089679 A1 * | 6/2015 | | B64C 29/0033 |

OTHER PUBLICATIONS

Examination report in corresponding Australia patent application serial No. 2015374294, dated Mar. 26, 2019, 7 pp.
Extended search report in corresponding European patent application serial No. 15876091.8, dated Nov. 13, 2018, 9 pp.
International Preliminary Report on Patentability in corresponding PCT application No. PCT/US2015/067630, Aug. 4, 2017, 39 pages.
Transmittal regarding foreign literature, dated Aug. 17, 2017, 1 page.
International Search Report and Written Opinion in corresponding PCT application No. PCT/US2015/067630, May 31, 2016, 10 pages.
Horansky-Mckinney, Amanda, Stop-Rotor Rotary Wing Aircraft, Navel Research Laboratory, located on www.techbriefs.com, Jul. 2017, 2 pages.

* cited by examiner

3500

ROTARY WING VTOL WITH FIXED WING FORWARD FLIGHT MODE

FIELD OF THE INVENTION

The invention relates to aircraft having both Vertical Take-Off and Landing (VTOL) capability and non-rotary-wing horizontal airplane flight.

BACKGROUND OF THE INVENTION

The present invention combines aspects of helicopter and fixed-wing propeller-driven aircraft design and aerodynamics. As will be seen, advances in control as developed particularly for quadcopters enable greater flexibility in flight modes and simplifications of mechanical and aerodynamic designs. Given the very large patent literature relevant to this invention, most of it being old and now basic to the education of VTOL engineers, this Background section will largely ignore the specifics of the patent literature and instead will recall known, applicable general concepts and terminology.

A motivating principle behind the present invention involves induced drag and its relationship to forward speed through the air. In low-subsonic aerodynamics, the significance of the formula for the induced drag of an ideal elliptic lift distribution is readily understood in terms of a picture. Viewing an airplane from directly behind, consider a circle whose diameter extends from wingtip to wingtip. As the aircraft moves forward, this circle sweeps out a cylinder of increasing volume and a corresponding rate of increase of contained air mass: d(air_mass)/d(time). As the pair of wings pushes down on the air it is passing through, a flat wing with an elliptic lift distribution across its span will encounter a downward velocity component, "induced_velocity." Two applicable formulas are given:

$$\text{Lift} = -d(\text{momentum})/d(\text{time}) \text{ for downward momentum imparted to the air}$$

$$\text{Lift} = -d(\text{air\_mass})/d(\text{time}) \cdot \text{induced\_velocity for velocity of sinking air in the wing wake}$$

For a wing with an elliptic spanwise lift distribution, the effective mass to which downward momentum is imparted is equivalent to the mass of air passing through this imaginary circle whose diameter matches the wingspan. As the aircraft moves faster, that circle sweeps through an increasing d(air_mass)/d(time), so for constant lift, the induced velocity decreases inversely with the increase in speed and swept air mass. Since the air mass is sinking down under the wings, the aircraft must effectively climb uphill through the sinking air in order to maintain level flight. Viewing the drag problem in terms of power, the power loss varies as the time derivative of mass multiplied by the square of the induced velocity:

$$\text{Power} = d(\text{energy})/d(\text{time}) = \tfrac{1}{2} \cdot d(\text{air\_mass})/d(\text{time}) \cdot (\text{induced\_velocity})^2$$

These formulas may vary by factors-of-2, depending on whether the induced velocity is specified at the wing or in the far wake, but the core principle is clear. To maintain constant lift, one must maintain a constant product of d(air_mass)/d(time) times (induced_velocity) while seeking to minimize the square-law power term. Induced drag is reduced as the craft travels faster through the air, so that more air mass is pushed down with a lesser induced velocity. This improvement in energy performance ceases at high speeds where the increase in form drag, varying roughly as the square of velocity, overtakes the decrease in induced drag. In a helicopter slowing to hovering flight, the fixed-wing induced drag formula ceases to be applicable. The rotary wings (e.g. two rotary wings for a two-bladed helicopter) cease to engage air mass with forward motion through the air. The spanwise horizontal-axis circle described above becomes a vertical-axis circle which is the swept diameter of the rotor. A relatively small d(air_mass)/d(time) is propelled directly downward with a correspondingly high velocity. Recalling the previous two equations, one sees that to maintain a constant lift according to the first equation while engaging a relatively low mass flow through the rotor at a correspondingly high velocity, the ratio of Power/Lift becomes large. A skilled helicopter pilot will minimize hovering and favor forward flight, where the helicopter's induced drag approaches the applicable fixed-wing formula. For a helicopter, the Aspect Ratio, defined as span$^2$/area, becomes Diameter$^2$/(($\pi$/4)·Diameter$^2$)=4/$\pi$. This is obviously a low aspect ratio when compared to fixed-wing aspect ratios typically varying from 6 to 50. The rotor blade form drag associated with rotary forward flight is also particularly high, since the effective average tangential velocity of the rotor blade through the air must be significantly higher than the forward speed of the helicopter. In a single-rotor helicopter, the rotor blades traveling "backwards" opposite the direction of forward flight must have sufficient motion through the air to develop lift that balances that of the forward-moving rotor blade or blades. For a given rotational tangential tipspeed of the helicopter blades, a practical maximum forward flight speed is approximately 25% of that tipspeed. The maximum airspeed of the advancing rotor tip would therefore be roughly 4+1=5 times the forward speed, while for the receding (with the wind) rotor tip the airspeed multiple would be 4−1=3 times. The power dissipation associated with form drag of an airfoil varies roughly as the square of speed through the air, in the present example implying a power-dissipation multiple of 5$^2$=25 for the advancing wingtip and 3$^2$=9 for the receding wingtip. The energy dissipation multiples become more extreme at smaller radii, while the lack of adequate net airspeed to balance lift on the receding rotary wing becomes more extreme, thus setting the approximate 25% upper practical limit for forward speed as a fraction of tipspeed.

A comparison of rotary- versus fixed-wing aircraft energetics goes as follows. Consider aircraft of equal weight and where the rotor diameter matches the wingspan. In forward flight with equal engine power, the fixed-wing craft will fly more than twice as fast and achieve more than double the mileage. Clearly there is ample incentive to develop an aircraft combining the advantages of rotary-wing vertical takeoff and landing with efficient fixed-wing horizontal flight. Historic examples of such aircraft are seen in the experimental Bell Helicopter XV-3 and XV-15 aircraft, steps in the design lineage leading to the Bell-Boeing V-22 Osprey and the AgustaWestland AW609. In these related aircraft, vertical takeoff and low-speed horizontal flight are achieved with twin side-by-side helicopter rotors. An aircraft transitions to horizontal fixed-wing flight as the rotor planes tilt to provide increasing forward thrust, completing the transition with the rotors serving as propellers and fixed wings providing lift. Comparing similar aircraft, various models of the Bell UH-1 "Huey" series cruise between 120 and 140 knots, with the related, very high powered AH-1 "SuperCobra" having a cruise speed of about 150 knots and a maximum forward speed of 190 knots. A V-22 Osprey in airplane flight mode cruises at around 300 knots. The Osprey has separate systems for developing lift in its helicopter and airplane modes: two rotors for helicopter mode and wings for airplane flight. In helicopter mode, the wings interfere with the rotor downwash, with a substantial fraction of the wing chord hinging down and out of the way of the downwash as an oversize flap. In airplane flight, the rotors are extremely over-sized as propellers, while their twist is a compromise between relatively low twist for helicopter mode and much higher optimum twist for the high prop advance ratios of forward flight. The complexity, cost and high empty weight (in relation to wingspan and payload) of the Osprey are indications of the disadvantages of this aircraft design approach.

Other aircraft examples represent different compromises for achieving VTOL capability and forward flight in airplane mode. Harrier Jump Jets lift off by focusing downward thrust through a very small cross-section of airflow at very high downward velocity and very high power. To conserve fuel, this aircraft is forced to make quick transitions from takeoff to horizontal flight and back from horizontal flight to quick vertical landing.

There is a great need for an aircraft design that combines VTOL capability with the advantages of fixed-wing airplane-mode forward flight. The following Specification will teach such a physical design with its essential and optional degrees of freedom, along with a method for controlling its flight in VTOL and airplane modes and in transitions between the two modes.

SUMMARY OF THE INVENTION

The invention is an aircraft with two wings that function both as rotary wings in a helicopter mode and as fixed wings in an airplane mode, those wings being propelled in both modes by thrusters located along the wing spans or at the wing tips. The wings and thrusters feather together, controllably and independently about the wing-pitch-change axes, including large feathering rotations that align the wing leading edges and thrust vectors approximately oppositely for rotary-wing flight and in the same forward direction for airplane flight. The aircraft may include a normally non-rotating fuselage joined to the sometimes rotary wing pair through a mast bearing with optional means to control non-rotating yaw headings of the fuselage in relation to the rotations of the wings in helicopter mode. The wing and pitch change structure may be mounted to allow helicopter-mode rotary wing flapping and associated rotor-plane tilt with respect to the fuselage.

In particular, The present invention is an aircraft capable of (a) sustained powered rotary-wing-mode VTOL flight and (b) sustained powered non-rotary forward airplane-mode flight, that includes a hub, a pair of wings coupled to the hub and serving as both rotary wings in rotary-wing-mode flight and as a pair of lifting wings in airplane-mode flight and a propulsion component configured to provide propulsion for the aircraft sufficient for sustained powered flight, wherein the propulsion component includes a plurality of thrusters including at least one thruster on each wing of said pair of wings, wherein said plurality of thrusters provides sustained rotation of the pair of wings in rotary-wing-mode flight and sustained forward motion of the pair of wings and of the entire aircraft in airplane-mode flight, wherein said at least one thruster on a first one of said pair of wings is able to thrust in substantially the opposite direction from propulsion from said at least one thruster on a second one of said pair of wings in rotary-wing-mode flight and, wherein said propulsion from said at least one thruster on said first one of said pair of wings is able to thrust in substantially the same direction as propulsion from said at least one thruster on said second one of said pair of wings in airplane-mode flight. The thrusters may be unshrouded propellers or shrouded turbines, for example. The propulsion from each of said plurality of thrusters may be varied differentially in said airplane-mode flight to control yaw rotations of said aircraft. In a transition between said rotary-wing-mode flight and said airplane-mode flight, said at least one thruster on said first one of said pair of wings is affixed to said first one of said pair of wings and rotates in a feathering rotation with said first wing about a pitch change axis of said wing, said pitch change axis being substantially parallel to a span of said wing, and where said thruster and wing rotate in said feathering rotation through an angle change exceeding about 120 degrees relative to the hub. The hub may be located between said pair of wings and attached to each wing of said pair of wings, wherein attachment between said pair of wings permits feathering rotations in both wings about said pitch change axes of each of said two wings, wherein said feathering rotations control aircraft roll in said airplane-mode and, said feathering rotations control variations in the plane of rotation of said pair of wings in rotary-wing-mode. The attachment may control and power said feathering rotations. The thrusters on said wings may cause gyroscopic torsions acting on said wings about the respective pitch change axes of said wings when operating in said rotary-wing-mode, and said gyroscopic torsions may be controllably varied cyclically in a one-per-rev cycle to augment or entirely effect said feathering rotations to control said variations in the plane of rotation in rotary-wing-mode. One example of accomplishing that functionality involves including for at least one of the thrusters at least two rotary propeller or turbine components rotating in substantially opposite vector rotation senses, wherein variable angular momenta arising from said opposite rotation senses at least partially cancel one another and, said gyroscopic torsions about said pitch change axes, arising from said variable angular momenta in rotary-wing-mode flight, are controllably varied through alteration of said rotating in substantially opposite vector rotation senses, thereby acting to augment or entirely effect said feathering rotations. Further in that instance, said at least two rotary components of each of said thrusters provide independently variable thrust vectors acting through differing moment arms with respect to the associated one of said respective pitch change axes, whereby a variable wing-pitch-control moment arising from said thrust vectors and moment arms controls wing pitch in airplane-mode flight. Optionally, the aircraft includes a normally non-rotary fuselage, operating below said hub in normal sustained flight in both rotary-wing-mode and airplane-mode flight, with rotatable attachment to said hub, wherein said fuselage maintains a controllable non-rotary yaw angle in said rotary-wing-mode flight. In that instance, said rotatable attachment to said hub includes torsion actuation operating through said attachment to control said non-rotary yaw angle. Alternatively, in the embodiment with the rotatable attachment of the fuselage to the hub, the aircraft may include a controllable aerodynamic thrust in said fuselage, said thrust acting through a radius from the axis of said attachment for said maintaining a controllable yaw angle. In that case, said thrust acting through a radius is provided by a tail component undergoing angular changes, said angular changes interacting with downwash from said rotary wing to provide said thrust acting through a radius. The aircraft may include decoupling and re-attachment of said rotatable attachment, whereby said hub can fly independently of said fuselage or with said attachment to carry said fuselage. It may also include tilt-angle decoupling between said fuselage and said rotary wing, whereby the plane of rotation of said rotary wing can tilt in pitch and roll directions independent of the pitch and roll angles of said fuselage. In that version, optionally said tilt decoupling includes a flapping hinge in said hub, allowing said pair of wings to flap through variable angles with respect to said hub or it includes a universal hinge permitting rotation and suspension of said fuselage at arbitrary suspension angles in pitch and roll with respect to said plane of rotation.

The invention is also a method for controlling an aircraft in a rotary-wing-mode of flight and an airplane-mode of flight and in transitions between the two modes, the method comprising the steps of independently controlling the pitch angles of each of two wing-plus-thruster systems of the aircraft in feathering about their respective wing-pitch-change axes, including feathering to cause angle changes exceeding about 120 degrees relative to a hub that is common to both of said two wing-plus-thruster systems, controlling said pitch angles to direct the thrusts of said wing-thruster systems over a range of angles in pitch as related to changes in upward lift, in approximately opposite directions for rotary-wing-mode flight, controlling said pitch angles to direct the thrusts of said wing-thruster systems over a range of angles in approximately the same directions for airplane-mode flight, controlling said pitch angles cyclically and differentially to control rotary-wing-mode plane of rotation, controlling said pitch angles differentially to control aircraft roll in airplane-mode flight, controlling said pitch angles continuously in flight in transition from said approximately opposite thrust directions to said approximately the same thrust directions for transition from said rotary-wing-mode to said airplane mode and, controlling said pitch angles continuously in flight in transition from said approximately the same thrust directions to said approximately opposite thrust directions for transition from said airplane-mode to said rotary-wing-mode. The method further optionally includes controlling angular speeds of the thrusters of said wing-thruster systems differentially and cyclically in said rotary-wing-mode in a one-per-rev cycle, thereby cyclically varying gyroscopic wing-pitching moments in said thrusters to control wing cyclic pitch. It further includes the option of independently controlling the thrusts of said wing-thruster systems differentially in said airplane-mode for controlling aircraft yaw.

Another method of the invention provides for controlling the pitch angles of a pair of wings with corresponding attached thrusters, those wings being joined to a control hub and constituting an aircraft, each wing and thruster combination being capable of independent pitch angle rotation through large angles under servo control, the method comprising the steps of determining a target common-mode lift from the pair of wings, determining a target differential-mode lift from the pair of wings, determining indicated airspeeds of the two wings, determining, from said indicated airspeeds, from said common-mode lift and from said differential-mode lift, target theoretical lift coefficients for the two wings, determining actual lift coefficients of the two wings and servo controlling the pitch angles of the two wings to cause said actual lift coefficients to approach said target lift coefficients. In that method, said target differential-mode lift may be varied cyclically at a one-per-rev rate, synchronized to rotations of said aircraft in a rotary wing mode, thereby to control the plane of rotation of said aircraft. If one of said indicated airspeeds of the two wings falls below a predetermined threshold, then said servo control of pitch angles may revert to an alternate control method. The alternate control method may be used to control the vector forces of said thrusters. The method for controlling pitch angles may also include the step of limiting said target lift coefficients to magnitudes achievable within aerodynamic capabilities of the two wings.

These and other features will become clear from the following Specification.

BRIEF DESCRIPTION OF THE DRAWINGS

FIGS. 21 and 22 show cut-away views of the entire aircraft, while

FIG. 1 shows the aircraft with its hub fairing facing in the forward direction of the fuselage. The propellers are stopped here for viewing, while most of the later figures show the propellers as transparent disks, as they would appear when spinning rapidly.

FIG. 2 shows the same aircraft as FIG. 1 except with the spinning propellers represented as disks and with the entire rotary section of the aircraft rotated far out of alignment with the fuselage to indicate the rotation degree of freedom between rotor and fuselage.

FIGS. 3 and 4, both similar to FIG. 2, show by comparison a cyclic pitch change, with the near wing pitching up and the far wing pitching down going from FIG. 3 to FIG. 4.

FIG. 5 shows the aircraft from in front and above, in airplane flight mode with both props facing forward. The fuselage is seen suspended below the wings in airplane mode.

FIG. 6 is comparable to FIG. 5 but with the wings pitched differentially (functionally equivalent to aileron roll control) to roll left relative to the plane's forward direction (and right relative to the viewer of the figure), while some left roll angle is evident. The fuselage is seen suspended below the wings in airplane mode.

FIG. 7 extends the dynamic flight sequence of FIGS. 5 and 6, now showing left yaw combined with the left roll of FIG. 6 and further showing a change in differential pitch angle to counter further roll as the aircraft turns in yaw. The fuselage is seen suspended below the wings in airplane mode.

FIGS. 8 and 9, both similar to FIG. 2, show by comparison the flapping degree of freedom of the teetering hub, where the near wing is flapped down in FIG. 9 compared to FIG. 8 while the far wing flaps up in the same figure sequence.

A sequence of figures represents a sequence of views, through time, of conversion maneuvers from helicopter mode to airplane mode and back to helicopter mode. Starting from the reference view of FIG. 1 with the rotor and props stopped in a helicopter configuration, FIGS. 10 thru 15 represent a conversion sequence from helicopter mode to level forward flight in airplane mode. Continuing, FIGS. 15 thru 20 represent a conversion sequence from airplane mode back to helicopter mode, ending with FIG. 1 as the stopped helicopter. FIGS. 34 and 35 show method steps corresponding to these visual sequences.

FIG. 10 shows an extreme (45 degree) upward pitching angle as the wings slow in helicopter mode while the aircraft is rising.

FIG. 11 shows both wings and their tip propellers pitched straight up with the craft near the highest point of a conversion maneuver.

FIG. 12 shows the wings and props pitching forward together while prop thrust is pitching the aircraft forward as it begins to fall after reaching its highest point.

FIG. 13 shows the wings pitched down relative to the fuselage, while the fuselage itself is angled down as the descending aircraft gains forward airspeed and lift on its approach to horizontal flight.

FIG. 14 shows the wings now pitched slightly up relative to the fuselage, with the fuselage still angled slightly nose-down, as the aircraft approaches horizontal flight.

FIG. 15 shows complete recovery of stable trim in forward airplane flight.

FIG. 16 shows the airplane wings pitched up more than in FIG. 15 as the craft noses up in a climb.

FIG. 17 shows the airplane in a steep climb, where it is rapidly losing speed and starting to drop.

FIG. 18 shows the same steep climb angle of the fuselage as in FIG. 17, as the aircraft passes its maximum height and is moving at a low horizontal velocity while the wings are pitching down and the thrust of the props will soon be pitching the fuselage down.

FIG. 19 shows the fuselage pitching down toward horizontal as the aircraft falls and the sharply pitched-down wings align to the relative wind and avoid stall.

FIG. 20 shows a continuing falling descent as the now-rotary wings begin to spin, the near wing beginning to pitch up from its previous orientation of FIG. 19 while the far wing rotates considerably farther about its pitching axis to match the equivalent aerodynamic pitch angle of the near wing in the context of rotary wing helicopter flight. FIG. 1 represents the concluding frame of this sequence.

FIG. 21 shows a cutaway view with the near sides of the fuselage and hub fairing removed, revealing the essential internal components of the aircraft.

FIG. 22 is similar to FIG. 21, but with the removal of batteries and a flight control module in the nose of the hub fairing, providing a clearer view of other hub components.

FIG. 23 zooms in relative to FIG. 22, with removal of the fuselage, hub fairing, wings and mast bearing tube, revealing the Y-yoke of the teetering hub and the pitch control components.

FIG. 24 is similar to FIG. 23 but with the removal of the Y-yoke, revealing bearings of the teetering hub.

FIG. 25 continues the component removal sequence of FIG. 24, with a cut-away view revealing the pitch change bearings, a torsion wire that handles centrifugal force loads and provides pitch-up torsion bias in helicopter mode, and an optional torsion spring coupling between pitch change gears and the wing spar.

FIG. 26 shows an optional configuration of the aircraft in which a shortened fuselage rotates with the rotary wings, the hub and the hub fairing in a simplified design that omits the mast bearing and related components.

FIG. 27 shows two design options: the inclusion of a tail with variable geometry surfaces to perform as conventional horizontal stabilizer plus elevator and vertical stabilizer plus rudder; and propellers moved in from wing tip locations to mid wing and expanded to larger prop diameter to develop more thrust at the smaller radius and achieve comparable torque in helicopter mode. This modification and related ones to be discussed permit higher rotary-wing rotation speeds while keeping propeller tip speeds from reaching problematic high Mach numbers, leading to a design that handles higher disk and wing loading and greater speed capability in horizontal flight.

FIG. 28 shows the addition of a pair of fixed wings on the fuselage.

FIG. 29 shows a fuselage tail structure adapted for using rotary wing downwash to control fuselage yaw and pitch. It also shows thrusters in the form of ducted turbines.

FIG. 30 shows a carrier unit with detachable fuselage, with the hub in the form of a lifting body including pitch stabilization tab and optional center propeller. Also shown are pressure sensor apertures for detecting and servo-controlling wing aerodynamic angle-of-attack.

FIG. 31 shows a variation of the carrier unit of FIG. 30 with the detachable fuselage absent for independent carrier flight, also with no center prop but including twin push-pull wingtip thrust units adapted for wing pitch control in both rotary-wing and airplane flight modes. There are also mechanical air stream sensors for detecting and controlling wing angles-of-attack.

FIG. 32a is a detail view of a hinged trailing-edge mechanical-magnetic flow direction detector and its use for indication of wing aerodynamic attack angle and for servo control of wing pitch.

FIG. 32b breaks out the control computation of FIG. 32a and indicates how wing lift coefficient servo control can be based on a variety of types of input data.

FIG. 33 is a detail view of a trailing edge thin-film mechanical-optical flow direction detector for indication of wing aerodynamic attack angle and for servo control of wing pitch.

FIG. 34 is a chart showing control method steps for rotary-wing-mode vertical takeoff and conversion of airplane-mode flight.

FIG. 35 is a chart showing control method steps for conversion from airplane-mode flight to rotary-wing-mode flight, including in preparation for vertical landing.

DETAILED DESCRIPTION OF THE INVENTION

The present invention is an aircraft design and related control methods for Vertical Take Off and Landing (VTOL) and in-flight conversion to and from a fixed-wing horizontal flight mode. The VTOL mode will usually be described as helicopter mode or helicopter flight and the fixed-wing mode as airplane mode or airplane flight. In helicopter mode, the rotary wings may sometimes be called rotor blades or simply blades.

Figure 1:
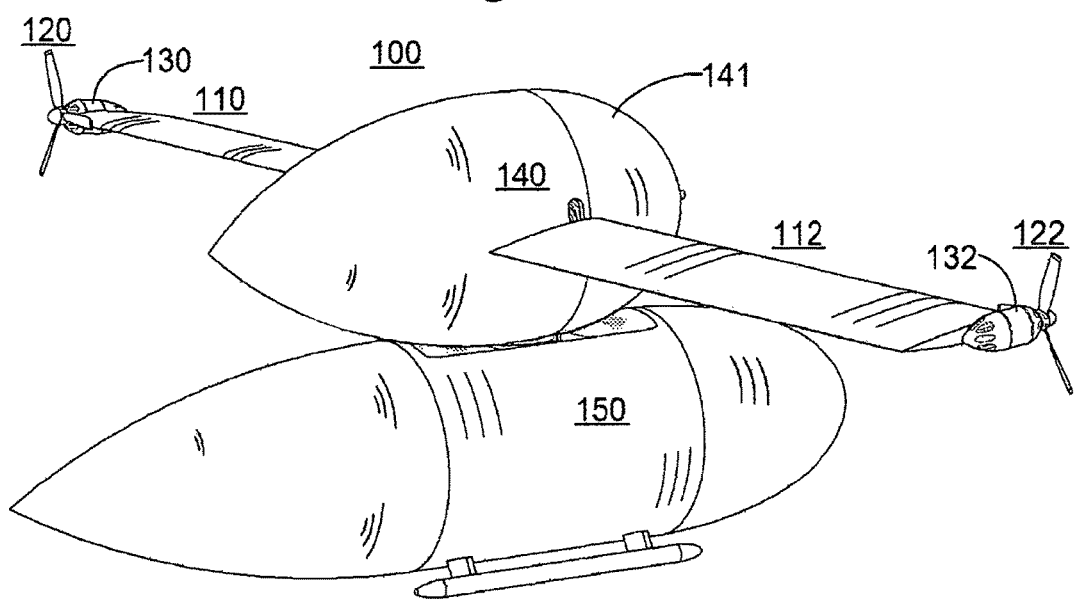
FIGS. 1 thru 20 show perspective views of the invention in varying flight orientations and settings of the flight degrees of freedom such as wing pitch angle and flapping angle of the teetering wing-rotor.
Figure 21:
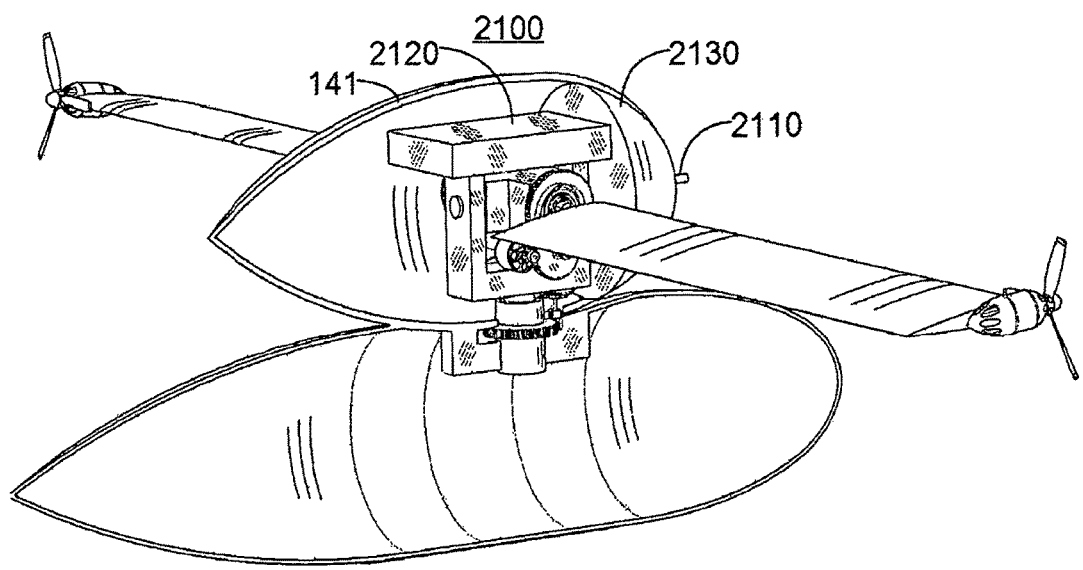
Figure 32A:
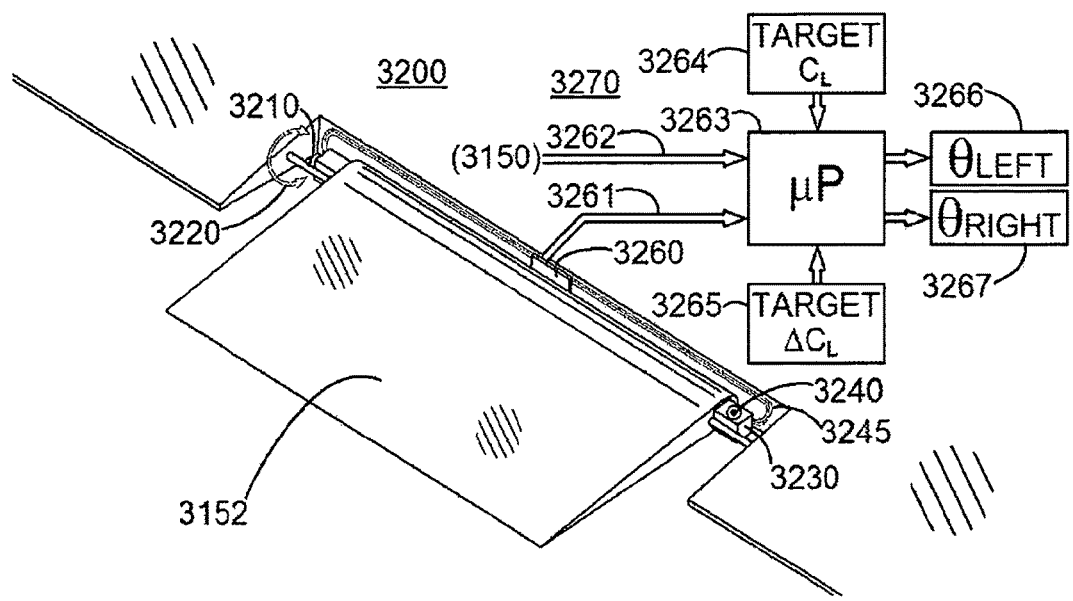
FIGS. 32*a*, 32*b* and 33 show variations on wing aerodynamic pitch angle detection and pitch servo control.
Figure 32B:
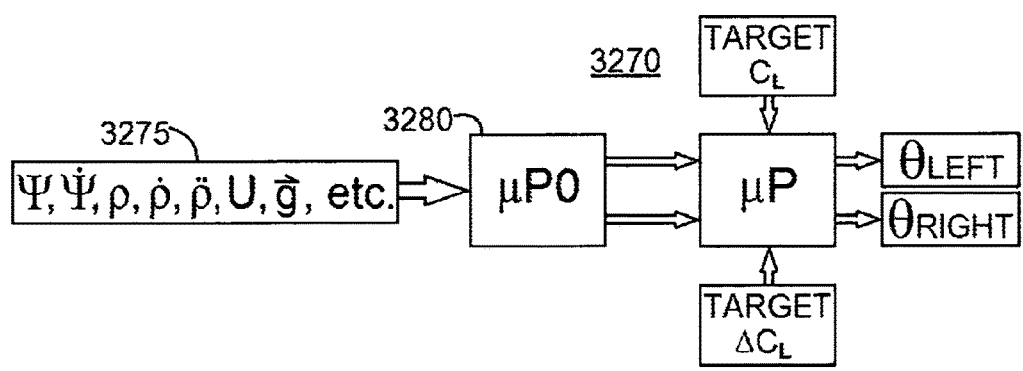
Figure 33:
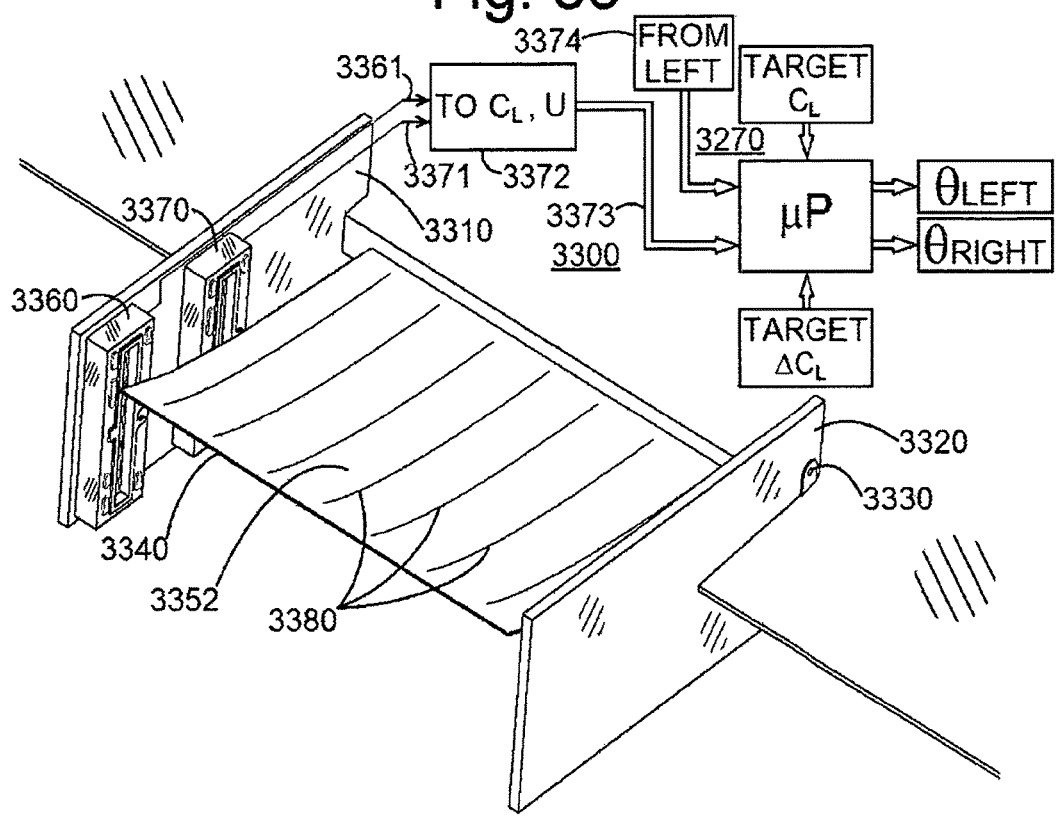
Figure 34:
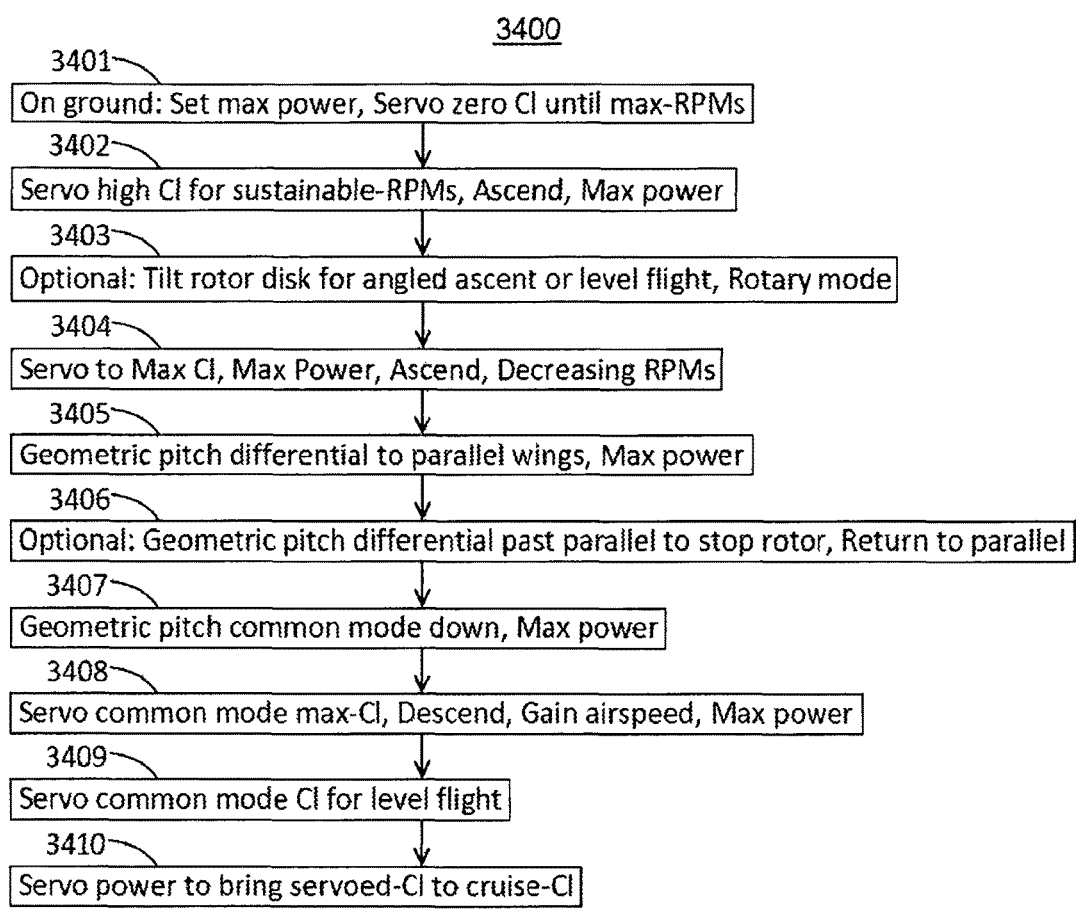
FIGS. 34 and 35 show steps of control methods. In greater detail.
Figure 35:
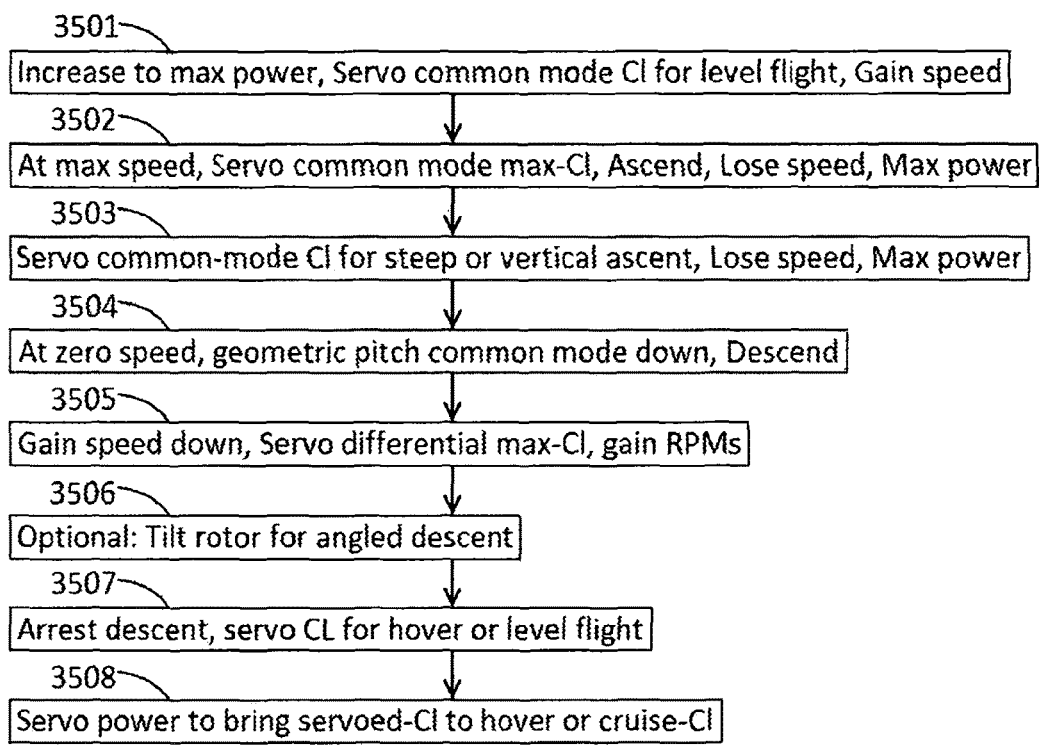

FIGS. 1 thru 20 show aircraft 100 of the present invention in its entirety but presented in different flight orientations and different settings of the control surfaces. View 2100 of FIG. 21 shows the same aircraft 100 in cutaway view, while views 2200, 2300, 2400 and 2500 of respective FIGS. 22 thru 25 show progressive removal of components and progressively closer detail views of this aircraft. Only FIG. 1 is labeled 100, while it is understood that subsequent FIGS. 2 thru 25 are showing the same aircraft 100 or portions thereof, while differing perspectives and flight settings of this aircraft 100 are commonly given separate numbers. FIGS. 26 thru 31 show alternative embodiments of the invention, to be discussed later. FIGS. 32a, 32b and 33 show wing aerodynamic attack angle sensors and their use for servo control of wing pitch. FIGS. 34 and 35 show steps for aircraft control in flight conversions.

Referring to FIG. 1, aircraft 100 includes a pair of wings, left wing 110 and right wing 112 that function as both helicopter rotary wings and as airplane wings. Rotor power and airplane propulsion are both provided by the same left and right propellers 120 and 122 driving the two wings and located along the wing spans, here shown optionally located at the wing tips (while other locations along the wing span are possible, as in FIG. 27, with two or more props per wing also possible.) The props are powered by motors 130 and 132. The combined props and motors are referred to collectively as thrusters, while FIG. 29 will show alternative thrusters taking the form of shrouded turbines and associated turbine engines. The system of wings, propellers and motors are joined to and controlled by a central hub 140, whose internal components are obscured in this view by a streamlined fairing 141. The hub usually carries the energy supply in the form of a battery or fuel, though part or all of the energy supply may optionally be carried by fuselage 150. It is an option that 150 may detach from the carrier system consisting of hub, wings, motors and props, so that the carrier might pick up, deliver and leave fuselages. In this optional setting, the carrier and detachable fuselage may be likened to an airborne tractor-trailer system with interchangeable trailers.

Figure 2:
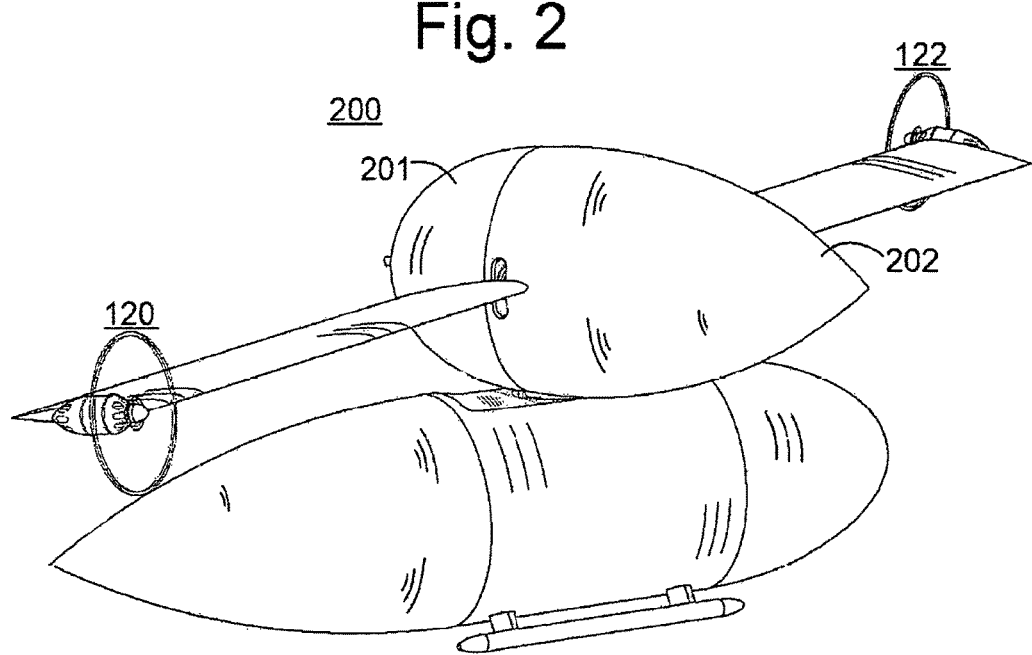
Figure 15:
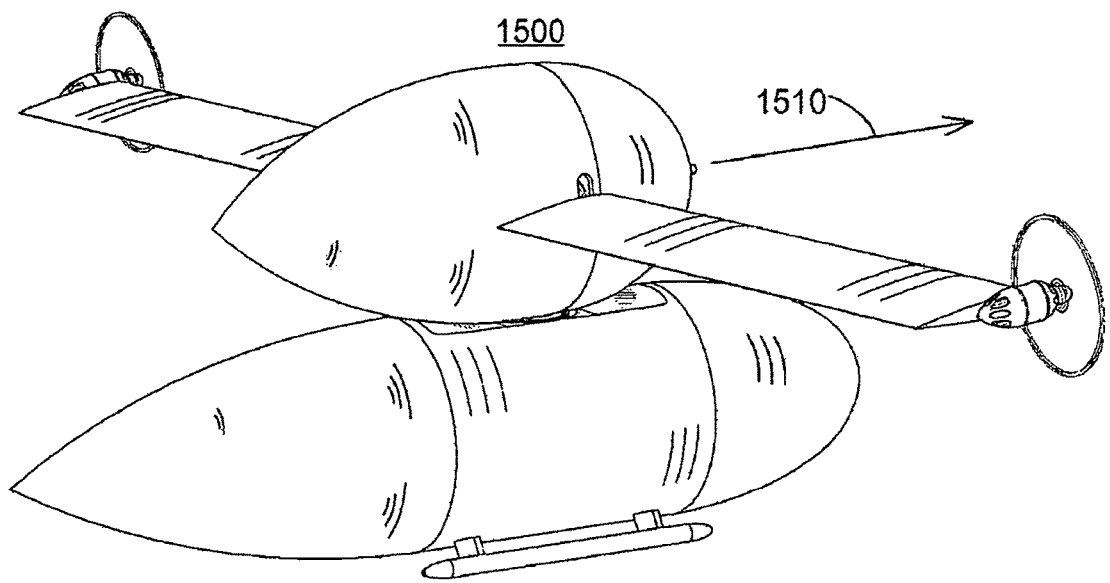

FIG. 2 indicates helicopter flight in configuration 200, where the FIG. 1 carrier system components 110, 112, 120, 122, 130, 132 and 140 rotate with respect to the suspended-below normally non-rotating fuselage 150 and are shown at an arbitrary angle, rotationally driven by the wing propellers (or simply: props) 120 and 122. These props, now rotating, are illustrated here and in most subsequent figures as transparent disks made visible by a ring in the plane of the rotating blade tips. Except for repeat labeling as with 120 and 122 here in FIG. 2, where some alteration of appearance might make the component identity non-obvious, the basic 100-series components are not re-numbered in FIGS. 2 and following, since the illustrations make the component identities obvious. In FIGS. 1 and 2, the right-hand wing and prop assembly faces forward with respect to the rounded front 201 of fuselage 140 while the left-hand wing and prop assembly face backward in the direction of the pointed end 202 of the tear-drop hub fairing. so, that the props give thrusts in approximately opposite directions to provide rotary wing torque. While the wings are oriented for rotary-wing flight in FIG. 2, FIG. 15 shows aircraft 100 in airplane-mode flight, where both wing leading edges and both props face forward. Here the wings generate conventional fixed-wing lift, and the props provide conventional propeller forward thrusts in approximately the same directions. Single figures and comparisons between pairs of figures illustrate various required and optional control degrees of freedom.

Degrees of Freedom in Single Images and Images Paired for Comparison

Figure 3:
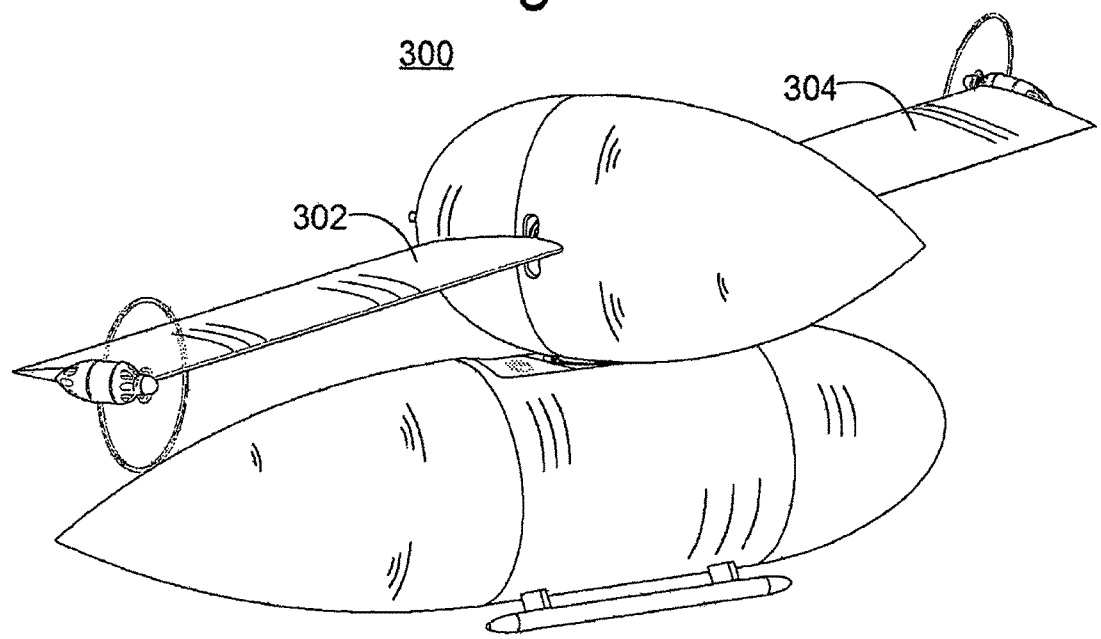
Figure 4:
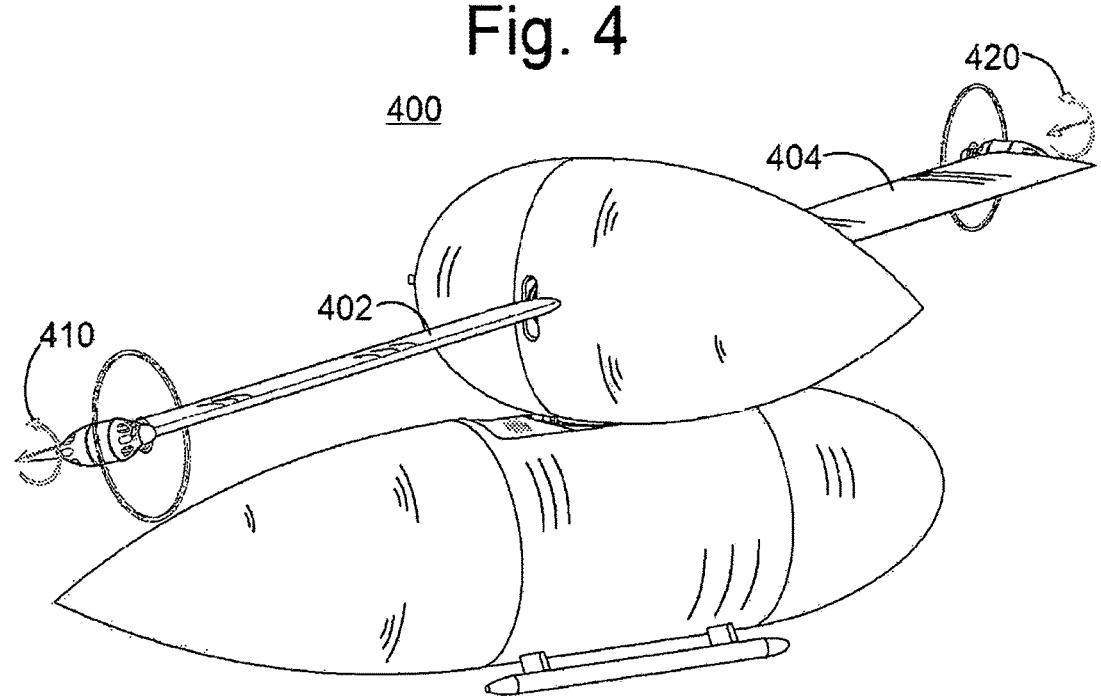
Figure 5:
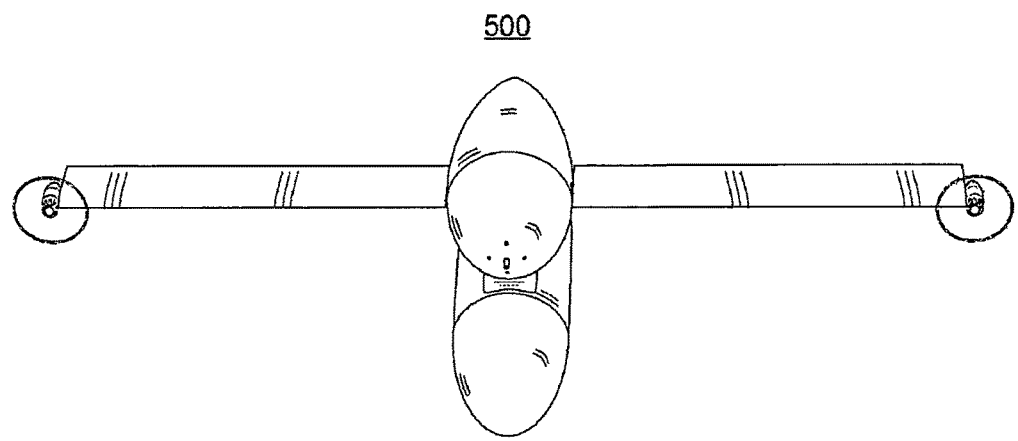
Figure 6:
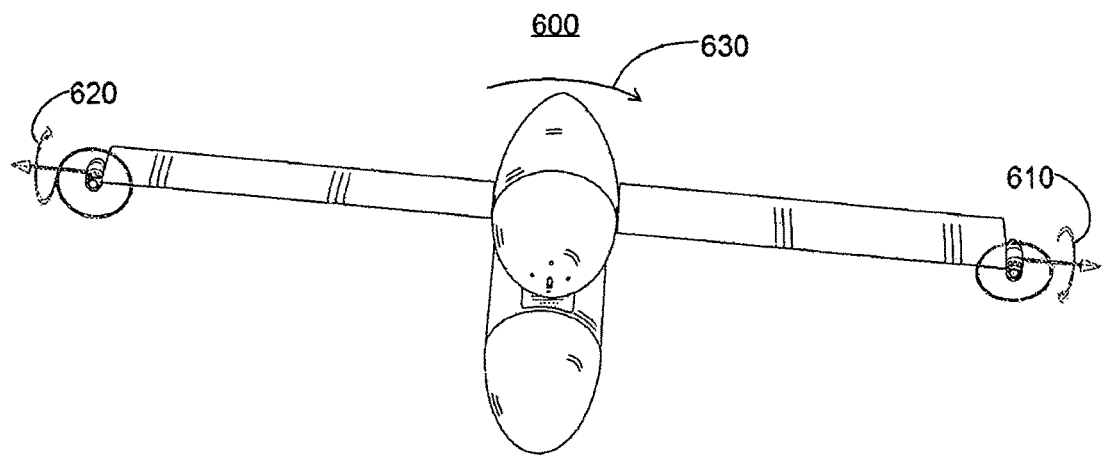
Figure 7:
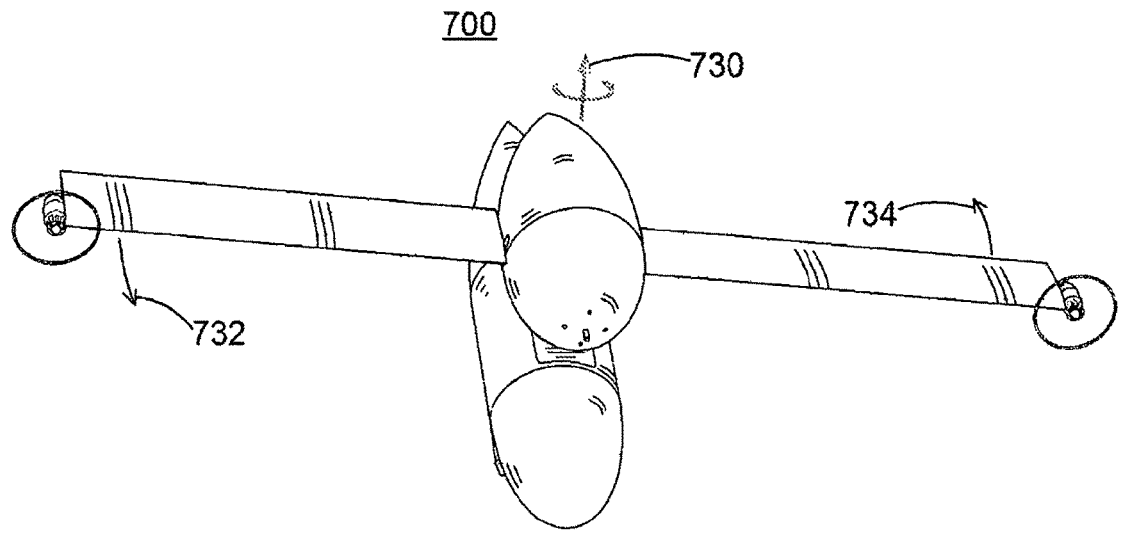

FIGS. 1 and 2 show rotor rotation relative to an optionally fixed fuselage azimuth angle;

FIGS. 3 and 4 show blade pitch changes associated with cyclic pitch which, when performed at one cycle per blade revolution (one-per-rev), control rotor plane tilt;

FIGS. 5 and 6 show airplane-mode differential-mode blade pitch change, acting functionally like aileron control to drive and control aircraft roll angle (while a flapping hinge can allow wing roll independent of fuselage roll, with fuselage roll-angle changes then generally lagging behind wing roll-angle changes);

FIGS. 6 and 7 show airplane yaw angle change resulting from airplane differential left-right prop thrust variations acting functionally like rudder control to drive and control aircraft yaw angle.

Figure 8:
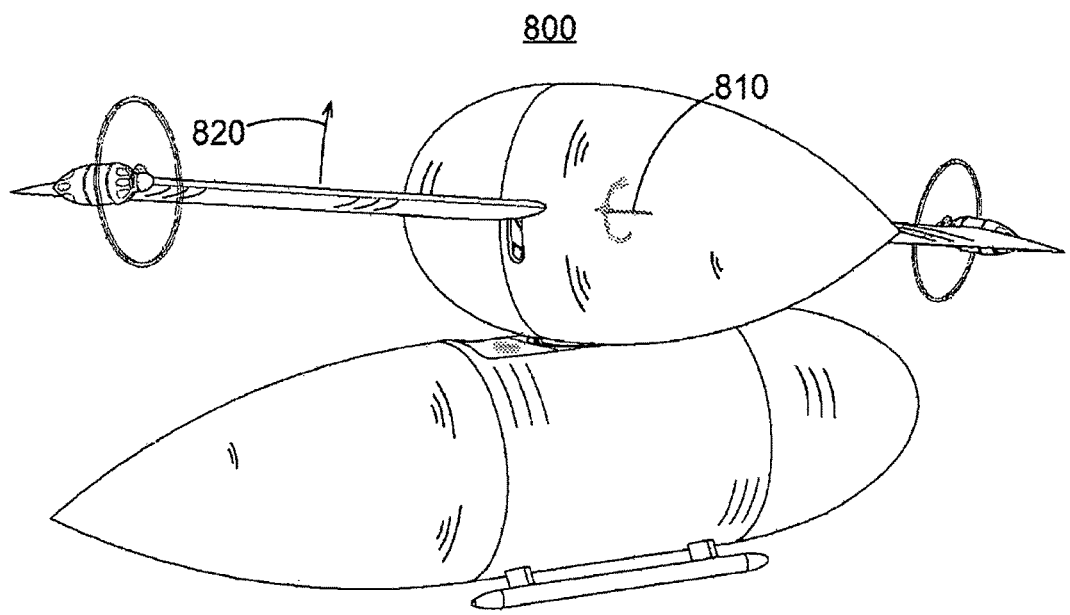
Figure 9:
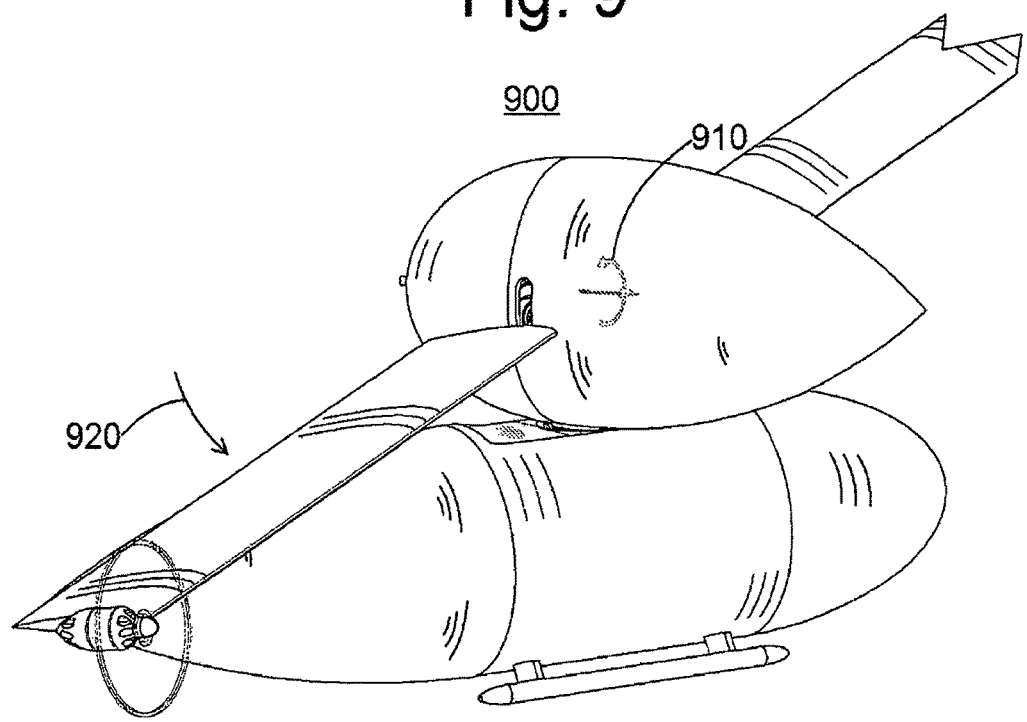
Figure 10:
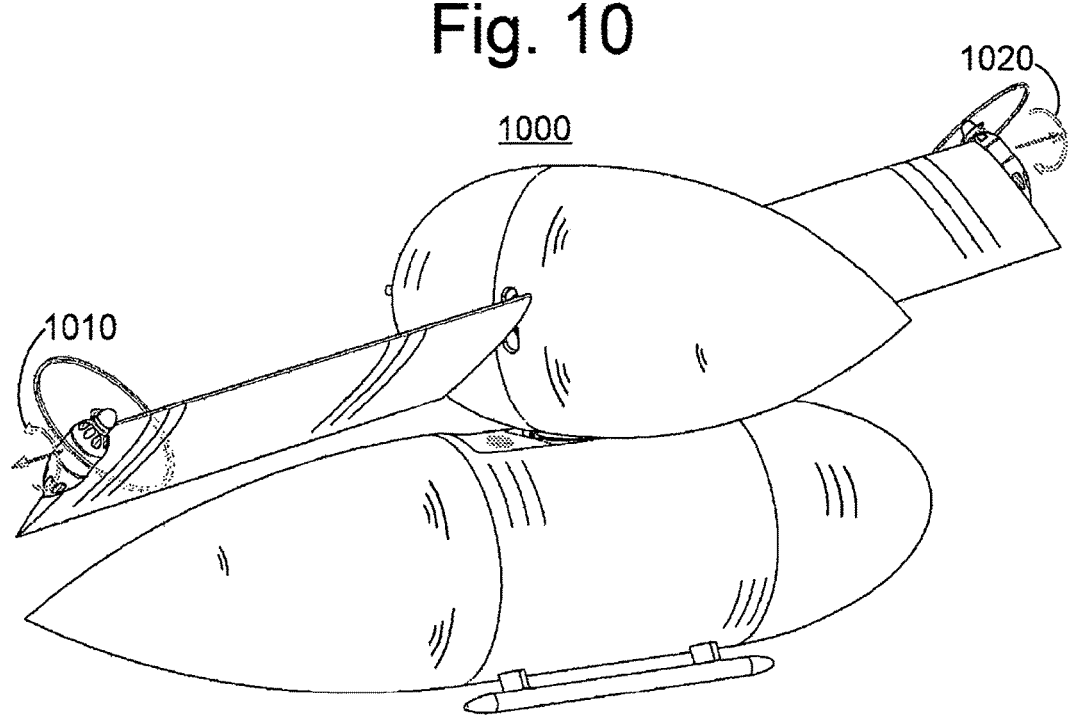
Figure 11:
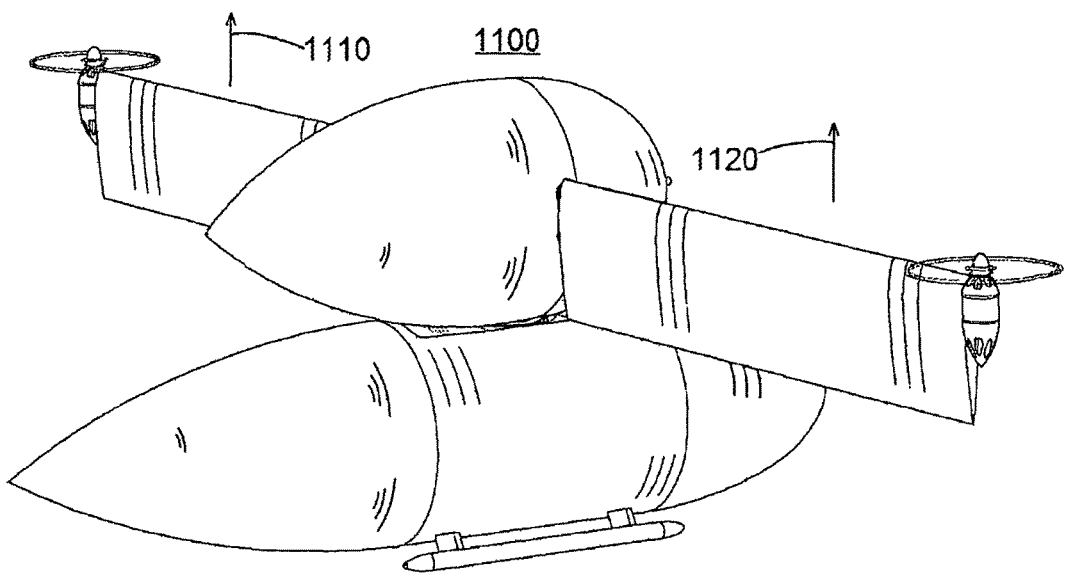
Figure 16:
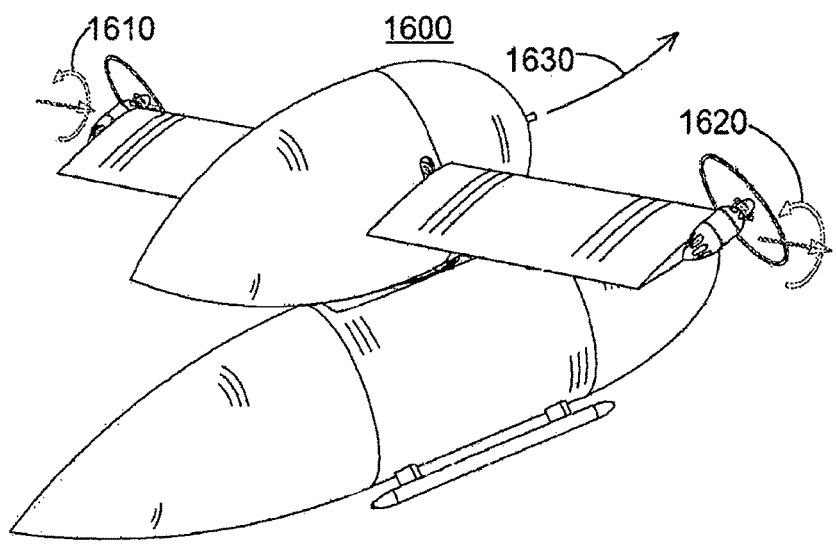
Figure 17:
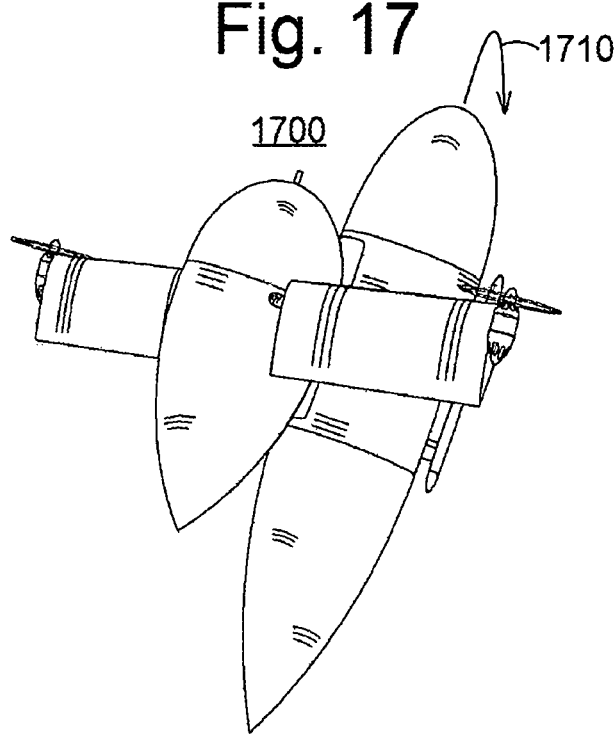
Figure 22:
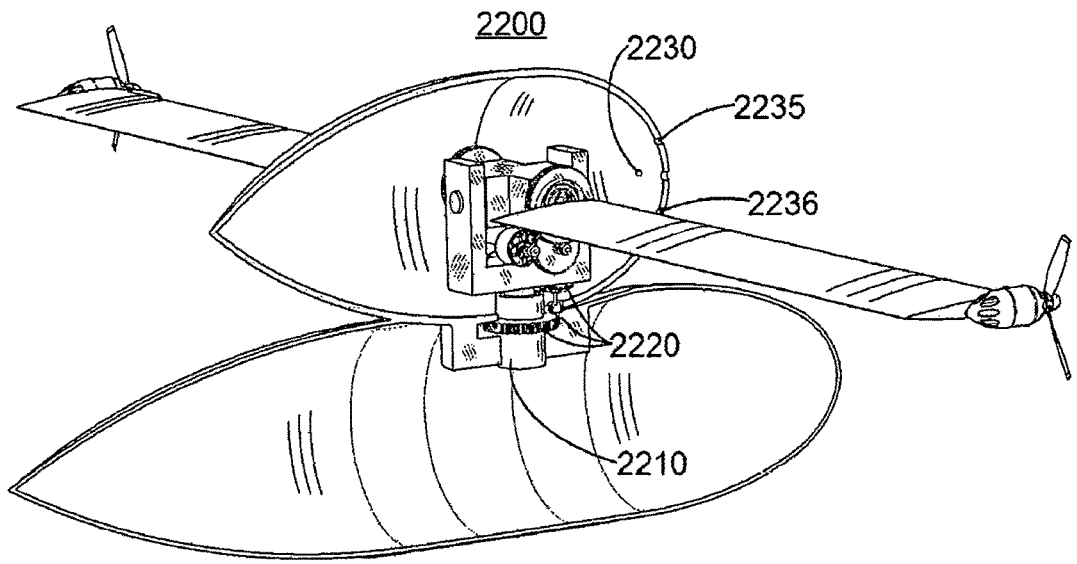
Figure 23:
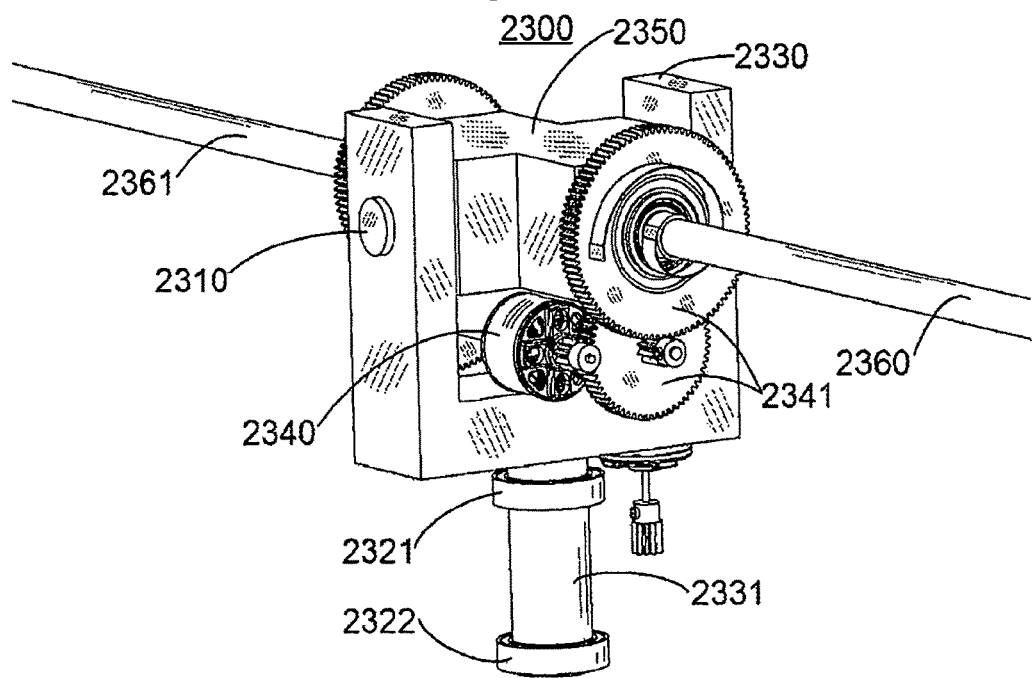
FIGS. 23, 24 and 25 show exposed and cut-away views of hub components.

FIGS. 8 and 9 show angle variations through an optional flapping hinge, resulting from cyclic pitch variation and allowing the rotor plane optionally to tilt independent of mast and fuselage alignment (while all components tilt with the rotor plane in the absence of the flapping hinge);

FIGS. 2 and 10 show collective blade pitch changes (with extreme pitch-up in FIG. 10) that control rotor lift and vertical velocity;

FIGS. 15 and 16 show airplane common-mode wing pitch changes (relative to the fuselage and hub fairing, which here are pitching up to a lesser extent than the wings), acting functionally like elevator control, these pitch changes driving changes in lift angle, lift, height and airspeed;

FIGS. 22 and 23 show a rotation-decoupling bearing assembly and gear actuation system to allow fuselage yaw angle control relative to the sometimes-rotating hub and wing assembly.

Figure 24:
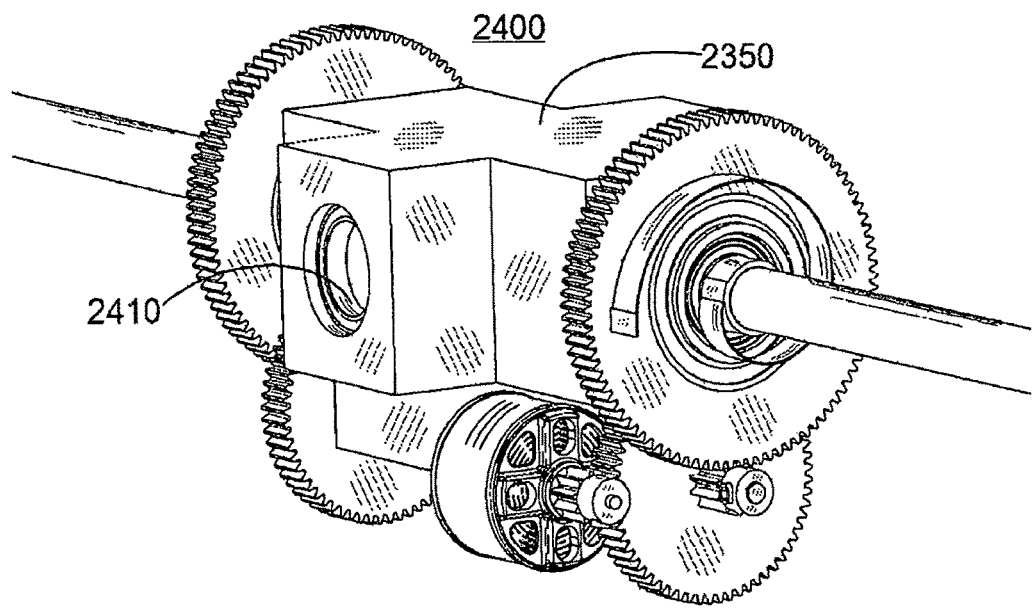

FIGS. 23 and 24 show a flapping hinge and also independent large-angle pitch actuation for each wing. These figures also show optional flat helical springs providing partial decoupling between the pitch actuation drivers and the wings, whereby cyclic pitch may optionally be driven by cyclic variations in prop-motor gyroscopic torques when the rotation speeds of the prop-motors are varied cyclically.

Figure 25:
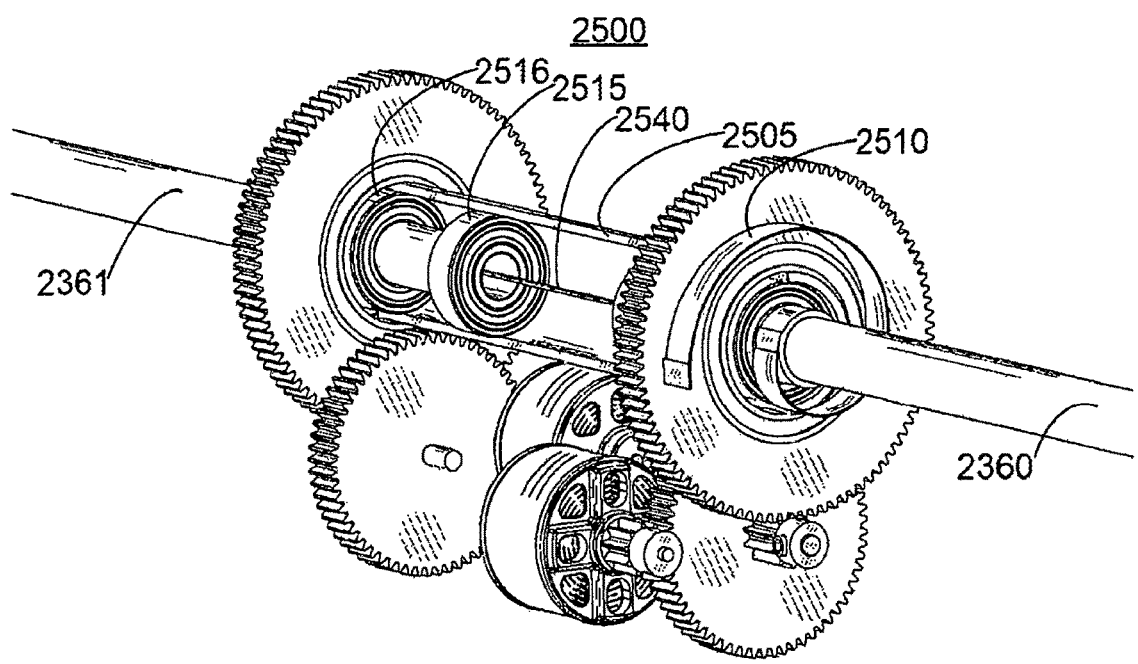

FIG. 25 shows pitch change bearings and a torsionally-compliant wire whose tension opposes wing centrifugal force while allowing common-mode and differential wing pitch changes including through large angles.

Figure 26:
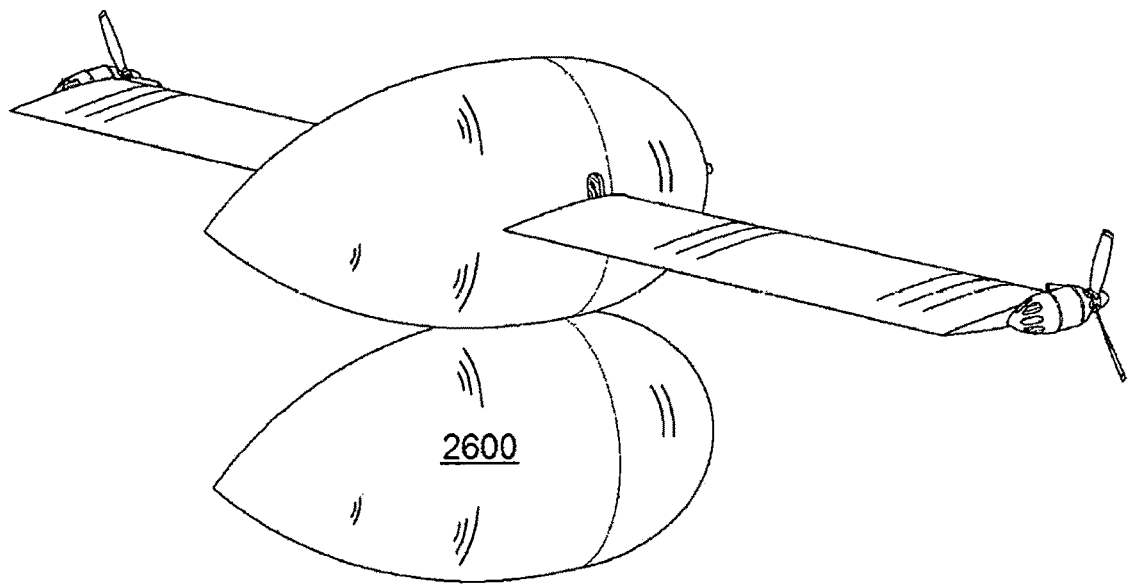
FIGS. 26 thru 31 show significant design variations of the aircraft design within the scope of the invention. Detail
Figure 27:
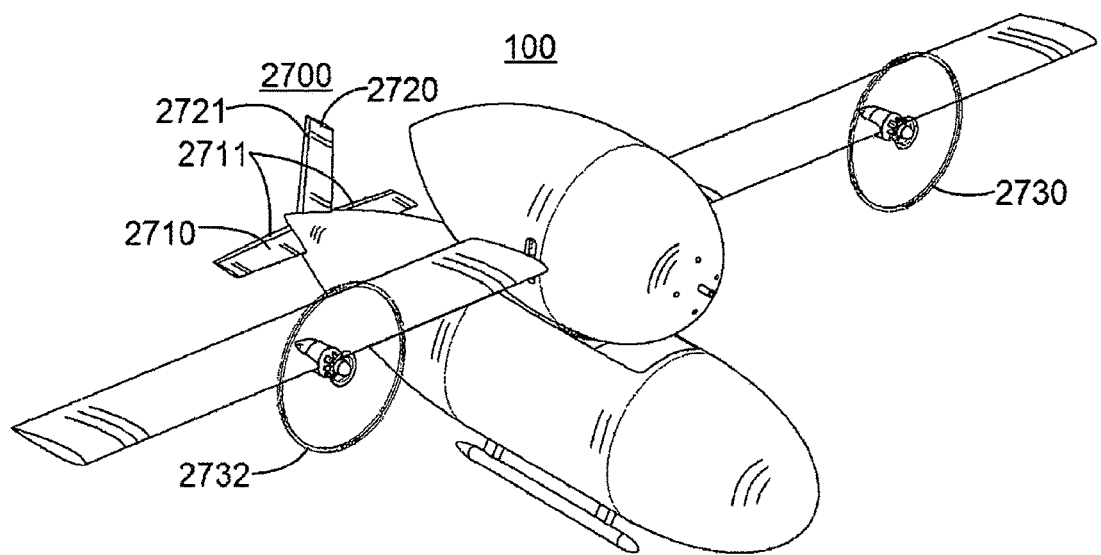

FIG. 26 (with no paired counterpart) shows an underslung fuselage 2600 optionally joined rigidly to the hub fairing above it, thereby optionally omitting the helicopter-mode yaw-decoupling degree of freedom shown in the comparison of FIGS. 1 and 2;

FIG. 27 (with no paired counterpart) shows an aircraft structure including an optional fuselage tail 2700 with movable elevator 2711 and rudder 2721 in the trailing edges of horizontal stabilizer 2710 and vertical stabilizer 2720.

Figure 29:
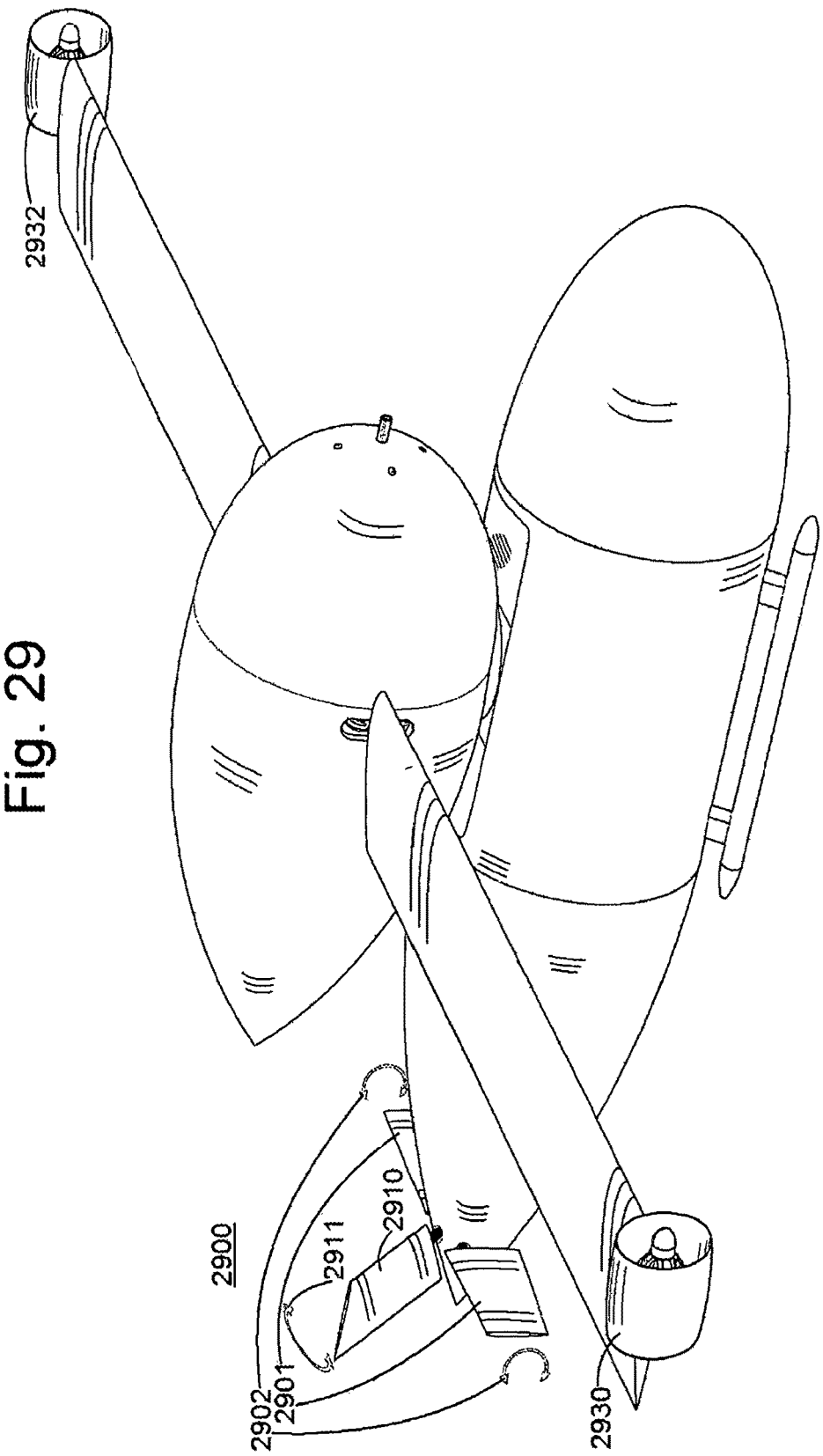

FIG. 29 shows a variation 2900 of tail 2700 in which sloping rotatable rudder 2910 interacts with rotary-wing downwash to provide fuselage yaw control while rotatable elevator 2901 interacts with downwash to provide controllable fuselage pitching moments.

Figure 30:
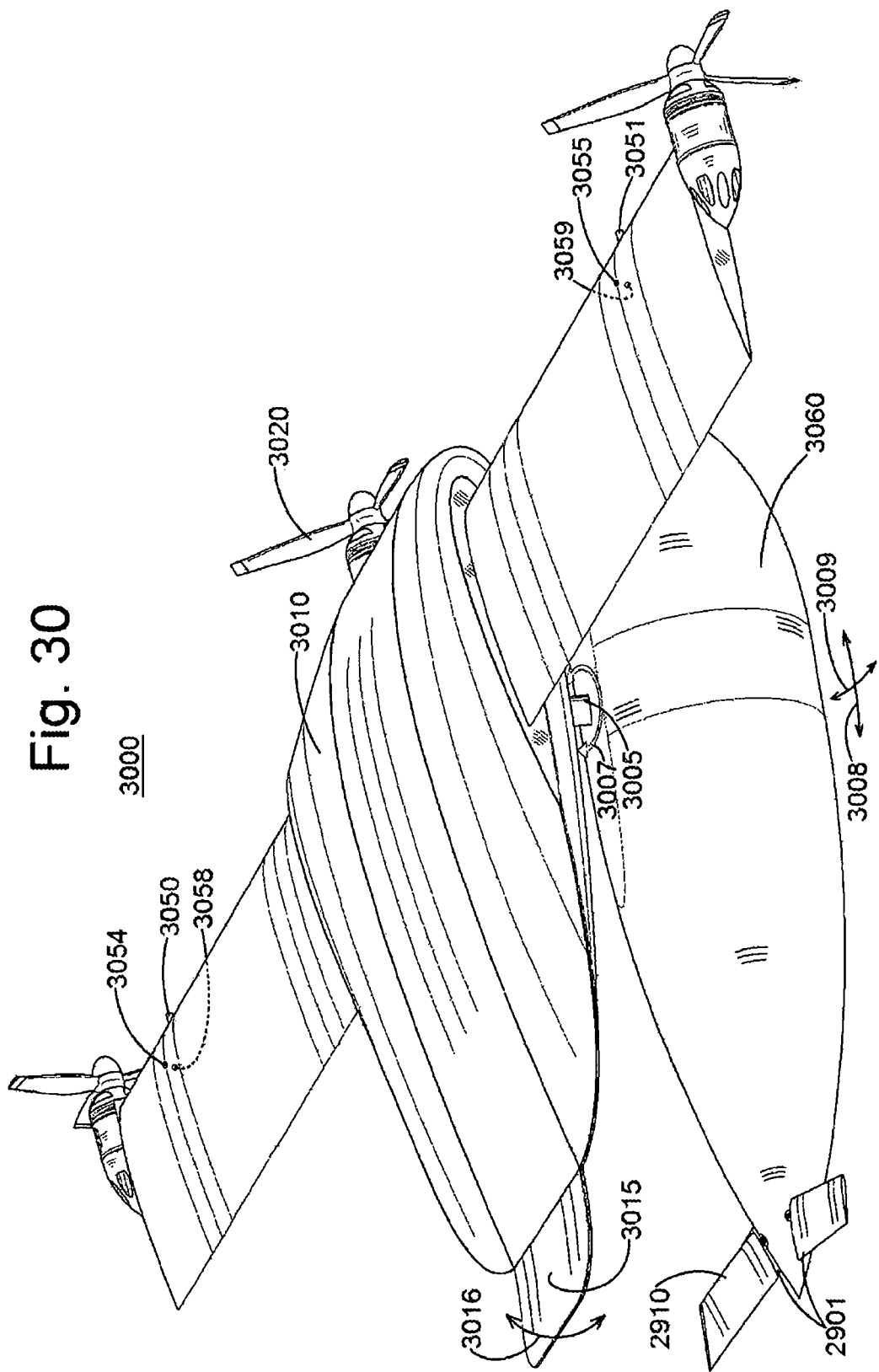

FIG. 30 indicates an alternative attachment from the wing-plus-hub carrier system to a detachable payload pod via suspension arm 3005. The carrier lacks the flapping hinge of system 100 shown in earlier figures, but instead incorporates a universal hinge (obscured) at the top of 3005, permitting angular decoupling for full rotary-wing rotation and for suspension at variable suspension tilt angles in pitch and yaw, as indicated by double rotation symbol 3007 for yaw-decoupling and rotary-wing rotation, 3008 for variable tilt affecting fuselage pitch angle, and 3009 for variable tilt affecting fuselage roll angle. The payload weight is therefore experienced by the carrier as a force vector along the line of 3005 with no significant torsion moments, the force being applied to a universal hinge at or near the aerodynamic center of the carrier. This system tolerates significant payload imbalances without disruption of carrier flight control.

Figure 31:
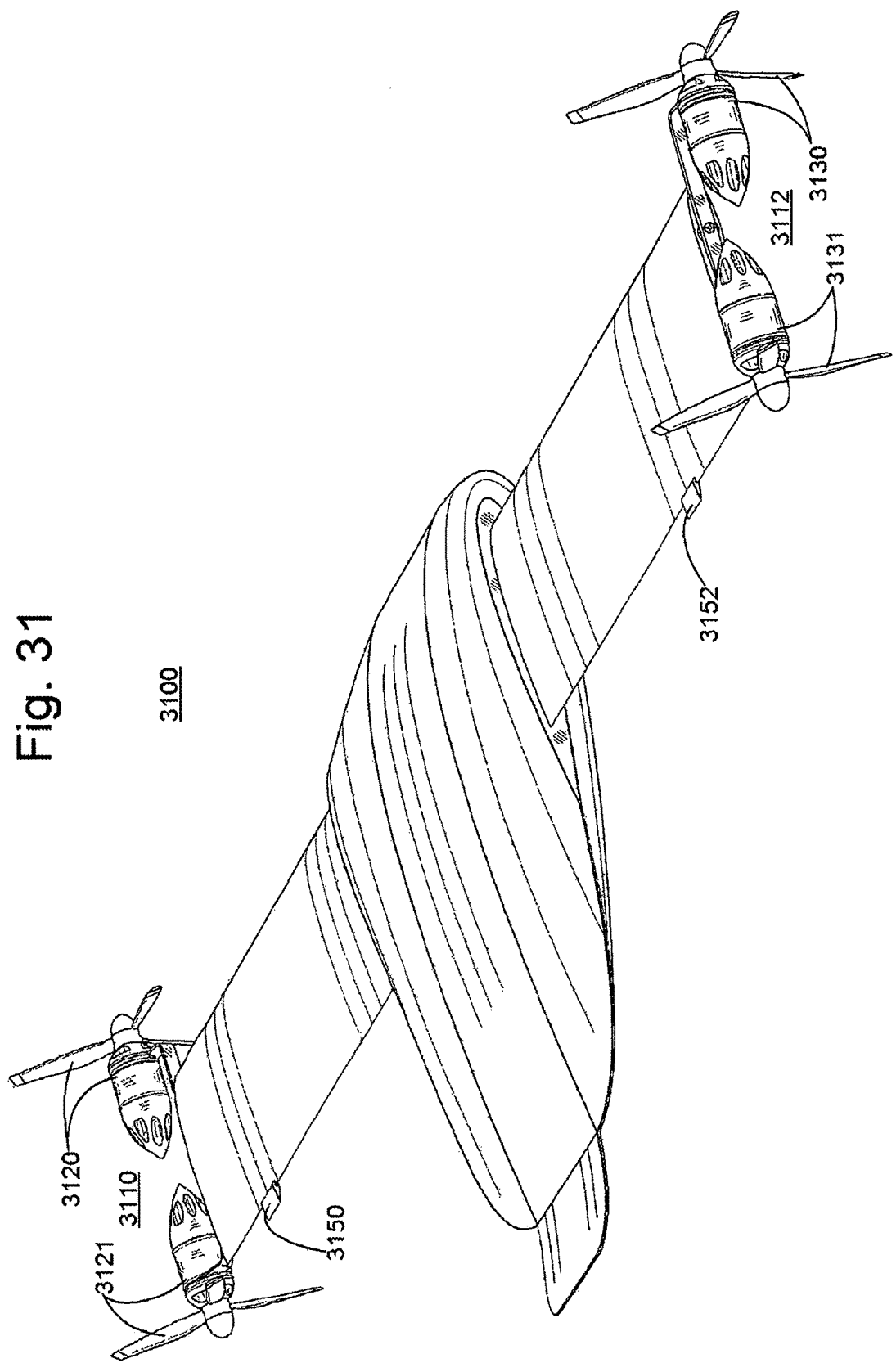

FIG. 31 shows optional paired counter-rotating push-pull props and motors 3110 and 3112 with offsetting gyroscopic pitching moments, wherein differential changes in rotation speeds of the paired props optionally provide full collective and cyclic pitch control in rotary-wing-mode. Offsets of the paired push-pull thrust vectors acting below and above the pitch change axes, combined with differential thrust variations within each over-and-under pair, optionally provide full pitch control in airplane mode.

Not shown in the figures, the yaw-inducing differential prop thrust variations of FIGS. 6 and 7 may result from rigid prop rotation speed variations or from optional propeller blade pitch variations, where the equipment required for variable pitch will generally be more complicated, especially in small-scale aircraft. Potentially quicker thrust variations can be obtained with variable pitch control, without the delay required for altered motor or engine torque to change prop angular speed and momentum. On the other hand, optional control of cyclic pitch using gyroscopic torque variation must depend on generally slower-responding variations in prop (or turbine) rotation speed. These control issues will be discussed later.

The following figure sequence may be regarded as selected frames from a movie showing flight conversion from helicopter mode to airplane mode and back to helicopter mode.

Selected "Movie Frames" of Flight Conversion:
FIGS: 2, 10, 11, 12, 13, 14, 15, 16, 17, 18, 19, 20, 2.

Note that several complete rotor revolutions may transpire in the sequence between FIGS. 2 and 10, between 10 and 11, and finally between 20 and 2. The significance of the frame sequence is described later.

Referring again to FIG. 1, left and right motors 130 and 132 (e.g. electric) or functional counterparts as engines (e.g. gas or turbine) to drive the props may be located adjacent to the props as shown or may optionally be located elsewhere (not shown), for example centrally with prop connections via rotary shafts and right-angle gears. Various mechanical degrees of freedom are described, some of them passive and others subject to powered actuation, some of them being optional. These are listed here in outline form and then described more completely, starting with primary ones.

Degrees of Freedom, Descriptions:
1. Controlled independent feathering of the two wings about their pitch change axes, including:
a. Helicopter collective pitch change
b. Helicopter cyclic pitch change
c. Airplane common-mode pitch change to control altitude, speed (elevator equivalent)
d. Airplane differential-mode pitch change to control roll (aileron equivalent)
2. Controlled independent power-speed variation of the motors/props on each wing, including:
a. Helicopter common-mode power-speed variation to control rotor rotation speed
b. Helicopter differential cyclic speed and gyroscopic torque variation to drive cyclic pitch (optional)
c. Airplane common-mode power-speed variation to control speed, altitude
d. Airplane differential-mode power-speed variation to control yaw
3. Passive hinge to allow flapping degree of freedom (optional)
a. Helicopter mode, allows rotor-plane tilt independent of mast-fuselage tilt
b. Airplane mode, allows wing roll independent of mast-fuselage roll
4. Rotation decoupling of rotor mast and hub from fuselage
a. Omission option (2600): no decoupling, everything spins with the rotor
b. Passive/aerodynamic option (2700): wind aligns fuselage during forward flight
c. Active/aerodynamic option (2900, 3000): rotor downwash pushes variable control surface
d. Active/mechanical option 2220: motor drives counter-rotation of fuselage via bearing suspension 2210

The items of the above outline are now described.
1. Controlled Independent Feathering of the Two Wings Each wing rotates about a pitch change axis, this axis typically being aligned with or nearly with the airfoil lifting line at or near the 25% chord. Called wing feathering, this pitch change degree of freedom is illustrated in FIG. 4 in a differential rotation, compared to the un-rotated or neutral pitch positions of FIG. 3. Angular rotations in a specified direction, whether through limited angle changes as going from FIGS. 3 to 4, or through many revolutions of continuous rotation, are symbolized in perspective by the combination of a circular arrow with a straight arrow going through the middle. The straight arrow direction represents the rotation sense by the vector convention for indicating right-handed rotation or angular momentum. In references to pitch change, the modifier "differential" refers to changes that increase the lift of one wing while decreasing lift of the opposite wing. The modifier "common mode" refers to matching lift change of the two wings. Observe, however, that in a purely geometric sense a "differential" pitch change in rotary-wing-mode will have the wings pitching in the same rotation sense with respect to an external observer, as with 410 and 420 of FIG. 4, while "differential" pitch change in airplane-mode will have the wings pitching in opposite rotation senses with respect to an external observer, as with 610 and 620 of FIG. 6.

In related configurations 300 and 400 of FIGS. 3 and 4, the slightly pitched-down left and right wings imaged at 302 and 304 are compared with the corresponding pitched-up wings 402 and 404. To further emphasize and clarify the pitch rotations going from 300 to 400, the directional rotation symbol is used at 410 to indicate left-wing pitch up and similarly for right-wing pitch-down at 420. As mentioned above, this is a differential pitch change. Similarly, a common-mode pitch up rotation is shown in configuration 1000 of FIG. 10, with left wing pitch-up 1010 matching right-wing pitch-up 1020. In helicopter or rotary-wing-mode flight, this common-mode pitch change is called collective pitch change. When a differential-mode pitch change is synchronized with rotor rotation at one pitch change cycle per rotor revolution, or "one-per-rev" pitch change, this is called cyclic pitch and is used to alter and control the plane of rotation. In later figures (e.g. 29, 30), alternating cyclic or irregular small angular rotations are symbolized in perspective by a circular double arrow with no straight arrow through the middle.

In the present invention, the wing airfoils are typically symmetric, since one of the two wings must reverse its direction of lift when transitioning in either direction between helicopter and airplane modes. An aerodynamic symmetry of the two wings is desirable, considering that one of the two wings must operate "right side up" in helicopter mode and then "upside down" airplane mode. For similar reasons, the wings are typically not twisted. A potentially desirable twist with decreasing pitch angle going from root to tip would become reversed and would go the wrong way following transition from one flight mode to the other. Variable wing geometry opens up more options, for example when a wing can be cambered one way for helicopter flight and the camber removed or reversed as needed during conversion to airplane flight. Independent pitch control of each wing is an aspect of this invention, including through pitch change angle ranges relative to the hub of about 120 degrees or more for at least one wing.

Pitch control requirements fall roughly into two categories: rapid controlled cyclic pitch change through relatively small angles, as is familiar for controlling the plane of rotation of a helicopter rotor; and relatively slow pitch changes to vary collective pitch in helicopter mode, net lift angle in airplane mode, and left-right differential lift angle for airplane roll control—the equivalent of aileron control but using whole-wing rotations in the context of this invention. As mentioned, the relative pitch angle changes used for cyclic pitch control are illustrated by a comparison of the wings in FIGS. 3 and 4 and by symbols 410 and 420. In these figures, note that the two wings are rotating through the same angle in space, as viewed from beyond the craft looking across, but since these rotary wings are traveling in opposite directions, that same angle becomes pitch-down for one wing (at 420) when it is pitch-up for the opposite wing (at 410). As also mentioned, a one-per-rev cyclic pitch variation in this mode tilts the rotor disk plane: a cyclic pitch mode. If the wings are aligned in the same direction in an airplane mode, as in the pitch change transition from configuration 1500 to 1600 in FIGS. 15 and 16 and as indicted by rotation symbols 1610 and 1620 for the left and right wings, then the "same way" pitch change pattern shown for providing differential lift change, cyclic pitch and rotor tilt in FIGS. 3 and 4 gives a left-right-symmetric or common-mode lift change in the airplane mode, for example pitch-up going from 1500 to 1600. For similar reasons, opposite-direction pitch changes, again as viewed from beyond the craft looking across, provide changes in common-mode or collective pitch and in net lift for helicopter mode. The same opposite geometric pitch changes with one wing flipped around, in airplane mode as shown going from 500 to 600 (FIGS. 5 and 6) with opposite rotations 610 and 620, give a differential change in wing aerodynamic angle of attack and a roll rotation response indicated by arrow 630. So it is seen that the same blade pitch actuation controls operate in both helicopter and airplane modes, but with seemingly opposite results, calling for differing control functions in the two modes. Proceeding to configuration 700 of FIG. 7, the roll rotation rate has stopped, leaving a cumulative roll angle. The aircraft is responding to that roll angle in a coordinated turn with a yaw rotation rate indicated by arrow 732 for the relative advance of the aircraft's left wing (on the viewer's right) and by arrow 734 for the dropping back of the opposite wing. The yaw rotation vector symbol 730 expresses in a different way the rotation that is symbolized by arrows 732 and 734.

While yaw rotation might optionally be controlled as indicated in FIG. 27 by vertical stabilizer 2720 with variable rudder control surface 2721, an embodiment with less mechanical equipment, lower weight and lower drag-inducing surface area accomplishes yaw control through opposite changes in propeller thrusts on the two wings. Such changes can be accomplished through propeller blade pitch variation or more simply in the embodiment of aircraft 100 through variable speed control of the motors driving fixed-pitch props. Descriptions of opposite left-wing and right-wing props and their differential speed controls apply similarly to left-right differentials involving sets of two or more props on both left and right wings, for example as shown in embodiment 3100 of FIG. 31 at 3110 and 3112, and similarly with turbine engines as shown in embodiment 2900 at 2930 and 2932 of FIG. 29.

2. Controlled Independent Power-Speed Variation of the Motors/Props

Clearly, varying motor power and prop thrust on both wings in helicopter flight will alter rotor speed and power, as needed in conjunction with collective pitch changes to control lift and vertical velocity.

Less obviously, as the props spin about their own axes and simultaneously rotate about the rotor hub, the resulting gyroscopic torques tend to alter the rotor blade pitches. If the rotor blades and props both function as right-hand airscrews, with the rotary wings lifting upward when rotating counterclockwise as viewed from above (and as shown in these figures) and with the props also rotating counterclockwise as viewed from in front (thrusting toward the observer), then the gyroscopic moments on the props will tend to pitch the rotary wings up. The same pitch-up torsion occurs if blades and props are both left-hand airscrews. Since the inertias of flat untwisted rotor blades tend to lie flat in the plane of rotation and resist upward pitching, the pitch-up propeller gyroscopic interaction is potentially beneficial. On the roughly one-meter-span scale of the illustrated aircraft, gyroscopic pitching moments from the props can represent a significant fraction of the total pitch-up moment needed for hovering flight or, depending on design details, the gyroscopic moments can be excessive compared to the so-called "tennis racket" wing-flattening effect of helicopter parlance. Cyclic variation in prop rotation speeds can augment or entirely drive cyclic pitch. Previewing view 2500 of FIG. 25, a flat spiral-wound torsion spring 2510 coupling the pitch change gear to the tubular wing spar allows the rotary wing to undergo cyclic pitch changes driven entirely by gyroscopic torque varying with the prop speed, provided that the torsional spring rate falls in an appropriate range to "tune" the natural pitch oscillation (which tends naturally to be slightly slower than one-per-rev when there is no torsion spring present.)

Aircraft with twin engines, four engines (two per wing) or six engines (three per wing) commonly derive equal power from the left-wing and right-wing engines. In the present invention, it is an extension of common practice to use variable symmetric or common-mode prop motor power variations for speed and altitude control. Use of variable antisymmetric or differential-mode prop power variations for yaw control is less obvious, as conventional aircraft rely on rudder control to produce yaw. In designs of the current invention intended optionally to eliminate the necessity of a trailing rudder or leading yaw control surface, a left-right differential in engine power and/or blade pitch is used to produce yaw. This operating mode will generally call for active electronic yaw sensing and feedback, which is readily accomplished in modern aircraft with potential reductions in mechanical complexity, weight and cost.

One optional mode for sensing indicated airspeed, aerodynamic pitch and yaw in airplane mode is illustrated in FIGS. 5, 6, 7, 21 and 22. At the front of hub fairing 141 (shown originally in FIG. 1 and again in FIG. 21) is a protruding pitot tube 2110 (FIG. 21), whose aerodynamic impact or stagnation pressure is compared to the lower pressure sampled either from the side of the same tube or from inside fairing 141, that fairing pressure representing an average effect of the bottom hole and side slots in the mid-circumference of the fairing. Differential pressure sensing across the pair of holes to the left (2230, FIGS. 22 and 28) and right (2231, FIG. 28 only) of the protruding tube is sensitive to aerodynamic yaw, while similar sensing across the above (2235) and below (2236) pair of holes (seen in both FIGS. 22 and 28) is sensitive to aerodynamic pitch. When these yaw-sensitive and pitch-sensitive pressure differentials are divided by the impact pressure differential arising from 2110, the respective ratios provide nonlinear measures of geometric wind angles in yaw and pitch. An algorithm that uses these lateral and vertical pressure differentials in conjunction with the indicated airspeed pressure differential can correct for nonlinearities and yield the true yaw and pitch angles. The same sort of sensing and hole patterns can be used on the lower fuselage nose, instead of or in addition to the sensing described for the hub fairing. As will be discussed later, similar aerodynamic pressure sensing may optionally be used for servo control of wing aerodynamic pitch angle, as a desirable alternative to direct control of the geometric pitch angles of the wings relative to the control hub reference geometry.

3. Passive Hinge to Allow Flapping

For flight control in helicopters, a flapping hinge degree of freedom is commonly provided, though some rotary wing aircraft fly without it. The flapping degree of freedom is illustrated in views 800 and 900 going from FIG. 8 to FIG. 9, with the nearer wing angling from up (820) to down (920) and the farther wing angling from down to up, those relative angles being indicated respectively by rotation vector symbols 810 and 910. A flapping hinge is viewed in context in FIGS. 21 and 22 and in greater detail in FIG. 23 (at 2310) and 24 (at 2410), all of which are discussed later. In helicopter mode, the passive flapping hinge allows tilt of the rotor disk plane, that tilt being controlled by cyclic pitch variation. In horizontal airplane flight, wing rotation about the flapping axis amounts to roll rotation of the wings, which can be initiated and stopped at a new angle before the roll angle of the pendulous fuselage has had time to follow significantly. Differential prop thrust is used to counter adverse yaw during rapid wing roll rotations. The flapping hinge is an optional feature and is not included in the aircraft embodiments 3000 and 3100 shown in FIGS. 30 and 31.

4. Rotation Decoupling of Rotor Mast and Hub from Fuselage

FIG. 26 represents an optional aircraft system according to the present invention in which an underslung fuselage 2600 is joined rigidly to the hub fairing. This fuselage rotates with the hub and rotary wings in helicopter mode. This simplified system, lacking the bearings and other features that decouple the fuselage from wing rotations and independently control fuselage yaw, may find use where all system components including the payload are allowed to spin continuously. In a minimal system whose priority is range in horizontal flight on battery power, and whose "payload" consists largely of extra batteries to provide that range, the rotating "fuselage" potentially becomes largely a battery compartment wired directly to the above components without need for rotary interconnection. The pendulous fuselage weight plays a role in dynamic airplane flight control, as described in the next section.

While FIG. 1 shows the wings emerging from a streamlined rotor hub fairing 141 lined up with a fuselage 150 hung below the hub, configuration 200 of FIG. 2 indicates rotation of the hub and its fairing with respect to the fuselage in helicopter rotary-wing-mode. The props, optionally 3-blade props as shown in FIG. 1, are illustrated as translucent disks in later figures, a visual representation of fast rotation. Other numbers of blades per prop are feasible in the context of the present invention, although 2-blade props will have an unfavorable tendency to vibrate due to the gyroscopic interactions in rotary wing mode, as will be further discussed below. The hub fairing and its shrouded components spin with the rotary wings, and the wing azimuth or yaw rotation angles of the drawings are chosen arbitrarily in representations of helicopter flight.

In common embodiments of this invention, the fuselage is coupled to the rotor mast via bearings, for example inside bearing sleeve 2210 of FIG. 22 and with bearings 2321 and 2322 constraining shaft 2331 of FIG. 23, thereby decoupling fuselage and rotor-mast rotations. With passive decoupling and in the absence of aerodynamic controls, the fuselage can be expected to rotate slowly and uncontrollably beneath a hovering rotor. In horizontal flight, in helicopter mode and especially in airplane mode, aerodynamic forces may tend to align the fuselage in a streamlined direction, depending on the fuselage shape. This passive self-alignment can be augmented with a trailing vertical stabilizer, as in FIG. 27 at 2720.

Extending fuselage yaw control to the hovering situation, a variable pitch rudder 2910 of FIGS. 29 and 30, placed at some horizontal distance from the mast and operating in the rotor downwash, can use the rotor downwash to rotate the fuselage to a desired yaw angle under servo control. As indicated by the sloping perspective of the left-right variable rotation symbol 2911 and by the backward slope of the rudder itself, 2910 can interact controllably with wind angles ranging from vertical rotor downwash to a horizontal air stream in forward flight, regulating fuselage yaw under all those conditions. Even in forward flight, rudder control can intentionally twist the fuselage to a yaw angle significantly out of alignment with the flight path through the air, as could be useful for example in aerial photography. Additional optional variable control is indicated by back-and-forth rotations 2902 of the joined pair of elevator surfaces 2901 to provide limited fuselage pitch angle control in both rotary-wing and airplane modes. Although the wings and thrusters are shown in an airplane-mode configuration in FIG. 29, the rotatable elevator 2901 is shown pointed leading-edge-up, an orientation which would streamline it in vertical rotor downwash and be in an unstalled operating range for significantly influencing the fuselage pitch angle. The same pair of surfaces 2901 is shown horizontally oriented in aircraft configuration 3000 of FIG. 30. In a range of angles about this horizontal orientation, 2901 is of potential use in compensating for weight imbalance in the fuselage and helping to keep the fuselage level. Note that in configuration 3000, the near-side extension of elevator 2901 is fully visible while sloped rudder 2910 mostly obscures the far-side elevator extension.

In the contexts of FIGS. 29 and 30, 2901 adjusts the fuselage pitch angle, but the pitch effects on the aircraft hubs differ in the two configurations. In FIG. 29, the hub and the fuselage are constrained to a common vertical axis, as shown in views 2200 and 2300 with the vertical bearing sleeve 2210 surrounding shaft 2331, the axis of 2331 being held coaxial with 2210 by bearings 2321 and 2322. The plane of rotation of the rotary wing pair here is allowed to tilt with respect to this common fuselage-hub axis, both laterally and fore-and-aft, by the flapping hinge mechanism involving 2310, 2330, 2350 and 2410.

By contrast with FIG. 29 and related earlier figures portraying flight configurations of embodiment 100, in aircraft system embodiment 3000 there is no flapping hinge in hub 3010. Consequently, 3010 is constrained to spin in the same plane as the rotary wings. The nominal vertical axis of the fuselage or detachable cargo pod 3060, however, is not constrained to alignment with the nominal vertical axis of 3010. Pod 3060 is joined to 3010 and the associated spinning components by streamlined vertical shaft 3005. A universal bearing hinge at the top of shaft 3005 (not visible in the illustration) allows free yaw rotation in either direction including through many complete revolutions, as indicated by rotation symbol 3007, while the hinge also allows 3060 to swing freely under 3010 in both pitch (3008) and roll (3009) rotations, including in rotary-wing-mode flight. These hinge degrees of freedom accomplish a decoupling of the rotary-wing rotation plane from the fuselage or cargo pod that is functionally similar to the action of the flapping hinge system of views 2300 and 2400, though the plane of rotation of the hub 3010 is constrained differently from that of hub 140.

As contrasted with the aerodynamic yaw control solutions variously shown for the fixed vertical stabilizer 2720 with hinged rudder 2721 and for fully rotatable rudder 2910, a more direct mechanical way to control fuselage yaw is illustrated in FIGS. 21, 22 and 23. As shown in 23, the Y-shaped flapping yoke 2330 includes a shaft 2331 that extends down through bearings 2321 and 2322 whose outer surfaces are captured in tube 2210 (FIG. 22) with a rotary drive assembly 2220 consisting of a surrounding large spur gear, a smaller driving spur gear and a motor to drive the smaller gear. The motor and small gear engage and drive this large gear to drive the rotation of the fuselage with respect to the hub.

These detail illustrations of embodiment 100 show all the powered system components and their powering batteries (FIG. 21: rectangular block 2120 on top of the flapping yoke) and electronics module (FIG. 21: the almost hemispherical nose module 2130) residing in the hub fairing 141. In the event that independent power is available (e.g. from separate batteries) for fuselage components, then the fuselage yaw control motor could be flipped and moved into the fuselage, with appropriate bearing adjustments (for example to have the large spur gear coupled to the bottom of the cylindrical flapping yoke extension emerging from the middles of the bearings, rather than to the bearing sleeve.) Further components for radio communication, flight control computations, picture taking, etc., are readily moved down into the fuselage, with wireless communication (e.g. RF or infrared LED-Photodiode pairs) conveying control information up into the hub and/or down from hub and wing sensors into the fuselage. Other control-related sensing functions may be moved to the non-rotary fuselage or a non-rotary sensor module that is not part of the fuselage. For example, "9-axis" sensor systems with drift-correcting "sensor fusion" measure 3-axis acceleration, 3-axis angular velocity and 3-axis geomagnetic field and combine these measurements to provide drift-free indication of roll, pitch and yaw. Sensing and drift correction could work better in a non-rotating frame, with relevant data communicated wirelessly to the rotary hub. Independent measurement of the rapidly changing angle between the hub and the non-rotating sensor package would then provide data needed for phased one-per-rev control variation of wing pitch and differential prop thrust. A non-rotary sensor module, including a counter-rotating drive mechanism (such as 2220) may remain with the hub for control at all times while optionally providing a region for attachment and detachment of a detachable fuselage.

Control Dynamics, General Discussion

In the embodiment 100 of this invention, as shown variously in whole or in part in FIGS. 1 thru 25 without the optional control surfaces of FIG. 27 and following, 100 lacks a horizontal stabilizer and related control surfaces, having neither trailing elevator nor leading horizontal canard. With yaw control provided by prop thrust changes, the rudder or leading vertical canard can also be eliminated. With complete elimination of tail and canard components, the airframe design is simplified and aerodynamic drag is reduced. Most helicopters depend minimally or not at all on elevator or canard controls, instead relying on the underslung weight of the helicopter fuselage and the interaction of that pendulous weight with the rotor thrust vector to define fuselage pitch and a mechanical reference frame for the cyclic pitch controls. In its helicopter mode, the aircraft of the present invention does not, in principle, need any comparable fuselage reference. The wing pitch controls are self-contained in the hub, involving no mechanical couplings between the fuselage and hub-mast system. Using internal electronic controls such as solid state gyro, accelerometers, 3-D magnetic compass, GPS and the like, plus appropriate control software, the rotating system can execute controlled helicopter-mode flight. In airplane mode, however, without relying on a tail or canard, the new aircraft 100 uses pendulous underslung weight largely in the mode of a hang glider. It is said that an unpowered hang glider is guided by weight shift, but there is a different way to look at "weight shift." When the hang glider pilot pushes the control bar forward, one could say that the pilot has weight-shifted aft, or one could say that the pilot has simply pitched the wing up against the inertia of his or her body, thus shifting the aircraft center of gravity (c.g.) location aft in relation to the now pitched-up wing. The aircraft of the present invention similarly pitches both wings up or down with respect to the angle of the mast descending to the pendulous c.g. of the fuselage.

This new aircraft, however, has additional dynamic pitch control in the form of variable propeller thrust, which is exerted along a line passing above the aircraft c.g. to cause a variable pitch moment. In the absence of prop thrust and with an un-stalled low-drag wing, the lift vector is directed nearly at right angles to the relative wind angle. The pilot (whether human, remote or robotic) can vary pitch to vary the magnitude of the lift vector, while the line of that vector tends usually to pass nearly through the craft c.g. The wing pitch variations therefore have very little short-term effect on aircraft pitch change. Fuselage pitch variation comes with delay as the wing pitch variations cause the flight path to slope upward or downward. As sensed by someone riding in the aircraft, the apparent gravitational "down" vector is always nearly perpendicular to the flight path, not "down" towards the center of the earth. In smoothly curving gliding flight without prop thrust, the line from the wing center to the pendulous aircraft c.g. usually points nearly perpendicular to the flight path with centrifugally-driven tilt away from the curvature center of a circling flight path.

The poor short-term pitch control situation just described is improved by the addition of variable prop thrust in a high wing. Propeller thrust variation acts nearly perpendicular to lift variation, where the line of the thrust vector in embodiment 100 passes well above the aircraft c.g., giving a significant moment arm for rapid dynamic pitch control. This pitch control is used in concert with the slower pitch change associated with wing lift and the flight path slope. In a conversion maneuver that includes a steep climb with airspeed approaching zero at the peak height, the wings lose control authority as the airspeed decreases. The spinning props, however, retain their control influence and enable the craft to controllably re-orient both pitch and yaw angles for completion of the conversion. The following text and figures describe how this works in the context of flight conversions from helicopter to airplane flight and back again.

Control Dynamics Applied to Flight Mode Conversion

An aircraft with prop-rotors plus wings, such as the V-22 Osprey and its research predecessors and the more recent AW609 aircraft, has redundant aerodynamic surfaces: wings that are a hindrance to helicopter performance since they are pushed down by the prop-rotor downwash, and prop-rotors that are sufficiently large to carry the craft in helicopter mode and therefore much too large to make efficient propellers. An advantage of this redundancy is that the aircraft can make smooth flight transitions between helicopter and airplane flight modes, transferring aerodynamic lift continuously from the prop-rotors to the wings and back again. The aircraft of the present invention lacks this redundancy in two ways:

1) Having propellers that are appropriately sized to spin the rotary wing and also to power forward flight with high efficiency, but generally too small to lift the aircraft by themselves; and, 2) Having two wings that fully serve both rotary wing and fixed wing functions.

The consequence is that flight conversions entail temporary partial-to-total loss of lift as the available aerodynamic surfaces reorient to different functions. Since the vertical lift component must average one-g over time (where a lower average implies cumulative downward momentum and hitting the ground), the conversion maneuver must include periods of significantly elevated g-forces to compensate for the momentary loss of lift. A particular consequence is that in a sufficiently large version of this aircraft, a human passenger must be prepared for a brief roller-coaster ride where the beginning and ending flight conversions each include one near-zero-g moment, preceded and/or followed by elevated-g time period(s). While this precludes use of the human-scale aircraft in general aviation service including passengers who will not tolerate the rough moments, this leaves a wide variety of practical uses, including with passengers.

Flight conversion maneuvers are now described in greater detail, recognizing that departures from the following description are possible within the scope of the invention. The description begins with reference to pictorial figures, seeking a general understanding. Further description follows with reference to the charts of method steps in FIGS. 34 and 35, paying greater attention to detail and also to variations of these maneuvers within the scope of the invention.

Transition from vertical takeoff to horizontal airplane flight optionally starts with a hovering rotation as in image 200 of FIG. 2. The transition is more energy efficient if initiated in ground effect or, even better, with the craft sitting on the ground while it builds up high rotor speed. Whether while hovering or on the ground, high power is applied to the props and the rotor gains rotary speed and kinetic energy as blade pitch is reduced or kept flat, maintaining the craft at constant height or on the ground. The blades then pitch up quickly as in image 1000 of FIG. 10 and symbolized by rotation symbols 1010 and 1020. Pitch up, however, is not done so suddenly as to cause stall. The rotary wings can be pitched up increasingly steeply without stall as the craft gains vertical velocity and wing rotation simultaneously slows. The rotary wings lose lift as they approach the vertical pitch angles 1110 and 1120 of image 1100 in FIG. 11 and cease to rotate. The thrust of the props would be insufficient to sustain vertical rise except in a highly powered aircraft. A "utility" design according to this invention, proportioned for energy-efficient flight at moderate speeds, would generally not have sufficient thrust for a ballistic vertical takeoff on prop thrust alone. So as the vertical speed of the craft slows in FIGS. 11 and 12, with wing lift losing its control authority, the wings and props pitch forward as indicated in image 1200 of FIG. 12 by 1220, with a beginning pitch-down hub-fuselage response in 1210, and continuing to pitch further forward and down in image 1300 of FIG. 13, the prop thrust pulling forward and pitching the craft further nose-down while simultaneously beginning to give it forward speed. By configuration 1300 the wings and props are pitched steeply down, as indicated at 1310, as needed with the now falling aircraft to keep the wings out of stall, while the fuselage continues a pitch-down rotation as indicated at 1320. As the craft gains speed from the combined influences of gravity and prop thrust, the available wing lift increases rapidly and the craft pulls out of its dive in image 1400 of FIG. 14. The wings pitch up as indicated at 1410, while the aircraft body pitches up as indicated at 1420. Recall that wing pitch is responding to mechanical pitch control from the hub while aircraft body pitch, including the upper hub and lower fuselage, responds in pendulum fashion to the net wing-lift-plus-prop-thrust vector. The aircraft emerges into straight-ahead horizontal airplane mode flight 1510 as seen in image 1500 of FIG. 15. In fuel-efficient high-mileage operation, flight may continue in this airplane mode until a destination is approached and the craft converts back to helicopter mode for landing.

An option for both take-off and landing is to provide a landing gear with rolling components (tires, etc.) appropriate for take-off and/or landing in airplane mode, offering some fuel or battery-energy saving compared to VTOL mode. The VTOL option remains as needed.

To transition from horizontal aircraft flight to helicopter flight, a typical conversion maneuver begins by increasing prop power and putting on extra speed in the flight mode of FIG. 15, except that the wing pitch angles are gradually reduced to maintain constant lift and horizontal flight as the airspeed increases. In images 1600 and 1700 of FIGS. 16 and 17 and as symbolized explicitly in 1610 and 1620 of FIG. 16, the wings pitch up and the extra accumulated forward kinetic energy of the plane is converted into vertical velocity and increasing altitude. The aircraft body and flight path angle pitch up together as indicated by 1630. By image 1700 of FIG. 17, the airspeed is declining rapidly while the wings are losing control authority. The flight path reaches a peak altitude and turns downward as indicated at 1710. In image 1800 of FIG. 18, the wings are pitching rapidly down as indicated at 1810, while prop thrust is beginning to tip the fuselage back toward horizontal. The forward velocity component is small. By image 1900 of FIG. 19, the craft is falling with a small-to-zero forward velocity component, so that its flight vector is directed nearly straight down while the wing blades and props approach alignment with the downward flight vector. Beginning a transition to rotary wing mode, the left-hand wing 110 (whose identification is recalled from FIG. 1) continues to pitch down as indicated at 1910 while the right-hand wing 112 ceases its downward pitch rotation. In image 2000 of FIG. 20, with the craft falling vertically or nearly vertically as indicated at 2030, the left-hand wing 110 has reached orientation 2010, having pitched rapidly around past the downward vertical to provide rotor torque, as the right-hand wing 112 is simultaneously pitching back up at 2012. The wings and hub are starting to rotate as indicated at 2020, gaining angular momentum from a combination of the wing lifts and the prop thrust vectors. This is an autorotation with added propeller power, rapidly increasing the rotor speed to halt the downward fall. After a number of rotary wing revolutions, the craft has halted its descent and achieved the powered hover of FIG. 2. This recovery stage may optionally include a significant component of forward helicopter flight motion, so that the aircraft avoids descending with its own rotor downwash and entering a vortex ring state. The craft can continue to a landing in controlled helicopter mode.

The pictorially illustrated dynamic sequences of flight conversion just described are now described in greater detail and in more optional variations with reference to the control method steps of chart 3400 in FIG. 34 for conversion to airplane-mode, and similarly with chart 3500 in FIG. 35 for conversion back to rotary-wing-mode. For convenience, the procedural box numbers and abbreviated boxed descriptions are repeated in the text below and followed immediately by the related commentary.

FIG. 34, Chart 3400: Conversion from Rotary-Wing to Airplane Flight Mode.

3401: On Ground: Set Max Power, Servo Zero $C_L$ Until Max-Rpms

In this step, as would be viewed in configuration 200 of FIG. 2, an optional fuel- or battery-charge-conserving strategy is described. The aircraft sits on the ground, operating in rotary wing mode and preparing for vertical takeoff. Aerodynamic friction in the rotary wing is minimized by operating with no lift or just enough lift to bring fresh non-circulating air into the circular paths swept by the props. A slightly negative push-down lift might prove as effective or more effective than positive lift-up lift for bringing fresh air inward laterally across the ground into the circulating paths of the props for their optimum operation. The objective is to spin the rotary wing to the highest safe rotation speed, thereby storing angular kinetic energy for a delayed lift-off. Particularly significant with a heavy payload, the maximum power demand will occur soon after lift-off as the aircraft rises out of ground effect and gains altitude through rapidly sinking air that is being driven downward by the accelerating lift of the aircraft. Storing kinetic energy in high RPMs while sitting on the ground is a strategy for accelerating quickly through this most inefficient phase of flight.

Care must be taken for safe operation in this phase. Cyclic gyroscopic bending moments in propeller blades with be highest under these conditions of high rotor RPMs multiplied by high prop RPMs. Centrifugal force on the rotary wings will also be at a maximum, while wings optionally pre-coned to minimize bending stresses in rotary wing flight will experience unusual downward-bending stresses during this phase of kinetic energy accumulation.

3402: Servo High $C_L$ for Sustainable-Rpms, Ascend, Max Power

Continuing the energy-conserving strategy, a rapid initial lift-off maximizes the vertical velocity gained while still in ground effect. Although power demand is at a maximum during rapid vertical ascent, at least some of the rotor power is usefully lifting the aircraft vertically. If the aircraft were hovering above ground effect, the rotor would be pulling air down at high speed just to sustain the weight of the aircraft, a most inefficient situation.

3403, Optional: Tilt Rotor Disk for Angled Ascent or Level Flight, Rotary Mode One-per-rev cyclic pitch, as illustrated by comparison of FIGS. 3 and 4 and by the vector rotation symbols 410 and 420 to provide a cyclic lift difference between the two rotary wings, is used to tilt the plane of the rotor disk. When helicopters take off, pilots will transition rapidly from vertical lift-off to a significant horizontal velocity while continuing to gain altitude. The horizontal velocity brings the rotary wing through fresh air to propel downward, reducing the energy-sapping vertical induced flow. The horizontal velocity leads to less fuel or battery energy consumption for a given altitude gain than would be used to gain the same altitude vertically. This step is optional because in certain situations an aircraft of this type might seek almost immediate conversion to airplane-mode flight without adding significant horizontal velocity. In an airspace restricted for example by buildings or trees, there might also be limited opportunity for horizontal motion. In most settings, however, it is expected that the option of adding horizontal motion to vertical motion will be preferable.

3404: Servo to Max $C_L$, Max Power, Ascend, Decreasing RPMs

Substantial rotary-wing pitch-up, normally seen to this extent only in rapid ascent, is illustrated in FIG. 10 in aircraft configuration 1000 and by vector rotation symbols 1010 and 1020. With or without the addition of horizontal motion from the previous step, the goal at this stage will be to gain sufficient ground clearance and sufficient vertical velocity to quickly and safely execute a conversion to airplane-mode flight. The rapid ascent will commonly take away from the rotary wing more power than can be replenished by the wingtip thrusters, whether prop or turbine. Thus, rotary-wing RPMs will normally decrease as the stored kinetic energy of the rotary wing pays out as altitude and vertical kinetic energy. As indicated elsewhere in this Specification, servo-control of the wing lift coefficients is expected to be preferred to direct control of wing geometric angles—the angles should be chosen in relation to the wing's aerodynamic capabilities. Servo control to maximum lift coefficients will entail geometric pitch-up feathering, but performed in the context of what the airfoils can handle aerodynamically.

3405: Geometric Pitch Differential to Parallel Wings, Max Power

As the aircraft rises rapidly while rotor RPMs decrease and while the rotary wings maintain a high angle of attack at a maximum efficient $C_L$, the rotary wings will pitch differentially, i.e. in opposite rotation senses (recall the oppositely directed rotation symbols 1010 and 1020 of FIG. 10) up toward parallel (1110 and 1120 of configuration 1100, FIG. 11) in the vertical or toward a steeply inclined plane whose tilt will depend on the horizontal velocity component of aircraft motion. As the aircraft airspeed declines, the wings' maximum achievable lift declines rapidly until the thrust of the fast-spinning props exceeds the wing lift. As the wings lose control authority and prop or turbine thrust takes over, there is a transition in pitch control from servo-controlled wing angles-of-attack to control of the geometric angles of the wings and their thruster force vectors in relation to each other and to the intended near-future flight path. When the wings reach a parallel orientation, now under "geometric control" rather than "aerodynamic pitch angle control," their rotary motion might still be too fast for a pitch-down-together conversion to airplane-mode flight, in which case the following optional step will be needed.

3406: Optional: Geometric Pitch Differential Past Parallel to Stop Rotor, Return to Parallel With wing rotary motion still significant, the wings pitch in differential geometric fashion past the parallel orientation of 1100, with the props or turbine thrusters continuing to operate at full power so that their thrusts are angled to oppose and stop the rotation. As rotation approaches zero, the wings and thrusters return to parallel alignment. At this point the aircraft may be rising or, if heavily loaded, likely falling, possibly with a significant component of horizontal motion.

3407: Geometric Pitch Common Mode Down, Max Power

Figure 12:
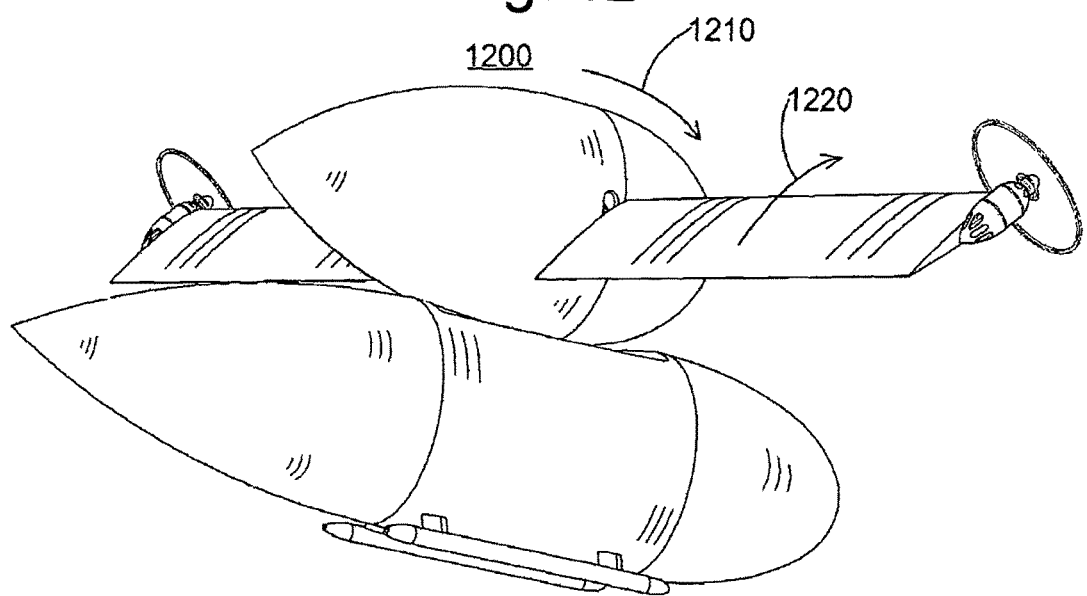
Figure 13:
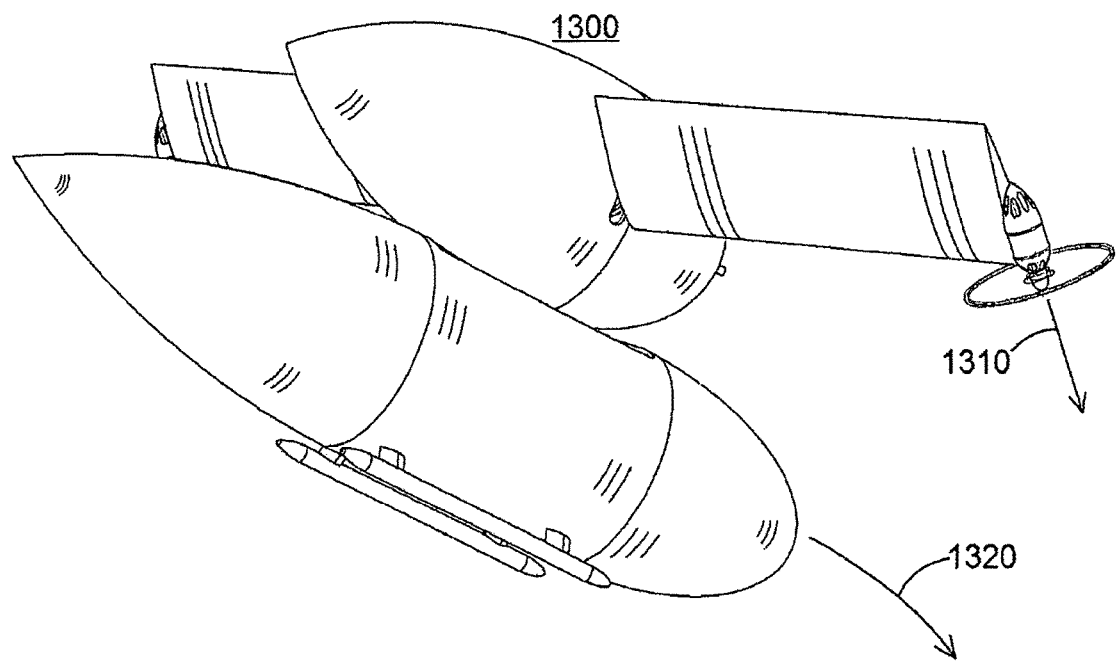
Figure 14:
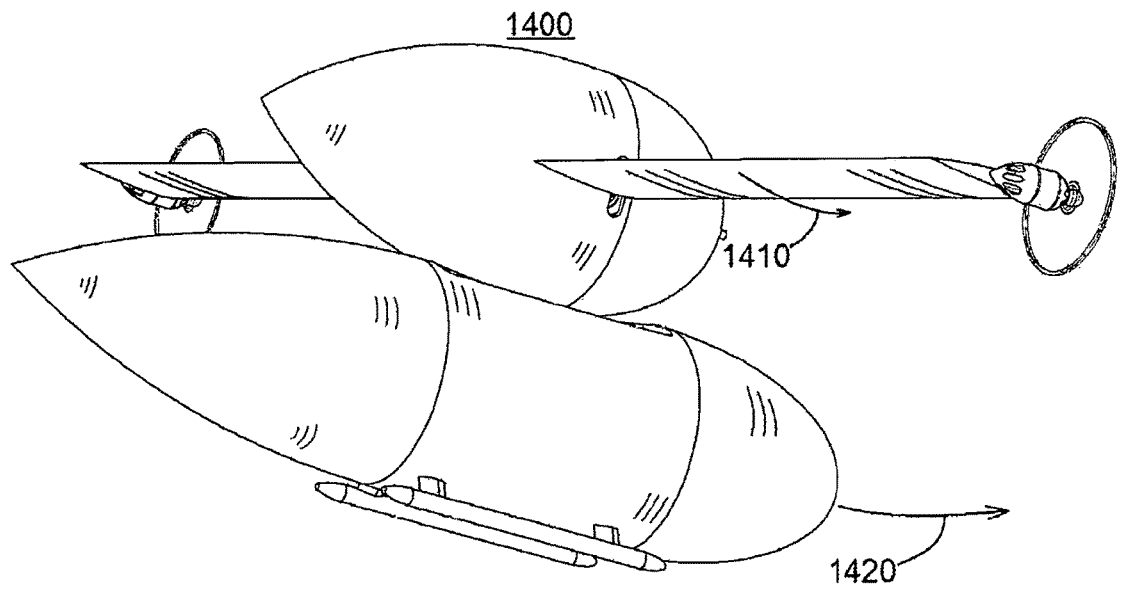

As shown in configuration 1200 of FIG. 12 and progressing to configuration 1300 of FIG. 13, the wings pitch down (1220) rapidly together ("common mode") in airplane mode, still under "geometric control," aligning as quickly as possible to the usually falling motion of the aircraft so that the wings come out of aerodynamic stall or avoid stall completely and start to develop lift from the combined falling and horizontal motion.

3408: Servo Common Mode Max-$C_L$, Descend, Gain Airspeed, Max Power

The aircraft gains speed rapidly (1300 of FIG. 13) from the combined effects of gravity and thruster force. Pitch control reverts from "geometric" to "aerodynamic pitch angle" servo control, pitching up (1410, FIG. 14) together ("common mode") in configuration 1400 of FIG. 14 to develop high lift and convert near-vertical velocity (1310) to horizontal velocity (1420).

3409: Servo Common Mode $C_L$ for Level Flight

As shown in configuration 1500 of FIG. 15, the downward vertical velocity is arrested and directed horizontally and straight ahead (1510) with the aircraft in level flight, very likely moving faster than its most efficient cruise speed. Wing pitch is servoed to control aerodynamic $C_L$.

3410: Servo Power to Bring Servoed-$C_L$ to Cruise-$C_L$

If indicated airspeed exceeds the desired cruise speed, then the target $C_L$ for wing-pitch servo control is reduced under servo control. This situation involves two layers of servo control: of $C_L$, in relation to the overspeed, to maintain the amount of lift required to sustain horizontal flight; and of wing pitch angle, to track the servo-target for $C_L$. Thruster power is reduced, allowing the aircraft to slow to its intended cruise speed while the wings automatically increase their aerodynamic attack angle to develop the same lift force as the airspeed decreases. Alternatively, the aircraft might use excess speed to regain some of the altitude that was lost during the flight conversion. The chosen combination of lift, thruster power and altitude gain (or loss) will depend on optimization factors of ordinary airplane-mode flight, also depending on the intended flight plan including the desired final cruise altitude.

FIG. 35, Chart 3500: Conversion from Airplane to Rotary-Wing Flight Mode.

3501: Increase to Max Power, Servo Common Mode $C_L$ for Level Flight, Gain Speed As the aircraft previously stored extra kinetic energy in rotary motion for vertical takeoff and conversion to airplane-mode flight, similarly a strategy for conversion back to rotary-wing flight may begin by adding kinetic energy, here in the form of forward speed. Height above the ground must also be sufficient for safe conversion with any expected altitude loss during conversion. As the aircraft packs on kinetic energy as extra speed, and to the extent that altitude gain is not needed, the wings pitch somewhat downward together under aerodynamic servo control, lowering their attack angles and $C_L$-coefficients while maintaining constant lift. The aircraft configuration will continue to resemble 1500 of FIG. 15, although with an almost imperceptible downward wing pitch change as airspeed increases.

3502: At Max Speed, Servo Common Mode Max-$C_L$, Ascend, Lose Speed, Max Power The conversion maneuver will initially resemble an aerobatic hammerhead stall, wherein the aircraft puts on extra speed, angles its flight path upward to the vertical while losing speed, and comes to a stop at maximum altitude. In the present instance, the aircraft may intentionally retain some horizontal velocity as its vertical velocity goes to zero. Highly powered model airplanes will be seen vertically oriented and hovering entirely on the support of prop thrust. An expected goal for most design variations within the scope of the present invention will be to design for less than sufficient thrust to hover on prop or turbine thrust alone (without help from rotary wing lift)—thus avoiding oversized thrusters that would be inefficient for utilitarian high-mileage cruising flight. Thus, the expected conversion maneuver would combine steep altitude gain with loss of vertical speed through zero and into descending flight. Configuration 1600 of FIG. 16 illustrates the aircraft hub and fuselage pitching somewhat nose-up (1630) while the wings are pitching up (1610, 1620) to a steeper angle than the fuselage.

3503: Servo Common-Mode $C_L$ for Steep or Vertical Ascent, Lose Speed, Max Power As shown in configuration 1700 of FIG. 17, this is a continuation of the maneuver previously described, losing speed in vertical or near-vertical ascent until vertical velocity goes to zero and reverses as indicated at 1710.

3504: At Zero Speed, Geometric Pitch Common Mode Down, Descend

Figure 18:
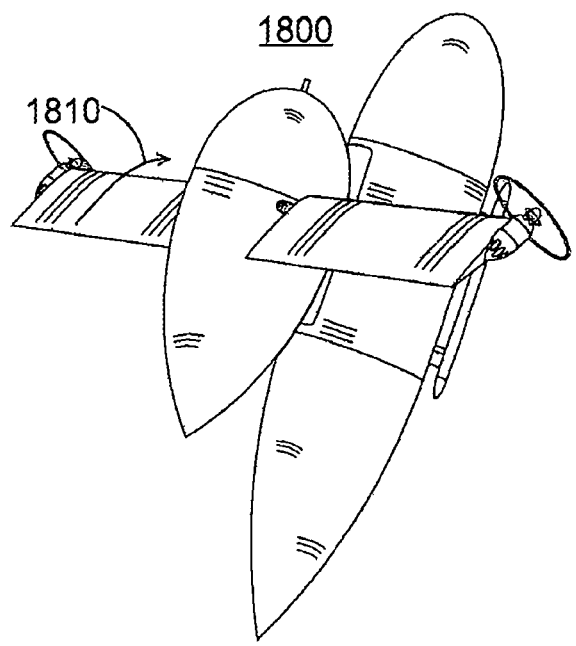
Figure 19:
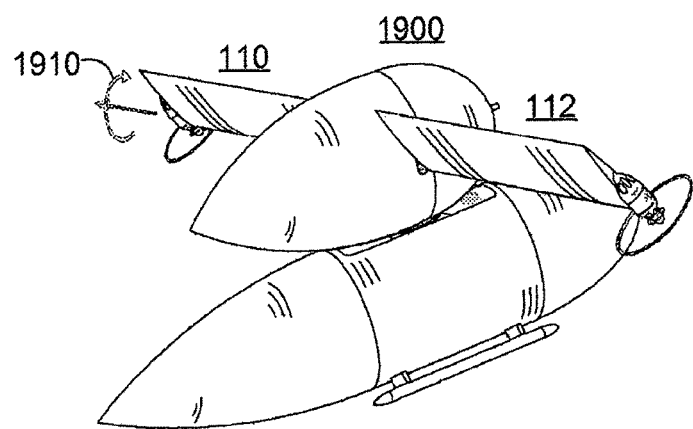
Figure 20:
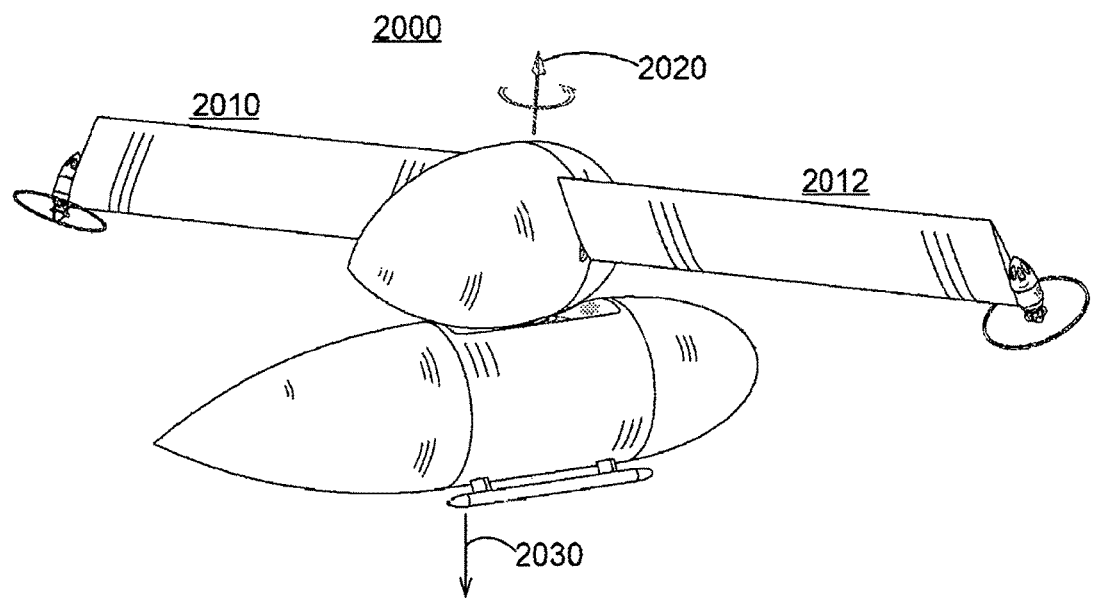

As vertical descent begins, the wings pitch down together in common mode, i.e. rotating with the same direction sense as viewed externally, pitching down rapidly to minimize stall or avoid it entirely. Configuration 1800 of FIG. 18 shows the initiating downward wing pitch change 1810, while the hub and fuselage have not yet visibly responded with downward pitch compared to configuration 1700. The force vectors of the thrusters (props in this case) pull upward and forward along a line passing above and to the left of the aircraft c.g., creating a torsion moment that pitches the hub and fuselage down as seen in configuration 1900 of FIG. 19. In the transition through configurations 1800 and 1900 and into configuration 2000 of FIG. 20, the speed of air flowing over the wings will be low and wing lift correspondingly very limited. Operating at full power, the thrusters will have dominant control authority over the aircraft through this transition, with their thrust largely controlling both the aircraft pitch angle and flight path. Wing pitch control in this transitional flight regime will not be to servo-control with wing $C_L$ or attack angle, but rather to appropriately direct the thruster force vectors.

3505: Gain Speed Down, Servo Differential Max-$C_L$, Gain RPMs

Shifting from common mode to differential pitch change (FIG. 20, wing orientations 2010 and 2012 of configuration 2000) means that the wing lift vectors and prop thrust vectors angle oppositely to spin the rotary wing. In descent, gravitational energy plus cumulative energy from thruster power is converted into angular kinetic energy, incorporating aspects of helicopter autorotation.

3506: Optional Tilt Rotor for Angled Descent

The descent path of the aircraft may target a slowing vertical descent to landing or optionally an angled descent, taking advantage of the aerodynamic power savings of combining horizontal with vertical flight. If vertical landing is desired, horizontal velocity may be arrested shortly before landing. In a descent with braking of vertical velocity, care must be taken to avoid vortex-mode loss of lift, where the aircraft descends and drops to the ground in a self-generated bubble of falling air. Maintaining a horizontal flight velocity component and avoiding excessive velocity braking will avoid this catastrophic vortex mode.

3507: Arrest Descent, Servo $C_L$ for Hover or Level Flight

At this stage, the aircraft enters a flight plan for normal helicopter-mode flight. Flight configuration 200 of FIG. 2 will resume.

3508: Servo Power to Bring Servoed-$C_L$ to Hover or Cruise-$C_L$

The goal here is to use rotary-wing flight for slow forward travel, hover or vertical descent through a speed-restricted airspace. Wing geometric pitch is determined by servo-feedback to achieve a lift coefficient, $C_L$, appropriate for the flight condition.

This ends the detailed description of flight mode conversions for aircraft 100. Conversions will differ somewhat for configurations 3000 and 3100 or FIGS. 30 and 31, where the hub fairing 140 becomes a lifting body 3010 including horizontal stabilizer tab 3015, also with the optional inclusion of center prop 3020 to add pitch control authority to 3010 and 3015, and finally with angular decoupling 3007, 3008 and 3009 of the detachable fuselage 3060. As will be discussed below, airplane-mode control in these later configurations comes closer to conventional aircraft aerodynamic control and less like hang glider weight-shift control.

The aircraft invention being described here, in its various configurations and embodiments, is scalable over a wide range from "model airplane" size to large enough to carry human passengers willing to handle the transition maneuvers between flight modes. Besides the necessity of those maneuvers, there is another inherent design limitation worth mentioning. In helicopters and other rotary wing aircraft such as quadcopters, problems arise when propeller or rotary wing tips approach sonic velocity with steep increases in drag, power dissipation, noise generation and other problems associated with transonic flow, supersonic flow and shock waves. As a practical matter, tip speeds exceeding about Mach 0.8 are problematic. In helicopter rotors, required tip speeds tend to increase with disk loading. As geometries scale from small to large, disk loading tends to increase. Thus, tip speed Mach limitations tend to become more prominent with increasing scale. In the present aircraft invention, the propellers that drive the wings develop prop tip speeds considerably larger than the rotary wing tips in helicopter mode, potentially creating high Mach number problems.

Within a given rotor design and a given disk loading requirement, prop tip speeds can be reduced while maintaining sufficient propeller power by moving the props inboard from the wing tips (as shown at 2730 and 2732 of FIG. 27), increasing prop diameter (also shown in FIG. 27), using more blades and/or wider blades on each prop, using more separate props (e.g. in the push-pull configuration 3100 of FIG. 31), and using props designed to operate at high advance ratios. As suggested above, variable wing geometries can further help. Even with these compensations, high prop-tip Mach numbers can limit allowable disk loading in rotary-wing mode and ultimately even the airplane-mode speed, particularly in large scale aircraft. Ducted turbines rather than props, as shown in 2930 and 2932 of FIG. 29 and including the contexts of jet and fan-jet engines, may successfully operate at higher airspeeds while successfully handling Mach effects.

Finally, there is an issue with vibration in two-blade propellers. The gyroscopic propeller torsion described above manifests as cyclic bending stress in individual prop blades. This bending stress goes through a full reversing cycle with each prop revolution, with the greatest bending exerted when the blade passes nearly perpendicular to the disk of rotary wing rotation. Individual blades must be strong enough to endure the resulting cyclic stresses. Two-blade props transmit torque vibration to their hubs, shafts, motors and wings at two vibration cycles per prop revolution. These torque vibrations result in considerable noise generation as well as potential wing fatigue problems. Symmetric arrangements of three or more blades per prop avoid this transmitted vibration, though the individual blades still encounter the cyclic stresses and must be designed to withstand them. Hence, the embodiment 100 of FIGS. 1 thru 26 is pictured in FIG. 1 with 3-blade props 120 and 122. For very small scale aircraft in general, smaller numbers of wider blades are generally considered preferable, in part because the blades operate at higher Reynolds numbers and thereby achieve better performance. The reasoning goes that subdividing a prop into a larger number (than two) of narrower or slower-moving blades for handling the same aerodynamic thrust will result in operation at lower Reynolds numbers in a range where airfoil lift-to-drag performance declines with decreasing Reynolds numbers. Thus, most small model plane props have two blades. In the context of the present invention, going from two to three prop blades trades off a possible minor efficiency loss in order to gain a significant reduction in vibrations. Alternatively, vibrations can be minimized using two-blade props by adding shorter counterweight "blades" at right angles to the two working blades, the added "blades" being streamlined and having little or no aerodynamic function. Going to four or more blades per prop is possible, with the performance losses associated with higher blade numbers being minor for large scale aircraft where Reynolds number variations have small effects on airfoil efficiency. When cyclic gyroscopic blade bending stresses are considered in the context of the present invention, however, significant potential advantages arise for props with three, four or more blades per prop, as now described.

Calculations make it clear that cyclic gyroscopic blade bending stresses in the present invention can be severe and problematic. A first line of defense is to design blades that are very strong and very lightweight. Carbon fiber composite construction is a favorable design option. While mass reduction is emphasized toward the blade tips where the gyroscopic inertia contributions are high, the blade roots should be made very robust to withstand the cyclic bending moments, with transition from thin to thick airfoil sections moving from tip to root. Looking beyond individual blade geometry, one finds that blade gyroscopic bending moments vary as the product of rotary wing angular velocity multiplied by prop angular velocity and by the mass moment of inertia of each prop blade. For blades operating at the same tangential tipspeed, blades scaled up with geometric similarity to longer blade radius will rotate relatively more slowly (inversely as blade length for the same tangential tipspeed) and will have greater strengths in their cross-sections. In computing worst-case peak surface stresses, however, the greater mass moments of inertia of the larger blades generally overwhelm the advantages of lower rotation speed and greater cross-section strength. Thus, relatively small-diameter props are commonly desired. Prop blades of a given radius and designed to operate at relatively high advance ratios will be spinning relatively more slowly when advancing through the air at a given rotary-wing tangential speed (which becomes the advance speed of the props.) Thus, prop design for a high advance ratio confers a reduction in cyclic gyroscopic bending stress. In order for slower-spinning blades of similar radius and surface area to develop a given required net prop thrust, however, one must use a greater number of blades-per-prop. To manage the problem of excessive cyclic gyroscopic blade bending stresses, therefore, a favorable design direction is toward relatively small props using three, four or more blades per prop and operating at high advance ratios and correspondingly low rotation speeds. Potentially applicable ducted turbine designs carry this trend further, using many blades on each of several coaxial turbine elements and, at least in some cases, with all the turbine blades operating at high advance ratios.

This section has taught the structural topology, articulated degrees of freedom and associated actuation forces and moments of a new aircraft in embodiment 100, including variations within the context of that embodiment. It has described the essential aerodynamic features and indicated how those features can be controlled, via the actuation forces an moments, to achieve helicopter and airplane flight modes and transitions between modes. The discussion has put certain design limitations into perspective, particularly regarding Mach number limitations on speed and disk loading and also regarding propeller stresses, vibrations and associated noise. The following section provides more detailed descriptions of various embodiments of this invention, demonstrating the scope and variety of designs falling within the scope of this invention. The options chosen for these embodiments will not be construed as limiting, nor will all of these options necessarily be found to be optimal in light of future contexts of design and use. The teachings provided already and extended below, however, define a new aerodynamic and mechanical topology offering most of the best of two worlds: VTOL capability and propeller airplane capability in a relatively simple and economic package. The general discussion above has already covered the important functional design features of an embodiment of the invention as pictured in all the figures up thru 25. As mentioned briefly above in conjunction with FIG. 26, a detachable or non-detachable payload pod 2600 may optionally be joined rigidly to the rotary wing and hub structure of the aircraft and spin with it, rather than being rotationally decoupled. Alternatively, as seen in 3100 of FIG. 31, the aircraft hub and fuselage can be merged into a single hub unit in situations where transported cargo and/or instruments can withstand the spinning of helicopter-mode, or the hub may pick up and deposit detachable fuselages like 3060 of FIG. 30.

The details of the aircraft configuration depend on its intended use, with the motor and prop locations 2730 and 2732 of FIG. 27 having potential advantages at larger scales and where there is a priority on high disk loading and high speed airplane flight while avoiding excessive Mach numbers at the propeller tips. The greatest wingtip speeds are required in rotary wing mode and when lifting heavy payloads, while the tips of rotary-wing-end propellers will be traveling considerably faster than the tips of the rotary wings themselves. While high advance ratio props represent a useful design strategy for limiting prop tip Mach numbers, moving the props inboard from the wing tips as with 2730 and 2732 means that the prop centers are advancing more slowly for a given rotary wing angular velocity, so prop tipspeeds are correspondingly reduced. Since the more-inboard props are advancing more slowly, however, they must exert greater thrust to achieve the same net rotary wing torque and power, so the prop diameters tend to increase, as is apparent from a visual comparison of 2730 and 2732 with tip-mounted props 2830 and 2832 of FIG. 28. A challenge with using relatively more inboard props is that their greater required sizes present problems of high cyclic gyroscopic blade stresses and wing pitching moments.

Figure 28:
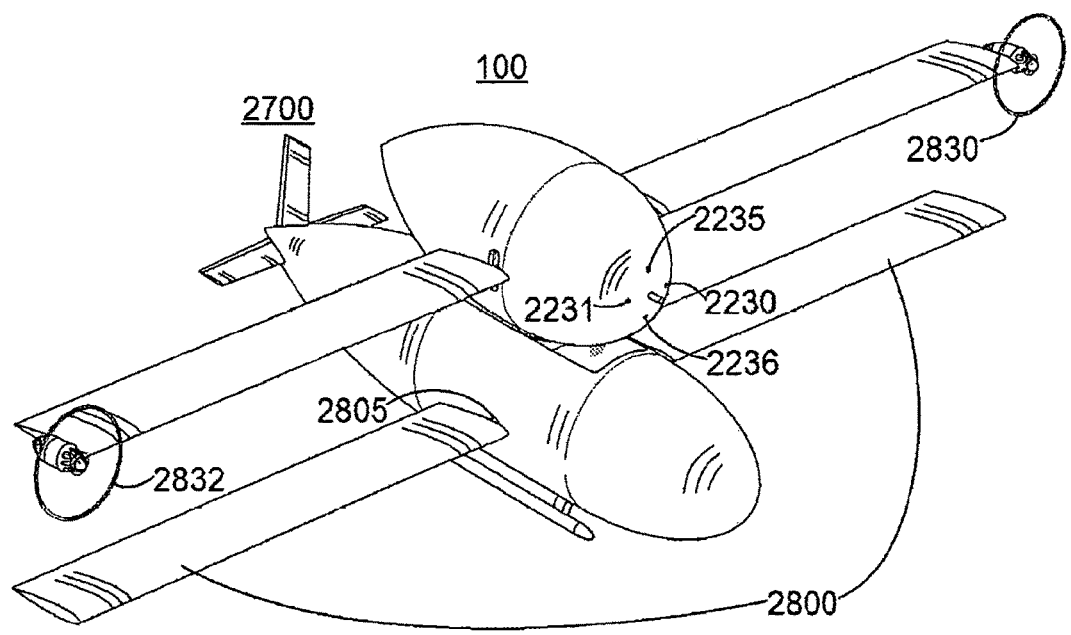

FIG. 28 shows, as a further design option, a second set of wings 2800 as fixed wings (i.e. non-rotary and non-flapping) extending from the lower fuselage. The extra set of wings can potentially be useful for easing transitions between rotary-wing-mode and airplane-mode flight, as is now described.

The sequences of mode-transition events previously described entailed major wing configuration changes when the aircraft was stopped or nearly stopped. Wings 2800 are ineffective at very low airspeeds. Therefore any mode transition that significantly involves those wings needs to take place when the aircraft is moving through the air fast enough for wings 2800 to lift a significant fraction of the aircraft weight. For design simplicity and economy, one might hope to use fixed-pitch wings, but there are compelling reasons to include variable net pitch, with the wings optionally joined across the fuselage for matching pitch rotations or, in a more complicated configuration, with the wings having independent pitch angles. The feature at 2805 represents a pitch-change spar extending from the wing into the fuselage, with internal fuselage features controlling the pitch of that wing and similarly for a hidden spar emerging into the opposite wing. One motivating reason for variable secondary-wing pitch is to allow the wings to pitch steeply upward to streamline their areas to rotary-wing downwash. A more important reason for variable secondary-wing pitch is to achieve the control necessary for these wings to assist in flight mode transitions, as is now discussed. In an optional description for transition from rotary-wing to fixed-wing flight using wings 2800, the rotary wings tilt their plane of rotation forward to achieve a maximum practical forward speed in that mode. Aerodynamic drag will then tend to pull the fuselage back and into a nose-down pitch, especially if the wings 2800 are unable to pitch up into the downward wind angle caused by rotor downwash. With variable pitch, however, the wings 2800 can pitch up to come out of stall and develop lift, partially taking over from the lift of the rotary wing. Variable lift from tail assembly 2700, specifically from horizontal stabilizer 2710 with variable elevator control surfaces 2711, may be needed to pitch the fuselage so that the lower-wing lift vector balances the top-heavy (relative to wings 2800) mass of the aircraft. With further increases in forward speed in rotary-wing mode, the rotary wing on the side traveling backward relative to the aircraft's forward motion sees a reduced relative wind speed and, even with cyclic pitch becomes unable to match the lift of the opposite forward-traveling wing. The assistance of lower wing 2800 taking over part of the lift extends the range of forward rotary-wing speed. If the wings 2800 are further capable of differential pitch change, they can compensate for the developing roll moment as the rotary wings become unable to balance lift between the advancing and retreating wings. The increasingly rapid forward advance calls for a correspondingly steeper tilt of the rotation plane of the rotary wings, which in the illustrated configuration must be accomplished entirely by wing flapping and not by forward tilt of the aircraft body. Forward fuselage tilt would cause the lift vector from wings 2800 to pass behind the aircraft c.g., tipping the aircraft uncontrollably further nose-down. Pitch control from the elevator in 2700 plays a role here. To complete a transition to airplane mode, wings 2800 take over 100% of aircraft lift while the rotary wings pitch to zero lift angles and the aircraft glides forward, under control but temporarily un-powered. The propellers then act to slow rotary wing rotation, stopping the rotary wings with one wing facing forward and one aft. In this alignment, one of those wings can be flipped without being caught broadside to the wind, smoothly coming into parallel pitch alignment with the opposite wing. A 90-degree yaw rotation then swings the rotary wings into forward-facing alignment for airplane flight. The rotary wings then pitch up to share aircraft lift with the lower wings in a biplane configuration, while the props come up to speed and provide airplane-mode thrust.

A transition from airplane-mode to rotary-wing-mode flight optionally follows approximately the reverse of the sequence just described. The airplane is flying forward as a biplane. The aircraft speeds up sufficiently to fly entirely on the lift of lower wing pair 2800, possibly including some extra speed in anticipation of speed loss during conversion. With their aerodynamic pitch angles servoed to zero lift, the rotary wings are rotated by prop action into fore-and-aft alignment with respect to the wind. In this alignment, the wings rotate in pitch relative to each other until they are both pitch-flat and facing in opposite directions. The props then start to spin the rotary wing, enabling the forward-advancing wing to develop significant lift. The resulting roll-moment imbalance is compensated by differential pitch change in wings 2800. As the aircraft continues to slow and the rotary wing rotation speeds up, the retreating-side rotary wing becomes able to lift and begin to achieve roll-moment balance in the rotary wing. Lift from wings 2800 is progressively reduced as the aircraft continues to slow and transition entirely into rotary-wing forward flight.

The tail section 2700 shown in FIGS. 27 and 28 is useful in the FIG. 28 context using secondary wings 2800. In the configuration of FIG. 27 and earlier with no secondary wings, use of 2700 becomes optional. Vertical stabilizer 2720 can serve to align the fuselage in forward flight, with variable rudder control surface 2721 fine-tuning that yaw alignment. Horizontal stabilizer 2710 including variable elevator control surface 2711 can similarly trim the fuselage pitch angle in forward flight, including in both airplane and rotary wing modes. In hovering and slow rotary wing flight, however, the conventional tail structure of 2700, using fixed horizontal and vertical stabilizer surfaces, provides control over too limited a range of aerodynamic angles, even with the variability of a trailing edge elevator and rudder. As previewed above and further discussed below, the fully rotatable elevator and rudder surfaces of tail 2900 of FIG. 29, lacking non-rotating horizontal and vertical stabilizer surfaces, find substantial use in embodiments of the present invention.

As a practical note regarding clearances, the hub mechanisms of 140 and its streamline fairing 141 are relatively large in the figures up thru FIG. 29 and can be shrunk and reshaped, potentially allowing the wing-rotor to come down closer to the fuselage. One indeed finds such variability in the flattened lifting-body hub 3010 of embodiments 3000 and 3010 of FIGS. 30 and 31. As a design consideration, lowering the wing-rotor leaves less aft clearance for the rotor disk plane to clear the fuselage and possibly the vertical stabilizer or rudder, which in turn limits the control range. Even if helicopter-mode flight is contemplated solely for nearly vertical take-off and landing maneuvers and flight conversions, with little priority on horizontal maneuverability, a practical aircraft still needs to land on target in variable and unpredictable winds. If insufficient clearance is allowed for the rotor plane to tilt back, that becomes a problem. While FIG. 27 is intended to illustrate tail and propeller options "in principle," one finds on closer examination that both the rudder and the relatively large mid-wing props leave minimal latitude for backwards rotor tilt. There are good reasons for helicopters to have relatively high masts and to place their tail rotors far aft to clear the rotor disk when it tilts back. Similar criteria would dictate that a rudder, if used at all, might be located either beyond or inside the radius of the rotary wings and particularly the props.

FIGS. 21 thru 25 illustrate mechanical options for the hub 140 originally indicated in FIG. 1. The sizes and proportions of components are not intended to represent optimized engineering, but are chosen to illustrate basic principles and topologies. Referring first to FIG. 21, the empty fuselage 2140 might require some payload or, when traveling without much payload, simply ballast, to keep the aircraft c.g. sufficiently far below the rotor for control purposes. Alternative control options not dependent on pendulous weight in a "hang glider" control mode will be discussed with reference to FIGS. 30 and 31. Continuing with FIG. 21, in the cut-away view inside the hub fairing one finds a battery 2120 high in the fairing 141 and extending forward into a control module 2130 filling the nose of the fairing and extending into the tube discussed above for sensing wind impact pressure and indicated airspeed. Various components may be included in this control module, some optional, including but not limited to the following:

A microprocessor adapted for motor control
Power electronics for motors to drive props, control wing pitch and counter spin in the fuselage
Encoders to report angles of flapping, pitch of each wing and relative angle of the fuselage
Radio communication with the ground
3-axis accelerometer
3-axis solid state gyro to sense angular velocities
3-axis magnetic compass
GPS
Barometric altimeter (an absolute pressure sensor)
Differential pressure sensors, for:
  Indicated airspeed of hub fairing or fuselage
  Aerodynamic pitch of: hub fairing or fuselage and/or one or both wings
  Aerodynamic yaw of hub faring or fuselage
Forward-looking video, including for collision avoidance involving birds and other aircraft
Directional transponder: transmitter and receiver for detecting positions of nearby aircraft
Outside air temperature sensor
Motor temperature sensors
Battery charge indication, generally measuring voltage, temperature and current draw
Homing beacon sensors, for precise targeted landings independent of GPS drift Given the complexity of the flight controls of this invention, semi-robotic or fully robotic control is highly desirable. Some of the sensors listed above overlap in use. For example, time-integration of linear and angular accelerometer sensor outputs provides rapid dynamic indication of velocity and angle, but that indication is subject to drift. GPS indicates position and, with time delay, velocity or at least short-term-average velocity, which can be used to correct drift in the integration of accelerometer signals. Partial indications of angular orientation in space come from the 3-D magnetic compass and possibly from differing antenna signal strengths of GPS and radio beacons: signals that can be combined to give orientation independently or as corrections for drift in the integration of electronic gyro signals.

As shown and discussed with reference to FIG. 30 and system 3000 differential pressure sensors in the wings can be used in similar fashion to the sensor holes (2230, 2231, 2235 and 2236) discussed above for the hub fairing or fuselage, combining their signals with indicated airspeed pressure (as from 2110) to determine aerodynamic wing pitch angles. Specifically, forward-extending tubes 3050 and 3051, functionally analogous to tube 2110 extending ahead of fairing 2100 (FIG. 21) provide readings of impact pressure and indicated airspeeds at these reference points along the left and right wings. Top-surface sensor apertures 3054 and 3055, paired with respective bottom-surface apertures 3058 and 3059, when coupled pair-wise to differential pressure sensors, provide pressure-indication of lift for the left and right wings.

When the corresponding impact pressures from 3050 and 3051 are sensed differentially with respect to free-stream pressures or comparable barometric pressure references, these pressure differentials, divided into the corresponding top-to-bottom pressure differentials, provide quotient indications of wing aerodynamic attack angles, nearly independent of airspeed. The context of the present invention with its very wide variations in geometric wing pitch angles makes it particularly important to control pitch in relation to true aerodynamic flow angles, rather than in relation to hub geometry. One wants to control lift, not pitch, and one wants to assure that wing angles of attack do not exceed stall angles except possibly when the craft's overall airspeed is very low and aerodynamic control is given over to the thrusters, be they props or turbines. Servo control of wing pitch for aerodynamic attack angle is discussed below along with alternative approaches to measuring wing attack angles.

There are possible redundant indications derived from expected flight dynamics. For example, a wing roll angle will result in a changing yaw angle so that (for instance) a steady compass heading will indicate flight trim with no roll, thus providing drift correction for roll angle indications from a gyro. Similarly, a wing pair's collective aerodynamic pitch is related to indicated airspeed and vertical acceleration, while the left-right wing-pair differential pitch is related to indicated airspeed and roll acceleration. These dynamic relationships provide redundant sensing information. There is value, however, in fast-responding direct sensing of aerodynamic pitch of the two wings from indicated airspeed and pressure differentials between different parts of the wing. A goal of dynamic integration of these various signals is to provide seamless indication of the parameters of flight, valid over short and long time frames. Such integration is being developed and applied to the sophisticated control of quadcopters and multicopters, providing methodologies that can be adapted to the flight control sensing and software needs of the present aircraft invention.

View 2200 of FIG. 22 omits the batteries and control module of FIG. 21, providing a less cluttered view of hub mechanics. Pressure sensor holes discussed above are seen from the inside in FIG. 22 and, labeled with the same numbers, from the outside in FIG. 28. In the components collectively labeled 2220, a motor in the hub with downward-extending vertical shaft provides gear engagement to rotate the fuselage in relation to the hub. A cylindrical downward extension 2331 of the Y-shaped flapping hinge yoke 2330 (labeled in FIG. 23) passes through bearings 2321 and 2322 (FIG. 23) in cylindrical sleeve 2210 (FIG. 22). The outer perimeter of that sleeve is joined to the large gear of the fuselage yaw control system indicated by 2220. The small gear from the motor, engaging that large gear, could be driven from below in the fuselage, but then the large gear would need to be coupled to the inner shaft coming down from the hub. Alternatively, the Y-yoke in the hub could be joined to the outer bearing sleeve while the shaft inside the bearings could be joined to the fuselage, in which case a yaw motor in the fuselage would engage a large gear on the bearing sleeve.

FIG. 23 provides a closer view of the hub mechanisms. The fuselage-mast bearing sleeve is removed, uncovering the bearings 2321 and 2322. A motor 2340 with horizontal shaft emerging toward the viewer is seen engaging a two-stage reduction gear to actuate pitch angle control on the spar 2360 of one wing, while a similar motor and gear system actuates the opposite wing independently. These pitch actuation motors and gears are mounted to "+" shaped block 2350, which is the rocking see-saw part of the flapping hinge, which in turn rocks inside "Y" shaped yoke 2330. 2310 is the end of the journal shaft extending through a bearing in 2350, while the opposite end of that shaft is obscured. Comparing the views of FIGS. 23 and 24, removal of the flapping Y-yoke 2330 and the short inward-extending shafts (2310 and its obscured opposite counterpart) from that yoke reveals one side 2410 of the pair of bearings that engage those short shafts to constitute the flapping hinge. The shaft and bearing locations could optionally be swapped, with the shafts extending out of the center component 2350 and the bearings located in the Y-yoke 2330.

FIG. 25 shows greater detail in the middle of the components of FIGS. 23 and 24. A tube 2505 joining wing spars 2360 and 2361 is seen in cut-away view, revealing bearings 2515 and 2516, a coaxial bearing pair inside the tube for rotational support of wing spar 2361, while a similar obscured pair supports spar 2360. These spars are hollow tubes, for example of a carbon fiber composite. They extend through the lengths of the wings. To relieve the considerable axial centrifugal stress on the spar-supporting bearings, a centrifugal tension wire 2540 is seen emerging from the inside of the visible spar tube 2361 and (obscured from view) continuing across into the opposite tube 2360. Optionally, the bearings can be given small axial compliances by various means, allowing for axial stretch in wire 2540 without transferring large axial loads to the radial bearings. For example, if the bearing I.D. is slightly larger than the O.D. of the wing spar tube, the two can be joined by a thin layer of elastic material that provides some axial compliance but is quite stiff in resisting radial off-center displacement—or similarly for an elastic coupling in a clearance from the bearing O.D. to the tube I.D.

If the centrifugal tension wire 2540 shown here extends for the full span of the wing and is thick enough to withstand the needed centrifugal force, but not excessively thick, then in a small lightweight aircraft, its torsional compliance can be high enough that wire torsion moments can be largely ignored. "Wire" 2540 may optionally be a stranded wire or a composite fiber-reinforced rod, for example a pultruded carbon fiber rod of glass fiber rod. Stranded and composite options like these provide high tensile strength with a greater torsional compliance than would be obtained using a solid wire. Indeed, in full scale helicopters, harnesses including many loops of wire withstand centrifugal forces while allowing pitch change, but their torsional stiffness is high and must be taken into account in the pitch control design. Such a conventional harness will typically be anchored to provide a pitch-up moment, thereby relieving some of the steady forces in the pitch control linkages. A similar torsional function can be realized in the present context, with similar harnesses or with the wire 2540 shown in FIG. 25. Referring specifically to the function of this wire, advantageously the wire would be untwisted and torsionally neutral when the wings are aligned with their leading edges facing forward for airplane flight. As the relative angle between the two wings changes by roughly 180 degrees for helicopter flight, torsion in the wire can provide a steady pitch-up moment, offsetting part of the "tennis racket effect" inertial moment associated with the mass distribution of the rotor blades. As described earlier, with the right choice of rotation sense in the props, the gyroscopic torsions from the thruster props in helicopter mode will add further pitch-up moment. For a design flight condition, the sum of the gyroscopic pitching moments and the torsion wire bias can be chosen to fully counterbalance the wing inertia moments, thus minimizing torsions to be overcome by the pitch control motors.

The above discussion regarding pitch-up moment in a twisted wire 2540 is applicable only where the thruster gyroscopic moments are smaller than the gyroscopic wing-flattening or "tennis racket effect" moments of the wings at their nominal rotary-wing pitch angles. Depending on design details, however, the gyroscopic torsion moment from a thruster (including the prop or turbine and its driving motor or engine) can exceed the inertial flattening moment of the driven rotary wing at a desired pitch angle. In such a context, the pitch control motors may be required to counter steady incompletely-canceled gyroscopic moments from the thrusters. Previewing embodiment 3100 of FIG. 31, paired thrusters on each wing, giving opposing gyroscopic pitching moments, can be operated to minimize steady torsion loads in hub-located pitch control motors, or even to control wing pitch entirely by gyroscopic and thrust-related pitching moments involving the thrusters. Applicable methods of pitch control will be found to depend on design specifics.

Discussion now shifts from steady rotary-wing pitching moments to the cyclic pitching moments associated with dynamic cyclic pitch control. Cyclic pitch control in helicopter-mode flight can optionally be provided entirely by cyclic variation of prop speed and the associated variable gyroscopic moment. Consider a completely flat rotor blade that, at zero pitch, has no inertial extension along the vertical axis. It can then be shown that for small angular perturbations from zero pitch, there will be an inertial natural resonance between blade inertia and centrifugal pitching moment variations with pitch angle change, such that the blade will pitch up and down resonantly at a one-cycle-per-revolution or one-per-rev frequency. Blade inertia extending along the vertical or out-of-plane axis will lower this natural frequency below one-per-rev. Components that will add such out-of-plane rotational inertia include the props and their driving motors of this invention.

Each rotary wing blade and its associated pitch-inertia components can be dynamically re-tuned to one-per-rev by coupling it to a torsional spring restoration. View 2500 of FIG. 25 illustrates a flat spiral torsion spring 2510 providing coupling between the slowest pitch-change gear of gear system 2341 and the wing spar tube 2360. This illustration is drawn for concept, not for quantitative scale. When the angular velocity of the propeller and associated motor components is varied cyclically in a one-per-rev rhythm, then with a proper choice of torsion spring rate, motor-prop speed variations alone can provide needed cyclic pitch with no cyclic motion of the motor-driven (outer) end of the torsion spring. This tuning need not be exact, as the gyroscopic pitching moments are substantial enough to overcome some unbalanced rotational inertia (if the spring is too soft) or unbalanced spring restoration (if the spring is too stiff for flight conditions.) The motor and gear system then optionally provides just sufficient torsion bias in spring 2510 to give the desired collective pitch angle. If the average gyroscopic torque of the thrusters is pitch-up and exceeds the wing-flattening moment of wing inertia at the desired collective pitch angle, then that torsion bias could be pitch-down.

The steady-state rotational phase of the pitch change response to variable thruster motor speed will depend on the net un-balanced one-per-rev wing inertia (if the spring is too soft) or torsion spring rate (if the spring is too stiff) and on torsional damping, while in the short term, near-resonant pitch change response will build cumulatively over multiple wing revolutions. Further system response lag arises because the rotational inertia of the thruster will cause motor speed variations to lag behind changes in motor winding currents and resulting electromagnetic torques. Given these multiple interacting response lags and phase shifts, cyclic pitch control from motor speed variation must include dynamic corrective feedback and, for dynamic stability, also feed-forward. Consider for example a prop motor whose driving voltage phase is synchronized to the mechanical rotation phase of the motor. In such a motor, electromagnetic torque will vary predictably as a function of motor current alone. That magnetic torque will control angular acceleration, so thruster angular velocity response will exhibit a second-order dynamic lag behind motor current. In an algorithm of a feed-forward motor and cyclic pitch controller, that lag can be expressed as a function of the rotation phase of the rotary wing over a range of operating conditions. For example, one might find that in a given operating condition, thruster gyroscopic torque might lag behind applied motor current by some angle of rotation of the rotary wing. In order to control gyroscopic torque for cyclic pitch control, a feed-forward controller would therefore apply changes in motor current at substantially the same angle ahead of the desired gyroscopic moment. Further phase lead would be needed to account for the dynamic lag in response of left-right differential wing lift to gyroscopic moment, accounting for in-plane and out-of-plane components of wing rotational inertia, aerodynamic damping of mechanical response, and even the lag of aerodynamic lift behind pitch angle variation. Finally, changes in tilt of the rotor disk-plane lag geometrically by 90-degrees of rotation behind variations in differential wing lift. So, if one wants the rotor plane to pitch nose-down for forward acceleration, then rotary wing lift must be maximally reduced when the wing extends laterally to one side coming around to the front, and maximally increased when the wing extends to the opposite side headed to the back. The net effect of these multiple phase lags and variable amplitude responses might be evaluated by an adaptive controller, for example employing "fuzzy logic" rather than an analytic model to get the desired response from the system.

This kind of control method logic will need to be worked out in varying contexts for varying physical embodiments of the present invention. For example, in a motor and gear system such as 2340 and 2341, providing collective pitch bias while spring 2510 and its opposite-wing counterpart interact cyclically with varying dynamic current to control cyclic pitch and variation in the plane of rotation of rotary wings 110 and 112—this is the kind of situation that will call for an appropriate control method. The mechanical, inertial and aerodynamic systems disclosed here are amenable to this kind of control and may be resolved for specific application contexts.

It is unlikely that the resonant pitch control options described above would be worthwhile in a relatively small, simple version of the present aircraft invention. The added complexities involved could, however, become worthwhile in a larger, heavier aircraft intended for thousands of hours of service. Where a high premium is placed on reliability, helicopter-mode pitch control entirely through motor speed control could be achieved in a backup mode. If the aircraft is in helicopter mode and the pitch motors are fully disengaged, allowing the rotor blades to feather freely, then their collective pitch would be set by a combination of torsion bias in the centrifugal tension wire (possibly a pitch-down bias) plus gyroscopic pitch-up moment from the props. Increasing non-cyclic prop speed would immediately increase blade pitch, causing the craft to rise. As the rotor speed increases in response to the extra prop torque, the rotor blade inertia moments would bring the pitch angles back down with the increasing rotor speed, sustaining the extra lift while desirably bringing the blade pitch angles back down toward a design-optimum angle of attack. Conversely, slowing the props would immediately reduce blade pitch, causing the aircraft to drop, while the rotor speed would slow and the blade collective pitch would move partway back to the original design-optimum angle. Thus, prop speed could entirely control hovering vertical response. Cyclic prop speed variation could provide control of cyclic pitch, tilt of the rotor plane and horizontal motion. This mechanism could provide backup control in the event of certain failures, provided that the failed normal pitch control mechanism could be disengaged to allow this to work. Control of this sort is not expected to be sufficient to convert from airplane flight to helicopter flight. Note that in a system with relatively higher prop rotational inertia, the stabilizing vertical control response just described could give way to instability.

While the above discussions have engineering significance for particularly lightweight, low-angular-momentum thruster systems, their reasoning may be difficult or impractical in applications using high-angular-momentum thrusters whose gyroscopic pitching moments significantly exceed the strengths of the "tennis racket" wing-flattening inertial tendencies of the rotary wings themselves. Such significant variations on the previously-described embodiments are now discussed with reference to FIGS. 30 and 31. The system 3100 of FIG. 31 provides a wing pitch control system based entirely on gyroscopic pitching moments and the moments arising with thrust vectors acting through significant torsional moment arms with respect to the wing pitch change axes. We begin by providing background for that system 3100 by describing the relatively simpler system 3000 of FIG. 30.

Unlike the teardrop-shaped hubs of earlier embodiments, the central rotary hub 3010 of aircraft system 3000 is essentially a flying wing combining low drag properties with lift that is continuous with the spanwise lift distribution of the attached wings. Lateral cross sections through 3010 have airfoil shapes whose aerodynamically-balanced 25% chord points are at least approximately lined up with the balanced pitch change axes of the wings. The middle lateral sections, however, extend further aft behind the regular section trailing edges into a thin aerodynamic tab 3015. This tab may be fixed and serve as a horizontal stabilizer or may optionally be angled up and down as indicated at 3016, providing variable elevator control. The tab is drawn bending upward toward the trailing edge, thus normally providing a pitch-up moment (in the absence of a significant angling-down elevator control change.) When this pitch-up moment is balanced against gravity working through a wing c.g. placed ahead of the dynamic lifting line of the wing section (generally meaning ahead of the 25% chord), the result is a dynamically pitch-stable airfoil that inherently seeks a design angle-of-attack. That angle can be intentionally varied by optional elevator angle control 3016.

In earlier discussions of mode-conversion maneuvers of aircraft embodiment 100, it was found that the aircraft wings lost control authority as the flight path approached a peak altitude and began to descend. Pitch control then relied on variations in thruster force acting through an effective pitching moment arm with respect to a pendulous c.g., somewhere well below the level of the props. Optional center prop 3020 of embodiment 3000, interacting with lifting body fuselage 3010 and tab 3015 and optionally with its elevator variations 3016, provides continuity of fully aerodynamic fuselage pitch control at low forward airspeed. Prop wash from 3020 streams back across the slowing hub fairing 3010 and continuing across tab 3015, providing controllable pitching moments and limited controllable lift. This optional system does not rely on a pendulous aircraft c.g. placed well below the lines of the thruster force vectors. This leads to a different kind of fuselage attachment, as is now described.

The flying-wing approach to pitch stability as just described is not nearly as robust, in countering load imbalances, as is a more conventional airplane structure with a horizontal stabilizer placed far aft of the main wing. The hub itself, however, can be carefully balanced by design, while imbalances that may arise in the payload pod 3060 are torsionally decoupled from hub 3010. Specifically, linking rod 3005 joining 3060 to 3010 includes a universal swivel at an attachment point inside 3010 that lies on or very close to the effective aerodynamic balance center of the entire wing-plus-hub system. This swivel at the top of 3005 allows 3060 to swing freely fore-and-aft as indicated by double-arrow 3008, also to swing side to side as indicated by double-arrow 3009, and finally allows free yaw rotation of 3060 in either direction and through multiple revolutions as indicated by double-arrow 3007. Given this mechanical freedom, the orientation and alignment of pod 3060 is controlled by the sloping rudder 2910 and the elevator 2901, which will be recognized from earlier appearance in FIG. 29. While pod 3060 is picked up and carried by the hub and wing carrier system above it, the pitch and yaw of 3060 are thus controlled independently by its own control surfaces in hovering, forward rotary wing flight and airplane flight. In flight mode conversions, however, 3060 is no more controlled than a pendulum dangling below the carrier system, whose operations must take account of the motions of its payload weight. The optional interactions involving prop 3020, reflexed trim tab 3015 and further optional tab "elevator" adjustment 3016 lend extra control for assuring that the pendulous path of 3060 is well controlled.

In all embodiments of the invention, rotary wing control of carrier orientation in space is derived from the stabilizing "platform" of not-easily-changed rotational inertia about the yaw axis, with robust aerodynamic moments to tilt that gyroscopic "platform" arising from cyclic pitch of the wings and resulting strong variations in wing lift acting through large moment-arm radii to apply plenty of torque. In airplane-mode flight, carrier roll orientation is controlled by comparably robust aerodynamic moments of the wings operating with left-right pitch angle differences. Carrier yaw orientation is strongly controlled by differences in thrust between the left and right wing thrusters. This leaves carrier pitch in airplane-mode flight as the weakest control dimension. Carrier airplane-mode pitch control is handled in three alternative modes in three embodiments, two of which have been described. These first two are now reviewed briefly for comparison with the third pitch control mode and embodiment.

In variations of embodiment 100 of the present invention, pitch control arises primarily from the interactions of the associated flight path and wing lift vector with the pendulous mass below the wings. This control is augmented by variable vector thruster forces operating more or less at right angles to the flight path. In flight mode conversions, this "augmentation" of variable vector thruster force momentarily becomes the sole source of pitch control. Fortunately, the conversion maneuvers are of brief duration, so that pitch variation can be largely a predetermined trajectory controlled largely by the initial conditions of linear and angular momentum upon emergence from wing-controlled flight into the conversion transition. In this system, the carrier unit, consisting of the joined thrusters and rotary wings and the hub system with flapping-hinge decoupling, may or may not be able to fly independently with its fuselage or payload pod detached. The joined hub and fuselage units have been treated as a single pendulous mass in pitch control discussions above. The detachment option depends on details of the design and its mass distribution. Within the scope of this invention, extra elevator-like surfaces may optionally be added to the carrier of embodiment 100 for more robust control. Such surfaces are generally more effective if mounted to the hub, either aft or canard-style forward (with active stabilization) to take advantage of greater lever arms aft or forward of the lift line through the wings. Common mode wing pitch control finds the "anchor" against which it works in the orientation and relatively high pitch-change inertia of the hub. Embodiment 3000 replaces the streamlined but otherwise non-aerodynamic "tear drop" hub 140 with the aerodynamic "flying wing" hub 3010, with optional control augmentation by prop 3020, tab 3015 and further optional elevator control 3016. Unlike in embodiment 100, the pitch of carrier or cargo pod 3060 is entirely decoupled from pitch of 3010. This 3010 hub body, in turn, serves as the "anchor" for wing pitch control, as with embodiment 100.

In contrast to embodiments 100 and 3000, pitch control in embodiment 3100 of FIG. 31 is found primarily in the wings. The flying-wing hub is basically the same as 3010 but generally without need of optional variable control elements 3020 and 3016 (which are omitted from FIG. 31). In flight, the left wing, the hub and the right wing are able to find their respective pitch angles independently and autonomously. In practice, some mechanical pitch control may be included in the interface from the hub to each wing, but its control function will be secondary. The wing pitch control system is now explained, separately for rotary-wing and airplane modes. The rotary wing control system is predicated on the gyroscopic pitching moments arising from the propellers exceeding the moments required to pitch the associated wings through their angular control range. This requires that the chordwise polar inertia of the wings must be low. A rough quantitative criterion for "low" is as follows. Let $I_{yy}$ represent the wing mass moment of inertia about the pitch change axis as distributed in the chordwise y-direction and $I_{ax}$ represent the polar inertia of a prop or turbine and its associated rotating motor or engine mass about its rotation axis. Let rotary wing angular velocity be $\Omega$ and prop angular velocity be $\omega$. Let the wing inertial out-of-plane pitch angle be $\theta$. Angular units are radians and radians-per-second. The wing flattening moment $M_\theta$ is roughly:

$$M_\theta \approx \Omega^2 \sin(\theta) l_{yy} \tag{1}$$

The gyroscopic pitching moment $M_{gyr}$ is roughly:

$$M_{gyr} \approx \Omega \omega \cos(\theta) l_{ax} \tag{2}$$

Pitch control by gyroscopic pitching inertia alone requires roughly the following:

$$M_{gyr} > M_\theta \tag{3}$$

This Eq. 3 inequality is equivalent to the following:

$$(\omega/\Omega)\cot(\theta)(l_{ax}/l_{yy}) > 1 \tag{4}$$

The equivalent inequalities 3 and 4 are satisfied for very small positive angles $\theta$, where the cotangent function goes to infinity. The inequalities are satisfied in many practical situations for rotary wing operation in hovering and forward flight, but not for the extreme pitch angles needed for flight mode conversions. The moment couples generated by angled prop thrust, as described below, might be sufficient to control flight conversions. Some pitching moment assistance coming from the hub-to-wing pitch couplings will commonly be desired for reliable operation. The pitch control approach described for embodiment 3100 will be applicable where the above inequalities are satisfied with a sufficient margin.

Considering thruster system 3112, there are two independently rotating motor-prop thruster subsystems 3130 and 3131. These are counter-rotating, so that the prop of 3130 pulls forward and the pusher prop of 3131, having the opposite handedness of 3130 (such as a left-hand prop for pushing and right-hand prop for pulling), will push. A near-coaxial alignment allows the pusher prop to recover some of the twisting wake energy of the puller prop. This loss recovery becomes significant with high-pitch props. Importantly, the angular momentum vectors of 3130 and 3131 tend to cancel. If the two motor-prop systems are identical, the angular momenta and associated gyroscopic pitching moment effects will cancel when the props run at equal speeds in opposite rotation senses. Unequal motor-prop systems might be considered within the scope of this invention, including where pitch-up moments are needed more than pitch-down moments. Another way to obtain average pitch-up moments is available, however.

Note that thruster 3130 is centered below the bracket joining 3130 and 3131 to the wing, while 3131 is centered above the bracket. The bracket itself is aligned with the chord of the wing. The offset motors are parallel to each other and to the bracket and wing chord. The opposite vertical offsets of the motors cause a tilt in the larger principal axis of inertia of the motors and props in the plane of the wing chord. This skewed inertia causes the thruster system 3112 using thrusters 3130 and 3131 to develop a pitch-up inertial moment when operating in rotary-wing-mode. Other modifications to the mass distribution in planes perpendicular to the pitch change axis can similarly bias a wing to naturally assume a desired pitch-up angle in rotary-wing flight. One can, for example, add weights near the wing roots and lying above or below the plane of the wing chord and also well ahead of or behind the pitch change axis. Centrifugal forces on such weights near the root are low, but the pitching moment effects are the same near the wing root as near the tip. The products of inertia of these weights skew the angle of the original chord-plane moment of inertia of the wing.

Wing pitch can then be varied from this skewed rotary equilibrium angle by relative speeding-up of 3130 and slowing-down of 3131 and vice versa, using the rotation speed differentials to unbalance the opposing angular momenta and drive pitch change. The opposite-wing thruster system 3110 is shown facing forward in airplane-mode. Unlike leading or puller thruster 3130 on the right wing, which is offset below the bracket center, leading puller thruster 3120 on the left wing is offset above the bracket center. The same kind of asymmetry applies in comparing thrusters 3131 and 3121. When the left-hand wing is flipped 180 degrees about the pitch change axis, however, 3120 is then below-center and 3121 above-center. Indeed, the left wing and thruster are found to be identical to the right wing and thruster rather than mirror images through the center-plane of the hub. In airplane-mode configuration, one might expect mirror symmetry of the two wings, but that is not the case here.

In rotary-wing-mode, the dual-component thrusters are seen to provide controllable pitch-up and pitch-down gyroscopic moments when the speeds of the two paired components are varied differentially, one faster and one slower. Their offsets above and below the plane of the wing chord serve inertially to bias both wings pitch-up in this mode, with the degree of bias rotation determined by the vertical and horizontal spacings of the motor-prop components. Speeded up or slowed down together, the thruster units provide variable thrust. The inertia distribution in the relatively flat hub will cause it to spin in the plane of rotation of the wings and thrusters. Thus, the entire system promises to have both stability and controllability in its rotary-wing-mode. Control in airplane-mode, however, is quite different.

Embodiment 3100 is pictured in airplane-mode configuration in FIG. 31. The left and right thruster systems are not mirror images of each other. The gyroscopic momenta of the thrusters are significant only transiently during rates-of-change of yaw or pitch, so steady-state gyroscopic control of wing pitch is unavailable in this flight mode. However, the opposite vertical offsets of the paired thruster components, combined with their alignments, provide controllable wing pitch moments. For thruster 3120 the force vector of the puller motor-prop passes above the wing pitch change axis, while for 3121 the force vector of this pusher passes below. Both the relative positions and the alignments of 3120 and 3121 affect their torque-producing force moment arms relative to the pitch change axis. An obvious adjustment is for equal moment arms above and below, so that matching thrusts produce zero net pitching moment and thrust differences produce controllable moments. Although the above and below locations of 3130 and 3131 of unit 3112 are reversed compared to 3120 and 3121, thrust differentials are equally effective and producing controllable wing pitch-up and pitch-down moments. Indeed, these same aerodynamic pitching moments are in play in rotary-wing mode, except that in rotary mode the gyroscopic pitching moments will typically be significantly more powerful than the aerodynamic moments.

Additional features 3150 and 3152 are seen extending from the trailing edges of the left and right wings in embodiment 3100. These features, as drawn, are too small to be very effective ailerons and certainly too small to be elevators. Indeed, they are aerodynamic pitch sensors. 3152 is shown in detail in view and subsystem 3200 of FIG. 32*a*, while the similar signal from sensor 3150 is indicated entering a pitch control computer 3263 and labeled μP for microprocessor. Examining 3200, component 3152 is a flow-direction-sensing aerodynamic tab which swivels bidirectionally as indicated at 3220, swiveling about a long shaft 3210 that extends out either end of 3152 and into bearings inside the wing near the trailing edge. A long slender permanent bar magnet 3230 extends the full width of 3152 and, for illustrative visibility, slightly beyond the ends of 3152. The bull's eye symbol of a dot in a circle at 3240 represents a north magnetic pole on the upper surface of 3230, indicating that this slender magnet is poled transversely from bottom to top. This magnet balances the weight of the rotating sensor assembly about its shaft axis and provides a magnetic signal for angle sensing.

A magnetic sensor package 3260, e.g. a Hall effect device, responds to this magnetic signal with a signal output 3261. Advantageously in a Hall sensor, the sensing bridge component inside 3260 may be oriented in a vertical plane, such that when 3152 is angled at the center of its range, the permanent-magnet field will be parallel to the plane of the sensing bridge and produce a null output. Rotation of 3152 and the magnet will cause the magnetic field to pass through the bridge in one direction for pitch-up and the opposite direction for pitch-down, yielding a continuous analog signal that provides a good indication of aerodynamic pitch. When the wing is pitched up, the natural streamlines past the airfoil will bend upward going back past the trailing edge. This bend in the flow will rotate 3152 pitch-down, i.e. trailing edge up. An opposite wing pitch will give an opposite angle response in 3152 and an opposite-polarity output along 3261. A comparable pitch-sensing signal from sensor 3150 on the opposite wing is indicated along 3262.

The use of servo control of geometric pitch to control the lift coefficient $C_L$ or the equivalent aerodynamic angle of attack has been discussed extensively above. Diagram 3270 of FIG. 32*a*, representing the computational end of the sensor system whose mechanical, aerodynamic, magnetic and sensing components have just been described, operates as follows. The microprocessor (or microcontroller) 3263 receives inputs 3261 and 3262 from the right- and left-wing sensors. These signals are measures of the lift coefficients of the two wings. At a higher level in the control system there arise two target signals, one for the target common-mode $C_L$ at 3264, and another for the target differential-mode $C_L$, notated as $\Delta C_L$ at 3265. (The higher-level computation and the computation in 3263 may take place in the same physical processor, where the component 3263 will be taken to represent a code segment rather than a separate processor. 3263 may optionally even be an analog computation.) These targets arise respectively from a high-level controller "request" for a specified total wing lift and a specified roll moment. The high-level controller works backward from indicated airspeed, total wing area and, for roll moment, the effective radius at which lift differences appear with differential pitch, putting out target coefficients. Sum and difference signals "$C_L+\Delta C_L/2$" and "$C_L-\Delta C_L/2$" provide separate targets for feedback signals 3161 and 3162. These difference-signal targets will typically be limited or clamped in range to coefficients that are physically achievable with the two wings without entering stall. The differences between the targets and the sensed parameters will be used to generate geometric wing pitch-angle targets 3266 and 3267, notated $\theta_{LEFT}$ and $\theta_{RIGHT}$. The detailed process of setting targets and operating pitch-actuation components will usually involve stabilizing transfer functions with phase-lag, phase-lead and commonly also more involved predictive computations such as have been described above. For example, it was stated that control of cyclic pitch via gyroscopic pitching moments involves effective delays equivalent to substantial rotation angles of the rotary wing, requiring pre-compensation of signals to thruster motors as well as more direct mechanical pitch actuators.

The pitch control system of 3100 certainly requires such compensations. In the discussion of embodiment 3000 and its diagram, pressure sensor apertures 3050, 3054, 3058, 3051, 3055 and 3059 were discussed in relation to lift coefficient computations from pressure signals. Indeed, the kind of computation taking place in computation subsystem 3270 is very general and can use inputs 3261 and 3262 from a variety of types of pitch sensors, including the pressure sensor system just mentioned. As indicated in FIG. 32b, lift coefficients for input to 3270 can be derived indirectly from other signals that will be available to an aircraft control system. The list of symbols at 3275 indicates some of the types of system measurements that may optionally be used in combination to infer wing lift coefficients. Here the Greek "LP" is taken to represent Yaw angle, while the dot above the second instance of the symbol indicates the time derivative, i.e. the Yaw rate-of-change. Here also the Greek "p" represents roll angle (not to be confused with density, which commonly shares the same symbol), while "ρ-dot" and "ρ-dot-dot", as notated with actual dots above the letters, represent roll rate and roll acceleration. "U" is airspeed, preferably "indicated" airspeed compensated for air density, where evaluation of "U" leads to the important Bernoulli pressure "½ rho U²" (where the Greek letter for "rho" is not used to avoid symbol confusion). The value for "U" might be determined from GPS measurement or from accelerometer readings combined with evaluations of aircraft performance, or the Bernoulli pressure might be measured directly with pressure sensors and the value "U" backed out. The symbol "g" with arrow above represents the net acceleration vector of the aircraft, including "against" gravity. The "etc." indicates other measurements that might be used independently or in combination with those indicated by the symbols just explained. For example, a sensor tab like 3152, instead of pivoting freely to give an angle measurement, might be nearly fixed in angle except for very small deflections that register as strain in a strain gauge measurement. This strain measurement would constitute an indication of wing lift, comparable to the pressure differential indications between aperture pair 3054 and 3058 or aperture pair 3055 and 3059. These and/or other measured values ("etc.") from 3275 are input to 3280, "μP0", a processor, computation or code segment that derives from its inputs the inferred lift coefficients of the two wings. The resulting signals are used by computation 3270 for generating pitch-angle targets and more generally for servo-control of wing pitch. Indeed, the actual pitch angle targets 3266 and 3267 may be implicit variables in the computation, not appearing separately. The operative signal, for example, might always be a measure of pitch angle error rather than the actual geometric angle. The clear objective here is to provide a signal of use for controlling the lifts of the two wings, avoiding stall, and possibly detecting stall, should that be caused by a gust.

Direct trailing-edge measurement of wind flow is particularly sensitive to stall. Thus, in the event of wing stall, sensor aerodynamic surface 3152 will give an extreme angle response with fluctuations responding to turbulence. Even with servo control to avoid stall, air turbulence and gusts can induce stall, which needs to be sensed with corrective response. An alternative trailing edge flow sensor system 3300 is now discussed with reference to FIG. 33. A thin flexible transparent sheet or film 3352 extends from a notch in the wing trailing edge. The sheet bends and curves in response to the curvature of aerodynamic flow as indicated by curving lines 3380. 3330 indicates a PC-board foil pattern and connecting via through partition 3320. The foil and via send a current to a light emitter, hidden from view in this figure, for example a light emitting diode, whose ground connection is also hidden here. Part of the emitter's light output travels through sheet 3352 and emerges from the perimeter edge 3340, including where that edge faces photodetector arrays 3360 and 3370, both mounted on partition 3310. While these detectors "view" the illuminated edge of 3340, their background is the dark inward-facing surface of partition 3320, which also functions as a visual shield, for instance to shade and prevent the sun and other bright objects from appearing directly in the limited fields of view of sensors 3360 and 3370. Further shielding of the sensors from unwanted external viewing angles may be provided as needed. Though the diagram suggests multiple-sensor arrays, appropriate optics coupled to a pair of photosensors with differential output amplification can suffice to give useful sheet-deflection signals. The signal from one of these two sensors, e.g. 3360, is functionally essential, while the second sensor output, e.g. 3370, is considered optional but can provide useful additional information. Output from the "essential" sensor can be taken as a measure of wing lift coefficient "$C_L$" at 3372, this value being conveyed via 3373 to the familiar processor unit 3270. The 3373 input is a right-wing input equivalent to 3261 of FIG. 32a, while a similar left-wing input from 3374, shown as input 3262 in FIG. 32a, enters the second sensor input of 3270.

A limitation of the system with just the "essential" single photosensor relates to the stiffness of sheet 3352 and to a potential stability problem. If it is too flexible, 3352 might chatter in turbulence from various sources including from instability in its own boundary layer. Stiffness in the sheet, however, can cause the sheet to significantly resist bending, giving reduced pitch-angle sensitivity at low indicated airspeeds. For example, if the sheet-absent unperturbed air flow pattern is uniformly curved in the sheet region, then with a stiff sheet the cumulative bending moment from pressure differential across the sheet will be highest at the sheet attachment in front and will go to zero at the sheet trailing edge, causing the curvature to decrease going from attachment to trailing edge. As airspeed increases with the same wing lift coefficient and the same unperturbed air flow pattern, the flow will act more strongly to bend the entire sheet toward the unperturbed flow contour, giving a more uniform curvature. When computation module 3372 uses both inputs 3361 and 3371 from respective sensors 3360 and 3370, then the two optical signals can be interpreted in combination to infer both the lift coefficient "$C_L$" and a reference Bernoulli pressure or corresponding indicated airspeed "U". As has been discussed above, the controller for the aircraft of the present invention uses measures of airspeed to decide, for example, when to transition from wing $C_L$ control to pitch control for directing thruster force.

Returning attention to lift coefficient sensor system 3200, an option is provided there to measure a combination of speed and "stiffness" of the air flow over surface 3152, leading to a measurement of Bernoulli pressure or corresponding indicated airspeed "U". A test current applied to electrical coil 3245 generates a magnetic field passing through both field sensor 3260 and magnet 3230, the field being directed roughly at right angles to the poling of the magnet. This field produces torsion in the magnet, which in turn perturbs the angle of 3152. It is possible to calibrate the direct effect of the coil field on sensor 3260 and subtract that from signal 3261, so that the resultant signal is sensitive only to the angular response of 3152 to the magnetic torsion. The torsional stiffness exhibited by 3152 in resisting the known perturbing magnetic torsion provides a good measure of Bernoulli pressure. Alternatively, the magnetic perturbation can be pulsed, with dynamic variation in signal 3261 indicating the speed of angle recovery, overshoot and possible damped oscillation responding to pulses. Even a mechanical response spectrum of amplitude and/or phases versus frequency can be measured. It will be seen that multiple measurement variations can be used to determine the important pair of parameters "$C_L$" and "U" or their correlates such as wing geometric attack angle and Bernoulli pressure.

Application of the just-discussed measurements in larger flight-control contexts includes the procedural steps listed in FIGS. 34 and 35 and discussed at length, above. This concludes the discussion of the figures, with a brief summary and claims to follow.

From the many design options and variations presented here, falling within the scope of the present invention, one must not lose sight of the fundamental novelty. That is, an aircraft with two wings, thrusters such as powered props or ducted turbines on each wing, and independent pitch control for each wing through large angles, can be configured to operate as a helicopter and as a fixed wing aircraft, having the VTOL advantage of its helicopter mode and the efficient high-speed flight advantage of its fixed wing mode, and being able to undergo in-flight conversions in either direction between the two modes, combining those two major advantages.

What is claimed is:

1. An aircraft capable of (a) sustained powered rotary-wing-mode VTOL flight and (b) sustained powered non-rotary forward airplane-mode flight, the aircraft comprising:
   a hub;
   a pair of wings coupled to the hub and serving as both rotary wings in rotary-wing-mode VTOL flight and as a pair of lifting wings in non-rotary forward airplane-mode flight;
   a fuselage coupled to the hub and located under the pair of wings when the aircraft is in said rotary-wing-mode VTOL flight and in said non-rotary forward airplane-mode flight; and
   a propulsion component configured to provide propulsion for the aircraft sufficient for sustained powered flight, wherein the propulsion component includes a plurality of thrusters including at least one thruster on each wing of said pair of wings, wherein said plurality of thrusters provides sustained rotation of the pair of wings in said rotary-wing-mode VTOL flight and sustained forward motion of the pair of wings and of the entire aircraft in said non-rotary forward airplane-mode flight,
   wherein said at least one thruster on a first one of said pair of wings is able to thrust in substantially an opposite direction from propulsion from said at least one thruster on a second one of said pair of wings in said rotary-wing-mode VTOL flight and,
   wherein said propulsion from said at least one thruster on said first one of said pair of wings is able to thrust in substantially a same direction as propulsion from said at least one thruster on said second one of said pair of wings in said non-rotary forward airplane-mode flight.

2. The aircraft of claim 1, wherein each of said plurality of thrusters is an unshrouded propeller.

3. The aircraft of claim 1, wherein each of said plurality of thrusters is a shrouded turbine.

4. The aircraft of claim 1, wherein propulsion from each of said plurality of thrusters is varied differentially in said non-rotary forward airplane-mode flight to control yaw rotations of said aircraft.

5. The aircraft of claim 1, wherein, in a transition between said rotary-wing-mode VTOL flight and said non-rotary forward airplane-mode flight, said at least one thruster on said first one of said pair of wings is affixed to said first one of said pair of wings and rotates in a feathering rotation with said first one of said pair of wings about a pitch change axis of said wing, said pitch change axis being substantially parallel to a span of said first one of said pair of wings, and where said at least one thruster and said first one of said pair of wings rotate in said feathering rotation through an angle change exceeding about 120 degrees relative to said hub.

6. The aircraft of claim 5, wherein said hub is located between said pair of wings and attached to each wing of said pair of wings, wherein an attachment between said pair of wings permits feathering rotations in both wings about said pitch change axes of each of said two wings, and wherein:
   said feathering rotations control aircraft roll in said non-rotary forward airplane-mode flight; and, said feathering rotations control variations in the plane of rotation of said pair of wings in said rotary-wing-mode VTOL flight.

7. The aircraft of claim 6, wherein said attachment between said pair of wings controls and powers said feathering rotations.

8. The aircraft of claim 6, wherein said plurality of thrusters on said pair of wings cause gyroscopic torsions acting on said pair of wings about the respective pitch change axes of said pair of wings when operating in said rotary-wing-mode VTOL, flight, said gyroscopic torsions being controllably varied cyclically in a one-per-rev cycle to augment or entirely effect said feathering rotations to control said variations in the plane of rotation in said rotary-wing-mode VTOL flight.

9. The aircraft of claim 8, wherein each one of said plurality of thrusters includes at least two rotary propeller or turbine components rotating in substantially opposite vector rotation senses, wherein:
   variable angular momenta arising from said substantially opposite rotation senses at least partially cancel one another; and,
   said gyroscopic torsions about said pitch change axes, arising from said variable angular momenta in rotary-wing-mode VTOL flight, are controllably varied through alteration of said substantially opposite vector rotation senses, thereby acting to augment or entirely effect said feathering rotations.

10. The aircraft of claim 9, wherein said at least two rotary propeller or turbine components of each of said plurality of thrusters provide independently variable thrust vectors acting through differing moment arms with respect to the associated one of said respective pitch change axes, whereby a variable wing-pitch-control moment arising from said independently variable thrust vectors and differing moment arms controls wing pitch in said non-rotary forward airplane-mode flight.

11. The aircraft of claim 6, wherein said fuselage is a normally non-rotary fuselage with rotatable attachment to said hub, wherein said fuselage maintains a controllable non-rotary yaw angle in said rotary-wing-mode VTOL flight.

12. The aircraft of claim 11, wherein said rotatable attachment to said hub includes torsion actuation operating through said rotatable attachment to control said non-rotary yaw angle.

13. The aircraft of claim 11, including controllable aerodynamic thrust in said fuselage, said controllable aerodynamic thrust acting through a radius from an axis of said rotatable attachment for maintaining said controllable non-rotary yaw angle.

14. The aircraft of claim 13, wherein said controllable aerodynamic thrust acting through a radius is provided by a tail component undergoing angular changes, said angular changes interacting with downwash from said pair of wings to provide said controllable aerodynamic thrust acting through a radius.

15. The aircraft of claim 11, including decoupling and re-attachment of said rotatable attachment, whereby said hub can fly independently of said fuselage or with said rotatable attachment to carry said fuselage.

16. The aircraft of claim 11, including tilt-angle decoupling between said fuselage and said pair of wings, whereby the plane of rotation of said pair of wings can tilt in pitch and roll directions independent of the pitch and roll angles of said fuselage.

17. The aircraft of claim 16, wherein said tilt-angle decoupling includes a flapping hinge in said hub, allowing said pair of wings to flap through variable angles with respect to said hub.

18. The aircraft of claim 16, wherein said tilt-angle decoupling includes a universal hinge permitting rotation and suspension of said fuselage at arbitrary suspension angles in pitch and roll with respect to said plane of rotation.

19. A method for controlling an aircraft in a rotary-wing-mode of flight and an airplane-mode of flight and in transitions between said rotary-wing-mode of flight and said airplane-mode of flight, wherein the aircraft includes two wing-plus-thruster systems, a hub located between said two wing-plus-thruster systems, and a fuselage normally traveling below said hub, the method comprising the steps of:
  independently controlling pitch angles of each of said two wing-plus-thruster systems of the aircraft in feathering about their respective wing-pitch-change axes, including feathering to cause angle changes exceeding about 120 degrees relative to said hub, wherein each of the two wing-plus-thruster systems includes, a wing and a thruster so that there are two wings and two thrusters of the aircraft;
  controlling said pitch angles in a common mode to cause simultaneous increases in lift and simultaneous decreases in lift for the two wings for said rotary-wing-mode flight and for said aircraft-mode of flight;
  controlling said pitch angles in a differential mode to cause opposite changes in lift for the two wings, thereby to control a plane of rotation of said wing-thruster systems for said rotary-wing-mode of flight;
  controlling said pitch angles in a differential mode to cause opposite changes in lift for the two wings, thereby to control aircraft roll for said airplane mode of flight;
  controlling said pitch angles so that said wing-plus-thruster systems transition continuously from opposite direction thrusts in said rotary-wing-mode of flight to same-direction thrusts in said airplane-mode of flight for in-flight transition from said rotary-wing-mode of flight to said airplane-mode flight;
  controlling said pitch angles so that said wing-plus-thruster systems transition continuously from said same-direction thrusts in said airplane-mode of flight to said opposite-direction thrusts in said rotary-wing-mode of flight for in-flight transition from said airplane-mode of flight to said rotary-wing-mode of flight; and,
  controlling variable angle between said fuselage and said hub, thereby controlling a non-rotary yaw angle of said fuselage in said rotary-wing-mode of flight.

20. The method of claim 19, further including independently controlling thrusts of said two wing-plus-thruster systems differentially in said airplane-mode of flight for controlling aircraft yaw.

21. An aircraft capable of (a) sustained powered rotary-wing-mode VTOL flight and (b) sustained powered non-rotary forward airplane-mode flight, the aircraft comprising:
  a hub;
  a pair of wings coupled to the hub and serving as both rotary wings in said rotary-wing-mode VTOL flight and as a pair of lifting wings in said non-rotary forward airplane-mode flight; and
  a propulsion component configured to provide propulsion for the aircraft sufficient for sustained powered flight, wherein the propulsion component includes a plurality of thrusters including at least one thruster on each wing of said pair of wings, wherein said plurality of thrusters provides sustained rotation of the pair of wings in said rotary-wing-mode VTOL flight and sustained forward motion of the pair of wings and of the entire aircraft in said non-rotary forward airplane-mode flight,
  wherein said at least one thruster on a first one of said pair of wings is able to thrust in substantially an opposite direction from propulsion from said at least one thruster on a second one of said pair of wings in said rotary-wing-mode VTOL flight and,
  wherein said propulsion from said at least one thruster on said first one of said pair of wings is able to thrust in substantially a same direction as propulsion from said at least one thruster on said second one of said pair of wings in said non-rotary forward airplane-mode flight, and
  wherein, in a transition between said rotary-wing-mode VTOL flight and said non-rotary forward airplane-mode flight, said at least one thruster on said first one of said pair of wings is affixed to said first one of said pair of wings and rotates in a feathering rotation with said first one of said pair of wings about a pitch change axis of said first one of said pair of wings, said pitch change axis being substantially parallel to a span of said first one of said pair of wings, and where said at least one thruster and said first one of said pair of wings rotate in said feathering rotation through an angle change exceeding about 120 degrees relative to the hub.

22. The aircraft of claim 21, wherein each of said plurality of thrusters is an enshrouded propeller.

23. The aircraft of claim 21, wherein each of said plurality of thrusters is a shrouded turbine.

24. The aircraft of claim 21, wherein propulsion from each of said plurality of thrusters is varied differentially in said non-rotary forward airplane-mode flight to control yaw rotations of said aircraft.

* * * * *